(12) United States Patent
Sasai et al.

(10) Patent No.: US 7,747,218 B2
(45) Date of Patent: Jun. 29, 2010

(54) COMMUNICATION SYSTEM AND METHOD, AND INFORMATION PROCESSING APPARATUS AND METHOD

(75) Inventors: Takashi Sasai, Kanagawa (JP); Hiroshi Kakuda, Tokyo (JP); Masamitsu Higo, Kanagawa (JP)

(73) Assignee: Sony Corporation, Tokyo (JP)

( * ) Notice: Subject to any disclaimer, the term of this patent is extended or adjusted under 35 U.S.C. 154(b) by 762 days.

(21) Appl. No.: 10/492,647

(22) PCT Filed: Oct. 16, 2002

(86) PCT No.: PCT/JP02/10723

§ 371 (c)(1),
(2), (4) Date: Apr. 14, 2004

(87) PCT Pub. No.: WO03/034661

PCT Pub. Date: Apr. 24, 2003

(65) Prior Publication Data

US 2004/0247023 A1    Dec. 9, 2004

(30) Foreign Application Priority Data

Oct. 16, 2001    (JP)    ............... 2001-317957

(51) Int. Cl.
*H04B 7/00*    (2006.01)

(52) U.S. Cl. .............. 455/41.2; 455/41.1; 455/73; 455/550.1; 455/517; 455/518; 455/519; 455/456.1; 455/456.2; 455/456.3; 455/556.1

(58) Field of Classification Search ......... 455/517–519, 455/550, 456, 41.1–41.2, 556, 560, 73, 660.1, 455/456.1–456.3, 556.1; 340/825.69; 370/465
See application file for complete search history.

(56) References Cited

U.S. PATENT DOCUMENTS 5,740,533 A * 4/1998 Lin ..................... 340/7.42

(Continued)

FOREIGN PATENT DOCUMENTS

JP    2-280292    11/1990

(Continued)

OTHER PUBLICATIONS

Thomas Muller, "Bluetooth Security Architecture", Jul. 15, 1999, Version 1, pp. 1-33.*

(Continued)

*Primary Examiner*—Edward Urban
*Assistant Examiner*—Junpeng Chen
(74) *Attorney, Agent, or Firm*—Finnegan, Henderson, Farabow, Garrett & Dunner, L.L.P.

(57) ABSTRACT

The present invention relates to a communication system, a communication method, an information processing apparatus, and an information processing method for easily and quickly organizing a communication group containing a plurality of apparatuses. The user places a PDA 2 in proximity to a personal computer 1. When an electromagnetic wave emitted from a reader/writer of the PDA 2 is received by a reader/writer of the personal computer 1, the personal computer 1 notifies the PDA 2 of stored communication group organizing information. The PDA 2 stores the communication group organizing information while establishing a synchronization for a Bluetooth communication with the personal computer 1 based on the communication group organizing information to establish the Bluetooth communication with the personal computer 1. The present invention is applicable to a variety of information processing apparatuses such as a personal computer and a PDA.

12 Claims, 32 Drawing Sheets

U.S. PATENT DOCUMENTS

| | | | |
|---|---|---|---|
| 6,754,562 B2 * | 6/2004 | Strege et al. | 700/279 |
| 6,842,460 B1 * | 1/2005 | Olkkonen et al. | 370/465 |
| 7,046,961 B2 * | 5/2006 | Park | 455/41.2 |
| 7,076,209 B2 * | 7/2006 | Sugikawa et al. | 455/41.2 |
| 7,110,784 B2 * | 9/2006 | Nasu et al. | 455/517 |
| 7,215,923 B2 * | 5/2007 | Hillyard | 455/41.1 |
| 2001/0002906 A1 * | 6/2001 | Rune | 370/345 |
| 2001/0029166 A1 * | 10/2001 | Rune et al. | 455/41 |
| 2001/0052858 A1 * | 12/2001 | Vincent et al. | 340/825.69 |
| 2002/0068604 A1 * | 6/2002 | Prabhakar et al. | 455/556 |
| 2002/0193910 A1 * | 12/2002 | Strege et al. | 700/279 |
| 2002/0197955 A1 * | 12/2002 | Witkowski et al. | 455/41 |
| 2003/0036350 A1 * | 2/2003 | Jonsson et al. | 455/41 |
| 2003/0036408 A1 * | 2/2003 | Johansson et al. | 455/560 |
| 2003/0176200 A1 * | 9/2003 | Harrison | 455/500 |
| 2004/0048622 A1 * | 3/2004 | Witkowski et al. | 455/456.6 |
| 2004/0227934 A1 * | 11/2004 | Strege et al. | 356/139.09 |
| 2005/0090279 A9 * | 4/2005 | Witkowski et al. | 455/550.1 |

FOREIGN PATENT DOCUMENTS

| | | |
|---|---|---|
| JP | 2001-144781 | 5/2001 |
| JP | 2001-156704 | 6/2001 |
| JP | 2001-189722 | 7/2001 |
| JP | 2002-149948 | 5/2002 |
| JP | 2002-150142 | 5/2002 |
| WO | WO 01/45319 A1 | 6/2001 |

OTHER PUBLICATIONS

Akira Ni'He'I, Keitai Denwa wa Benri na Saifu ni Pocket ni Ketaiga areba ii Seikatsu ga Kuru, Jul. 1, 2001, ASCII, vol. 25, No. 7, pp. 278 to 279.

European Search Report in counterpart Application No. 02777851.3-1249/1437864 dated Sep. 2, 2009.

* cited by examiner

FIG. 8

| COMMUNICATION GROUP ID (BLUETOOTH ADDRESS) | 08:00:46:21:39:4D |
|---|---|
| DEVICE CLASS | PERSONAL COMPUTER |
| DEVICE NAME | VAIE |
| PASS KEY | 0123456 |
| LINK KEY | $K_A$ |
| SERVICE DATABASE (SERVICE RECORD) | SERVICE ATTRIBUTE 1<br>SERVICE ATTRIBUTE 2<br>SERVICE ATTRIBUTE 3 |
| NUMBER OF AVAILABLE CONNECTIONS | 6 |
| EFFECTIVE CONNECTION TIME | JST0:00-12:00 |
| CONNECTABLE DEVICE | 1. PERSONAL COMPUTER<br>2. PDA<br>3. MOBILE TELEPHONE |
| URL | http://www.abc.com/ |

COMMUNICATION SYSTEM AND METHOD, AND INFORMATION PROCESSING APPARATUS AND METHOD

TECHNICAL FIELD

The present invention relates to a communication system, a communication method, an information processing apparatus, and an information processing method and, more particularly to a communication system, a communication method, an information processing apparatus, and an information processing method for easily and quickly organizing a network of a plurality of apparatuses.

BACKGROUND ART

The Bluetooth® technology draws attention as short-range radio communication means, and a variety of apparatuses featuring the Bluetooth interface have been developed and commercially available.

Radio communication systems such as the Bluetooth using radio waves have advantages such as no directivity and high transmission efficiency over infrared communication systems. When a communication, such as an IrDA, having a high directivity is used, apparatuses in communication must face each other in alignment. The communication system such as Bluetooth apparatuses is free from such restrictions.

The Bluetooth specifications are controlled by Bluetooth SIG Inc., and the detailed information about the Bluetooth specifications is available from Bluetooth SIG Inc. In a communication in compliance with the Bluetooth specifications, an apparatus called a master broadcasts a device detecting message to apparatuses present in a surrounding area to detect the apparatuses.

The master detects apparatuses present in the surrounding area, namely, communicable apparatuses, by reply messages transmitted from an apparatus (a slave) that has received the device detecting message.

When establishing a communication with a particular apparatus from among detected apparatuses, the master identifies each apparatus based on identification information contained in the reply messages, and then establishes the communication with that particular apparatus.

In the Bluetooth communication, information called a Bluetooth address identifying each apparatus is assigned the apparatus. The Bluetooth address, unique (particular) to each apparatus, is used in various processes such as a management of apparatuses.

A Bluetooth system typically employs a piconet, i.e., a network containing a master and slaves, and in the same piconet, a maximum of seven slaves belong to a single master. All apparatuses belonging to the same piconet are synchronized in a frequency axis (a frequency hopping pattern) and in a time axis (a time slot).

A plurality of piconets may be linked to form a network, which is called a scatternet.

The Bluetooth specifications specify data exchanged over the radio communication, and a profile formulated for each of services, and the service provided by each apparatus is described using the profile.

For example, a PAN (Personal Area Network) profile currently being formulated as one of the profiles specifies a communication method between slaves. The apparatuses belonging to the piconet organized based on the PAN profile exchange a variety of data over the piconet as a network. Similarly, a planned standard is expected to define the scatternet as a single network where a variety of data is exchanged over. The network may be the one based on an IP (Internet Protocol).

When a network is organized, which apparatus to serve as a master, which apparatuses to serve as slaves, and what service to be used in communication must be determined. The master acquires information about apparatuses in the surrounding area using the device detecting message, and determines these network parameters in response to an instruction from the user.

In a Bluetooth radio communication system, the device detecting message is broadcasted to all apparatuses within a search area (within a radium of 10 meters to 100 meters). The user recognizes information presented on a display, and selects an apparatus to communicate with from among apparatuses that have transmitted reply messages in response to the device detecting message. This is a time-consuming operation.

More specifically, since the user must select an apparatus each time communication is made, the communication system is not user friendly. As the Bluetooth compatible apparatuses are widely used, the ease of use of the system is more adversely affected.

The user needs to select a desired service from among services reported by the apparatuses when data is actually exchanged. This step consumes more time before starting communication.

Even after the selection of the apparatus to communicate with and the selection of the service with the selected apparatus, the user is further forced to enter a numeric input of a predetermined digit called a pass key to both apparatuses for communication. The input of the pass key is particularly required to establish a first communication with an apparatus which requires security. The pass key input degrades the ease of use of the system.

The above-referenced steps presents difficulty for user to organize a communication group (a network) through a Bluetooth communication formed of a plurality of apparatuses.

DISCLOSURE OF THE INVENTION

The present invention has been developed in view of the above drawbacks, and it is an object of the present invention to allow a communication group to be easily and quickly organized from a plurality of apparatuses in a communication using a Bluetooth link.

The first information processing terminal of a communication system of the present invention includes first radio communication means for transmitting predetermined information to and receiving predetermined information from the second information processing terminal in proximity using an electromagnetic wave, second radio communication means, different from the first radio communication means, for performing radio communication with the second information processing terminal, storage means for storing communication group organizing information containing at least identification information of an information processing terminal managing a communication group and communication method information relating to a communication method of the radio communication providable by the communication group, providing means for providing the communication group organizing information stored in the storage means to the second information processing terminal through the first radio communication means, first synchronization establishing means for establishing synchronization of the radio communication with the second information processing terminal in response to a request which is made by the second information processing terminal in accordance with the identification information provided by the providing means, and first communication establishing means for establishing the radio communication, with the synchronization thereof established by the first synchronization establishing means, using the communication method which is selected by the second information processing terminal in accordance with the communication method information. The second information processing terminal of the communication system of the present invention includes third radio communication means for transmitting predetermined information to and receiving predetermined information from the first information processing terminal in proximity using an electromagnetic wave, fourth radio communication means, different from the third radio communication means, for performing radio communication with the first information processing terminal, acquisition means for acquiring the communication group organizing information from the first information processing terminal through the third radio communication means, storage means for storing the communication group organizing information acquired by the acquisition means, selection means for selecting the communication method to be used in the radio communication of the fourth radio communication means in accordance with the communication method information, second synchronization establishing means for establishing synchronization of the radio communication with the information processing terminal, managing the communication group, in accordance with the identification information, and second communication establishing means for establishing the radio communication, with the synchronization thereof established by the second synchronization establishing means, using the communication method which is selected by the selection means.

The information processing method of the present invention of a communication system includes a first radio communication step of transmitting predetermined information to and receiving predetermined information from the second information processing terminal in proximity using an electromagnetic wave, a second radio communication step of performing radio communication with the second information processing terminal, a storage step of storing communication group organizing information containing at least identification information of an information processing terminal managing a communication group and communication method information relating to a communication method of the radio communication providable by the communication group, a providing step of providing the communication group organizing information stored in the process of the storage step to the second information processing terminal through the process of the first radio communication step, a first synchronization establishing step of establishing synchronization of the radio communication with the second information processing terminal in response to a request which is made by the second information processing terminal in accordance with the identification information provided in the process of the providing step, and a first communication establishing step of establishing the radio communication, with the synchronization thereof established in the process of the first synchronization establishing step, using the communication method which is selected by the second information processing terminal in accordance with the communication method information. The information processing method of the second information processing terminal includes a third radio communication step of transmitting predetermined information to and receiving predetermined information from the first information processing terminal in proximity using an electromagnetic wave, a fourth radio communication step of performing radio communication with the first information processing terminal, an acquisition step of acquiring the communication group organizing information from the first information processing terminal through the process of the third radio communication step, a storage step of storing the communication group organizing information acquired in the process of the acquisition step, a selection step of selecting the communication method to be used in the radio communication of the process of the fourth radio communication step in accordance with the communication method information, a second synchronization establishing step of establishing synchronization of the radio communication with the information processing terminal, managing the communication group, in accordance with the identification information, and a second communication establishing step of establishing the radio communication, with the synchronization thereof established in the process of the second synchronization establishing step, using the communication method which is selected in the process of the selection step.

A first information processing apparatus of the present invention includes first radio communication means for transmitting predetermined information to and receiving predetermined information from a first information processing terminal in proximity using an electromagnetic wave, second radio communication means, different from the first radio communication means, for performing radio communication with the first information processing terminal, acquisition means for acquiring, through the first radio communication means from the first information processing terminal, communication group organizing information containing at least identification information of an information processing terminal managing a communication group and communication method information relating to a communication method of the radio communication providable by the communication group, storage means for storing the communication group organizing information acquired by the acquisition means, selection means for selecting the communication method to be used in the radio communication of the second radio communication means in accordance with the communication method information, synchronization establishing means for establishing synchronization of the radio communication with the information processing terminal, managing the communication group, in accordance with the identification information, and communication establishing means for establishing the radio communication, with the synchronization thereof established by the synchronization establishing means, using the communication method which is selected by the selection means.

The first information processing apparatus may further include providing means for providing the communication group organizing information stored in the storage means to the second information processing terminal through the first radio communication means when the second information processing terminal is in proximity.

An information processing method of the first information processing apparatus of the present invention includes a first radio communication step of transmitting predetermined information to and receiving predetermined information from a first information processing terminal in proximity using an electromagnetic wave, a second radio communication step of performing radio communication with the first information processing terminal, an acquisition step of acquiring, through the process of the first radio communication step from the first information processing terminal, communication group organizing information containing at least identification information of an information processing terminal managing a communication group and communication method information relating to a communication method of the radio communication providable by the communication group, a storage step of storing the communication group organizing information acquired in the process of the acquisition step, a selection step of selecting the communication method to be used in the radio communication of the process of the second radio communication step in accordance with the communication method information, a synchronization establishing step of establishing synchronization of the radio communication with the information processing terminal, managing the communication group, in accordance with the identification information, and a communication establishing step of establishing the radio communication, with the synchronization thereof established in the process of the synchronization establishing step, using the communication method which is selected in the process of the selection step.

A first program of the present invention causes a computer to perform a first radio communication control step of controlling the transmission of predetermined information to and the reception of predetermined information from a first information processing terminal in proximity using an electromagnetic wave, a second radio communication control step of controlling radio communication with the first information processing terminal, an acquisition control step of controlling the acquisition of, through the process of the first radio communication control step from the first information processing terminal, communication group organizing information containing at least identification information of an information processing terminal managing a communication group and communication method information relating to a communication method of the radio communication providable by the communication group, a storage control step of controlling the storage of the communication group organizing information acquired in the process of the acquisition control step, a selection step of selecting the communication method to be used in the radio communication of the process of the second radio communication control step in accordance with the communication method information, a synchronization establishing control step of controlling the establishment of synchronization of the radio communication with the information processing terminal, managing the communication group, in accordance with the identification information, and a communication establishing control step of controlling the establishment of the radio communication, with the synchronization thereof established in the process of the synchronization establishing control step, using the communication method which is selected in the process of the selection step.

A second information processing apparatus of the present invention includes acquisition means for acquiring, using an electromagnetic wave, communication group organizing information containing at least identification information of an information processing terminal managing a communication group and communication method information relating to a communication method of the radio communication providable by the communication group, stored in a radio communication device when the radio communication device, which is driven from an electromotive force that is generated in response to a reception of the electromagnetic wave, comes in proximity, update means for updating the communication group organizing information stored in the radio communication device using the electromagnetic wave, radio communication means for performing radio communication with the information processing terminal, selection means for selecting a communication method to be used in the radio communication of the radio communication means in accordance with the radio communication method information acquired by the acquisition means, synchronization establishing means for establishing synchronization of the radio communication with the information processing terminal in accordance with the identification information, and communication establishing means for establishing the radio communication, with the synchronization thereof established by the synchronization establishing means, using the communication method which is selected by the selection means.

The acquisition means may acquire the communication group organizing information further containing key information that is for use in an authentication to perform the radio communication.

The acquisition means may acquire, from the radio communication device, the communication group organizing information further containing number information representing the number of apparatuses with which the information processing terminal is concurrently able to communicate using the radio communication, and the synchronization establishing means may perform the radio communication with the information processing terminal in accordance with the number information.

The update means may update the number information of the communication group organizing information stored in the radio communication device by extracting one from the number information.

The acquisition means may acquire, from the radio communication device, the communication group organizing information further containing time slot information representing a time slot within which the information processing terminal is able to communicate using the radio communication, and the synchronization establishing means may establish the synchronization when the synchronization establishing means determines in accordance with the time slot information that the radio communication with the information processing terminal is possible.

The acquisition means may acquire, from the radio communication device, the communication group organizing information further containing type information representing a type of an apparatus with which the information processing terminal is able to communicate using the radio communication, and the synchronization establishing means may establish the synchronization when the synchronization establishing means determines in accordance with the identification information that the radio communication with the information processing terminal is possible.

The second information processing apparatus may further includes start-up means for starting the function of the radio communication when the acquisition means acquires the communication group organizing information from the radio communication device.

An information processing method of the second information processing apparatus includes an acquisition step of acquiring, using an electromagnetic wave, communication group organizing information containing at least identification information of an information processing terminal managing a communication group and communication method information relating to a communication method of the radio communication providable by the communication group, stored in a radio communication device when the radio communication device, which is driven from an electromotive force that is generated in response to a reception of the electromagnetic wave, comes in proximity, an update step of updating the communication group organizing information stored in the radio communication device using the electromagnetic wave, a radio communication step of performing radio communication with the information processing terminal, a selection step of selecting a communication method to be used in the radio communication of the process of the radio communication step in accordance with the radio communication method information acquired in the process of the acquisition step, a synchronization establishing step of establishing synchronization of the radio communication with the information processing terminal, managing the communication group, in accordance with the identification information, and a communication establishing step of establishing the radio communication, with the synchronization thereof established in the process of the synchronization establishing step, using the communication method which is selected in the process of the selection step.

A second program of the present invention causes a computer to perform an acquisition control step of controlling, using an electromagnetic wave, the acquisition of communication group organizing information containing at least identification information of an information processing terminal managing a communication group and communication method information relating to a communication method of the radio communication providable by the communication group, stored in a radio communication device when the radio communication device, which is driven from an electromotive force that is generated in response to a reception of the electromagnetic wave, comes in proximity, an update control step of controlling the update of the communication group organizing information stored in the radio communication device using the electromagnetic wave, a radio communication control step of controlling radio communication with the information processing terminal, a selection step of selecting a communication method to be used in the radio communication of the radio communication control step, a synchronization establishing control step of controlling the establishment of synchronization of the radio communication with the information processing terminal in accordance with the identification information, and a communication establishing control step of controlling the establishment of the radio communication, with the synchronization thereof established in the synchronization establishing control step, using the communication method which is selected in process of the selection step.

In the communication system and the communication method of the present invention, the first information processing terminal stores the communication group organizing information containing at least the identification information of the information processing terminal managing the communication group and the communication method information relating to the communication method of the radio communication providable by the communication group, and the second information processing terminal is then supplied with the communication group organizing information. In response to a request made by the second information processing terminal in accordance with the provided identification information, the synchronization of the radio communication with the second information processing terminal is established. The radio communication, with the synchronization thereof established, is then established using the communication method the second information processing terminals selects in accordance with the communication method information. The second information processing terminal acquires the communication group organizing information from the first information processing terminal, and stores the acquired communication group organizing information. In accordance with the communication method information, the communication method to use in the radio communication is selected. The synchronization of the radio communication with the information processing terminal managing the communication group is established in accordance with the identification information. The radio communication, with the synchronization thereof established, is established using the selected communication method.

In the first information processing apparatus, the first information processing method, and the first program of the present invention, the communication group organizing information containing at least the identification information of the information processing terminal managing the communication group and the communication method information relating to the communication method of the radio communication providable by the communication group is acquired, and the acquired communication group organizing information is stored. The communication method to use in the radio communication is selected in accordance with the communication method information, and the synchronization of the radio communication with the information processing terminal managing the communication group is established based on the identification information. The radio communication, with the synchronization thereof established, is then established using the selected communication method.

In the second information processing apparatus, the second information processing method, and the second program of the present invention, the communication group organizing information containing at least the identification information of the information processing terminal managing the communication group and the communication method information relating to the communication method of the radio communication providable by the communication group, stored in the radio communication device, is acquired using the electromagnetic wave when the radio communication device, which is driven from the electromotive force generated in response to the reception of the electromagnetic wave, comes in proximity. The communication group organizing information stored in the radio communication device is updated using the electromagnetic wave. The communication method to use in the radio communication is selected based on the acquired communication method information. The synchronization of the radio communication with the information processing terminal managing the communication group is established in accordance with the identification information. The radio communication, with the synchronization thereof established, is then established using the selected communication method.

BRIEF DESCRIPTION OF THE DRAWINGS

FIG. 8 illustrates an example of communication group organizing information.

BEST MODE FOR CARRYING OUT THE INVENTION

Figure 1:
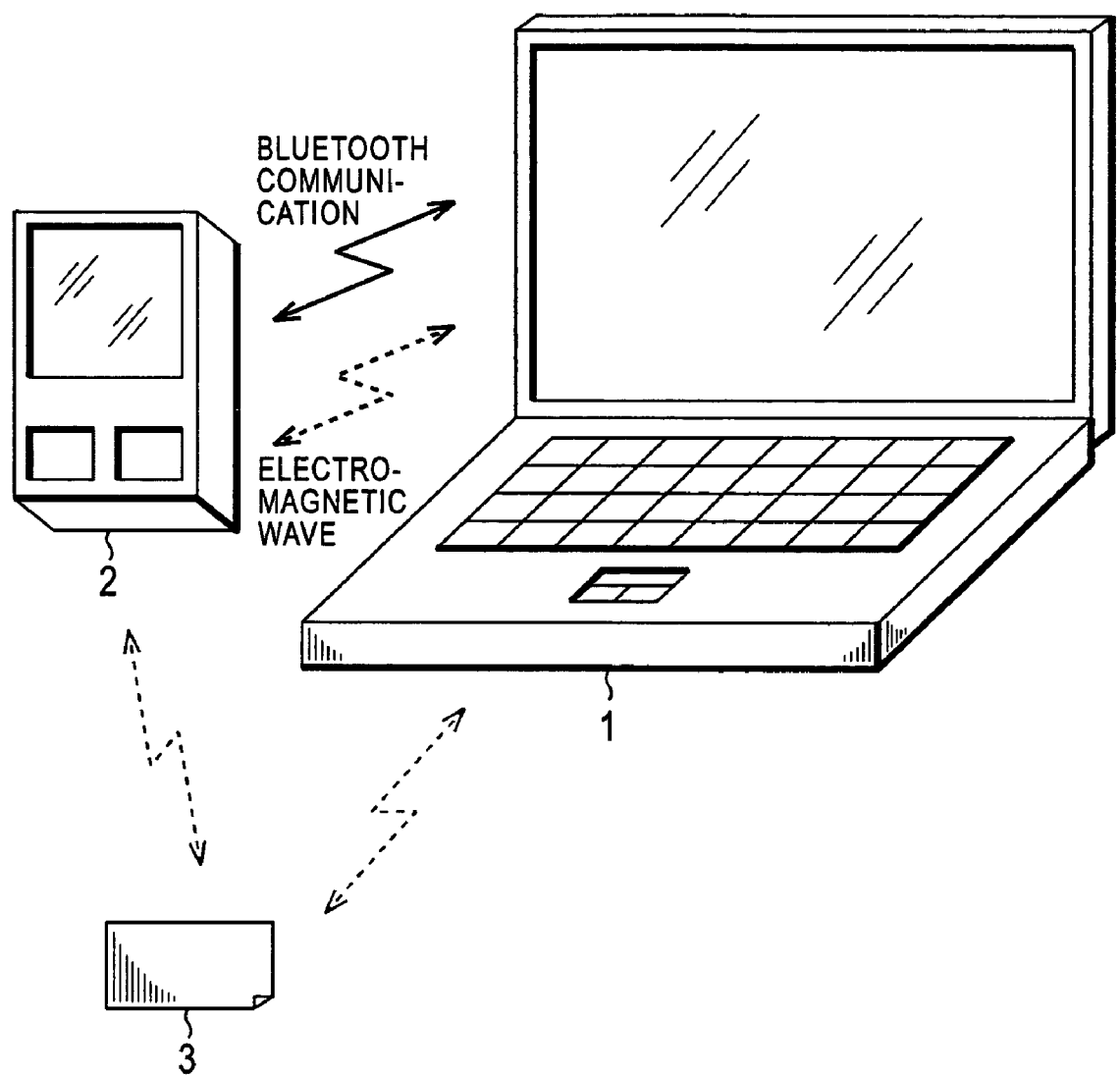
FIG. 1 illustrates the structure of a communication system implementing the present invention.

FIG. 1 illustrates the structure of a communication system implementing the present invention.

As shown, each of a personal computer 1 and a PDA (Personal Digital Assistants) 2 contains a Bluetooth module. As represented by arrow-headed broken lines, the personal computer 1 and the PDA 2 exchange a variety of data using a radio communication complying with the Bluetooth specifications.

Each of the personal computer 1 and the PDA 2 includes a reader/writer for reading a variety of data from a non-contact IC card 3 and for writing a variety of data onto the non-contact IC card 3. The reader/writer reads a variety of data from and writes a variety of data to a reader/writer on another apparatus. Communication between the personal computer 1 and the PDA 2 is performed not only using the Bluetooth communication, but also using the electromagnetic wave emitted from the reader/writer as represented by the arrow-headed broken lines.

The process of the communication will be discussed in detail later with reference to flow diagrams. The reader/writer of the personal computer 1 (a non-contact IC card reader/writer 19 (see FIG. 2)) provides the set communication group organizing information to the PDA 2 (a non-contact IC card reader/writer 108) when the user places the PDA 2 close to the personal computer 1 and the reader/writer of the personal computer 1 receives the electromagnetic wave emitted from the reader/writer of the PDA 2 (the non-contact IC card reader/writer 108 (see FIG. 5)).

The communication group organizing information contains a Bluetooth address identifying a Bluetooth module (a Bluetooth module 20 (see FIG. 2)) of the personal computer 1 that performs a Bluetooth communication. The Bluetooth address is information uniquely set to each of the Bluetooth modules of the personal computer 1 and the PDA 2.

The PDA 2, which has received the communication group organizing information of the personal computer 1, identifies the personal computer 1 only, using the communication group organizing information, from among the Bluetooth devices present in the surrounding area, and establishes the Bluetooth communication with the personal computer 1.

In the above-referenced process, the user of the PDA 2 starts the Bluetooth communication by simply placing the PDA 2 in proximity to the personal computer 1, without the need that the PDA 2 should execute an "inquiry" to be discussed in detail later, and without the operation to select the personal computer 1 from among the apparatuses detected by the PDA 2.

When the non-contact IC card 3 receives the electromagnetic wave emitted from the PDA 2 with the PDA 2 placed in proximity to the non-contact IC card 3 by the user, the non-contact IC card 3 supplies the PDA 2 with the set communication group organizing information.

For example, the communication group organizing information of the non-contact IC card 3 relates to the personal computer 1. The user establishes the Bluetooth communication with the non-contact IC card 3 by placing the PDA 2 close to the non-contact IC card 3 in the same way as the PDA 2 is placed in proximity to the personal computer 1.

The Bluetooth communication is established with the personal computer 1 via the non-contact IC card 3. Even if the personal computer 1 is placed at a position remote from the user's own position, the user starts the communication between the PDA 2 and the personal computer 1 by simply placing the PDA 2 at hand close to the non-contact IC card 3.

The elements of the communication system of FIG. 1 will now be discussed.

Figure 2:
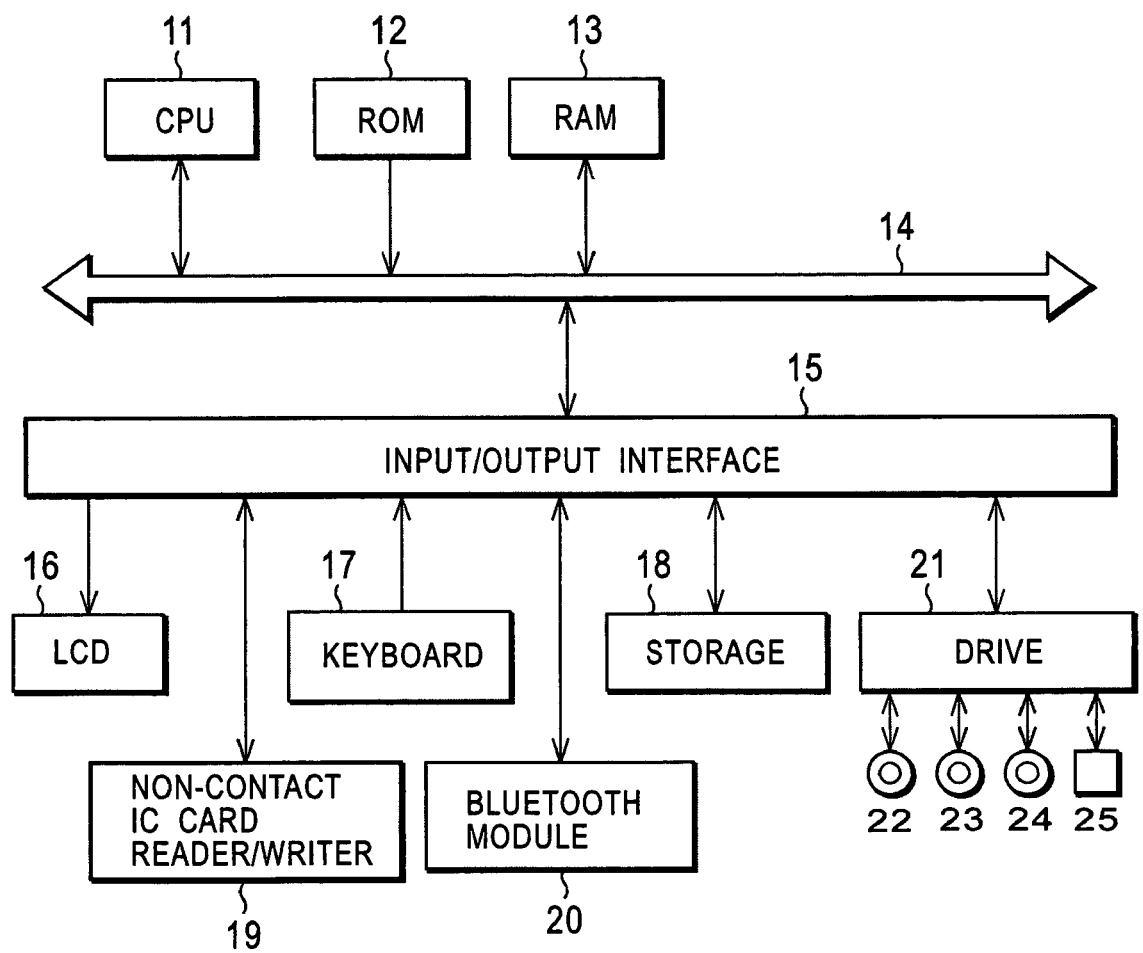
FIG. 2 is a block diagram illustrating the structure of a personal computer of FIG. 1.

FIG. 2 is a block diagram illustrating the structure of a personal computer of FIG. 1.

A CPU (Central Processing Unit) 11 performs various processes in accordance with programs stored in one of an ROM (Read-Only Memory) 12 and a storage 18. An RAM 13 stores programs executed by the CPU 11 and data, as necessary. The CPU 11, the ROM 12, and the RAM 13 are mutually interconnected through a bus 14.

The bus 14 is connected to an input/output interface 15, which in turn is connected to a LCD (Liquid-Crystal Display)

16 for presenting various types of information to the user, a keyboard 17 operated by the user, and the storage 18 such as a hard disk.

Also connected to the input/output interface 15 are the non-contact IC card reader/writer 19 which communicates with one of the non-contact IC card reader/writer 108 contained in the PDA 2 or the non-contact IC card 3 using the electromagnetic wave, and the Bluetooth module 20 which Bluetooth communicates with one of the PDA 2 and the Bluetooth module at an access point.

A drive 21 is connected to the input/output interface 15. One of a magnetic disk 22, an optical disk 23, a magnetooptical disk 24, and a semiconductor memory 25 is loaded into the drive 21 as appropriate. A program read from one of the magnetic disk 22 through the semiconductor memory 25 is supplied to the storage 18 for storage through the drive 21 and the input/output interface 15.

Figure 3:
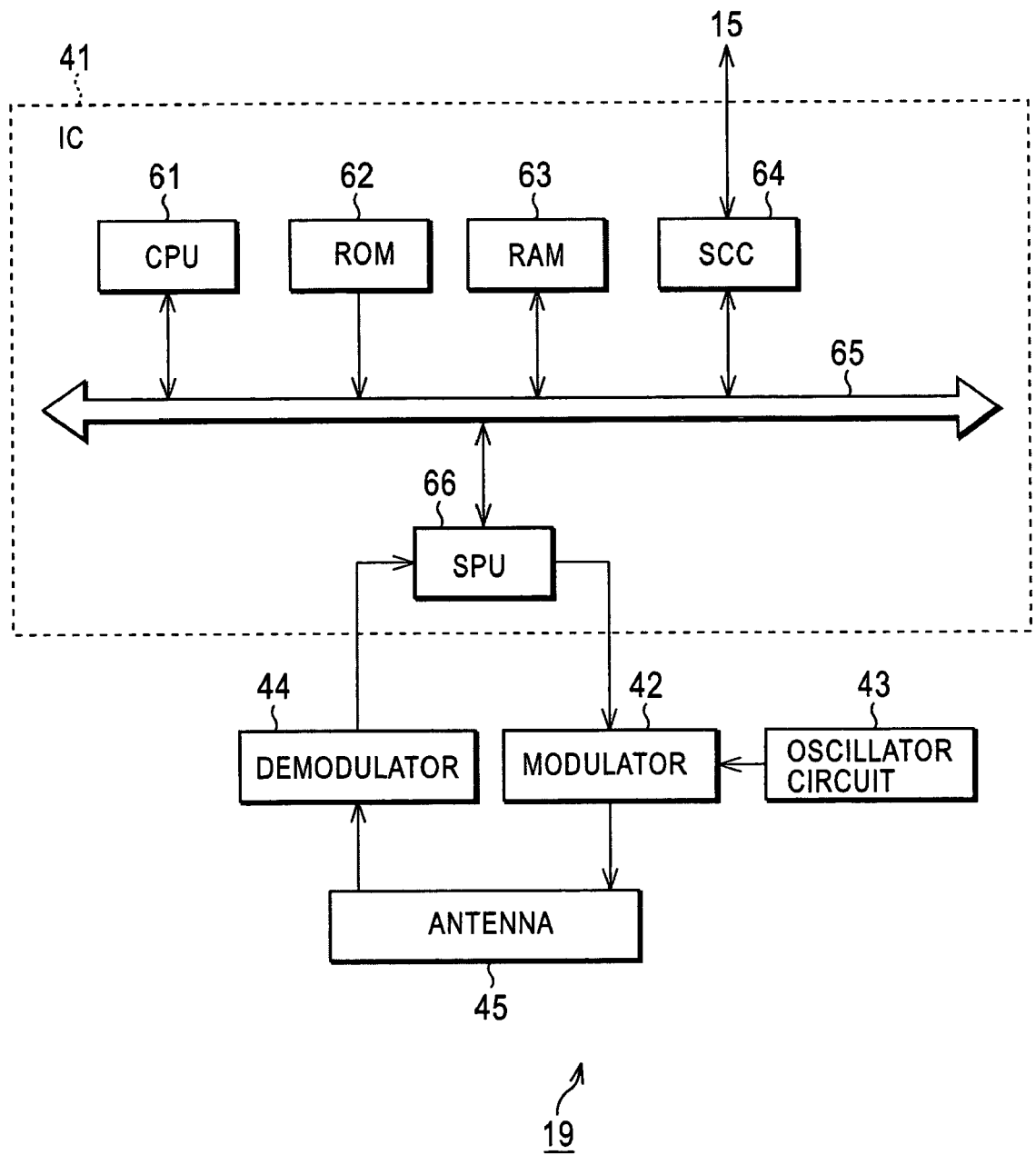
FIG. 3 is a block diagram illustrating the structure of an IC card reader/writer of FIG. 2.

FIG. 3 is a block diagram illustrating in detail the structure of the IC card reader/writer 19 (hereinafter referred to as a reader/writer 19 as appropriate) of FIG. 2.

An IC 41 includes a CPU 61, an ROM 62, an RAM 63, an SCC (Serial Communication Controller) 64, an SPU (Signal Processing Unit) 66, and a bus 65 which interconnects the CPU 61 through the SPU 66.

The CPU 61 expands a control program stored in the ROM 62 onto the RAM 63, thereby performing a variety of processes in accordance with reply data transmitted from the non-contact IC card 3 and control signals supplied from the CPU 11 illustrated in FIG. 2. For example, the CPU 61 generates a command to be transmitted to the non-contact IC card 3, and then transfers the command over the bus 65 to output the command to the SPU 66. The CPU 61 further performs an authentication process on data transmitted from the non-contact IC card 3.

The non-contact IC card 3 is placed in proximity, and the CPU 61 is notified of the communication group organizing information through processes of elements. In response to a command from the CPU 21, the CPU 61 notifies the Bluetooth module 20 of the communication group organizing information.

The SCC 64 supplies the CPU 61 with the data supplied from the CPU 11 shown in FIG. 2 and outputs data fed through the bus 65 from the CPU 61 to the CPU 11.

When a demodulator 44 supplies the SPU 66 with reply data from the non-contact IC card 3, the SPU 66 performs a BPSK (Binary Phase Shift Keying) demodulation (decoding of a Manchester code), and supplies resulting data to the CPU 61. When the SPU 66 receives, through the bus 65, a command to be transmitted to the non-contact IC card 3, the SPU 66 subjects the command to a BPSK modulation (coding of a Manchester code), and outputs resulting data to a modulator 42.

The modulator 42 ASK (Amplitude Shift Keying) modulates a carrier of a predetermined frequency (13.56 MHz, for example) supplied from an oscillator (OSC) circuit 43 with the data supplied from the SPU 66, and the modulated wave is then output from an antenna 45 in the form of electromagnetic wave. The demodulator 44 demodulates the modulated wave (ASK modulated wave) received through the antenna 45, and outputs demodulated data to the SPU 66.

The antenna 45 emits a predetermined electromagnetic wave, and detects whether one of the non-contact IC card 3 and the non-contact IC card reader/writer 108 of the PDA 2 is in proximity based on a change in the load of the antenna 45. If the non-contact IC card 3 is in proximity, the antenna 45 transmits data to and receive data from the non-contact IC card 3.

Since the non-contact IC card reader/writer 108 of the PDA 2 has the same structure as the reader/writer 19 shown in FIG. 3. Hereinafter, the CPU of the reader/writer 19 and the CPU of the non-contact IC card reader/writer 108 are respectively referred to as CPU 61A and CPU 61B. The same is true of the remaining elements in the reference numerals thereof.

Figure 4:
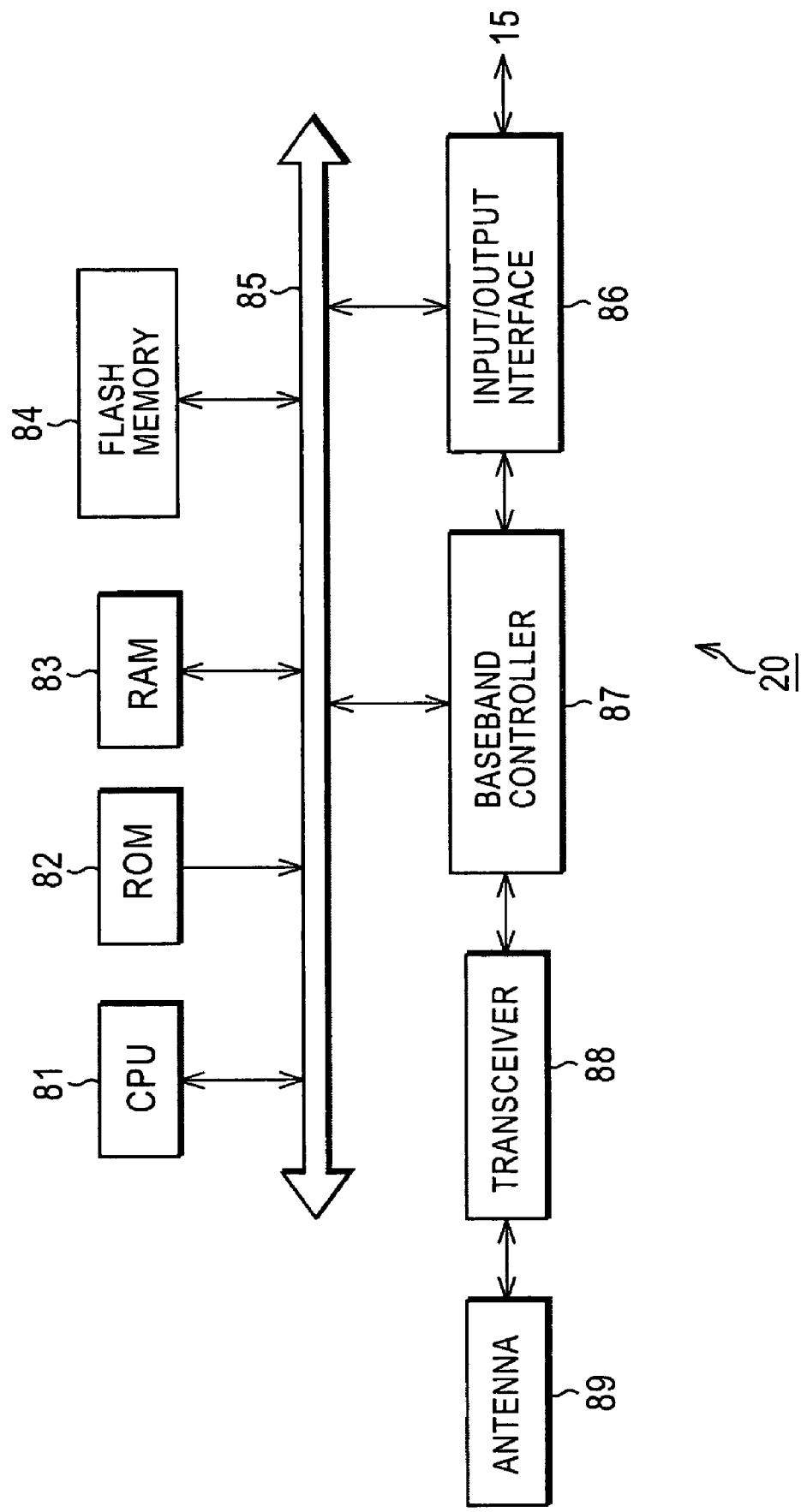
FIG. 4 is a block diagram illustrating the structure of a Bluetooth module of FIG. 2.

FIG. 4 is a block diagram illustrating in detail the structure of the Bluetooth module 20 of FIG. 2.

A CPU 81 expands a control program stored in an ROM 82 onto an RAM 83, thereby generally controlling the Bluetooth module 20. The CPU 81 through the RAM 83 are mutually interconnected through a bus 85, which in turn is connected to a flash memory 84.

The flash memory 84 stores a Bluetooth device name set for a corresponding Bluetooth device, a Bluetooth address unique to a corresponding Bluetooth device, and the like.

The Bluetooth address, which is a 48-bit identifier, is unique (particular) to the corresponding Bluetooth device, and is used various processes relating to the management of the Bluetooth device.

To establish an internal synchronization in the piconet, all slaves must have information relating to a frequency hopping pattern of the master. The frequency hopping pattern is calculated by each slave based on the Bluetooth address of the master.

More specifically, the Bluetooth address includes an LAP (Low Address Part) of lower 24 bits, a UAP (Upper Address Part) of next 8 bits, and an NAP (Non-significant Address Part) of remaining 16 bits. All 24 bits of the entire LAP and lower 4 bits of the UAP, namely, a total of 28 bits is used to calculate the frequency hopping pattern.

Each slave calculates the frequency hopping pattern based on the above mentioned 28 bit portion of the Bluetooth address acquired through "paging" for establishing the piconet synchronization, or the Bluetooth address of the master acquired as the communication group organizing information from the reader/writer 19, and a Bluetooth clock also reported by the master.

Returning to FIG. 4, the flash memory 84 stores a link key used to authenticate the Bluetooth device of a communication partner subsequent to the establishment of the internal piconet synchronization, and to encrypt data to be transmitted. The link key is supplied to the CPU 81, as necessary.

In response to a command from the CPU 81, the input/output interface 86 manages the input and output of data supplied from the CPU 11 shown in FIG. 1, and data supplied from a baseband controller 87.

The baseband controller 87 performs a variety of control processes including the control of a transceiver 88, the control of link, the control of packets, the control of logical channels, and the control of security, and performs processes including an error correction process, a decoding process, and a randomization of data. The baseband controller 87 converts data supplied from the input/output interface 86 into an analog signal, and outputs the analog signal to the transceiver 88. On the other hand, the baseband controller 87 converts a signal supplied from the transceiver 88 into digital data, and outputs the digital data to the input/output interface 86.

The transceiver 88 includes a GFSK (Gaussian Frequency Shift Keying) modulator, a GFSK demodulator, a spread spectrum unit, a despread spectrum unit, a hopping synthesizer, etc. The transceiver 88 performs various processes on a signal supplied from the baseband controller 87, and outputs a resulting signal to an antenna 89. The transceiver 88 performs various processes on a signal supplied from the antenna 89 and outputs a resulting signal to the baseband controller 87.

The GFSK modulator forming the transceiver 88 limits a high frequency component of the data supplied from the baseband controller 87 through a filter, performs a frequency modulation in a primary modulation, and outputs resulting data to the spread spectrum unit. The spread spectrum unit switches a carrier frequency in accordance with the frequency hopping pattern calculated as already described, and reported by the hopping synthesizer. After spreading the supplied data in spectrum, the spread spectrum unit outputs a resulting signal to the antenna 89. In the Bluetooth communication, the spread spectrum unit hops frequency every 625 µs before the transmission of the data.

The despread spectrum unit forming the transceiver 88 hops a received frequency in accordance with the frequency hopping pattern reported by the hopping synthesizer, and thus acquires the signal transmitted from the PDA 2. The despread spectrum despreads an acquired signal in frequency spectrum to reproduce the signal from the PDA 2, and outputs the resulting signal to the GFSK demodulator. The GFSK demodulator GFSK demodulates the signal supplied from the despread spectrum unit, and outputs the resulting data to the baseband controller 87.

The transceiver 88 transmits a spread spectrum signal in a 2.4 GHz band through the antenna 89. The transceiver 88 outputs a signal received through the antenna 89 to the despread spectrum unit.

The Bluetooth module 109 of the PDA 2 has the same structure as the Bluetooth module 20 shown in FIG. 4. Hereinafter, the CPU of the Bluetooth module 20 and the CPU of the Bluetooth module 109 are respectively referred to as a CPU 81A and a CPU 81B. The same is true of the remaining elements in the reference numerals thereof.

Figure 5:
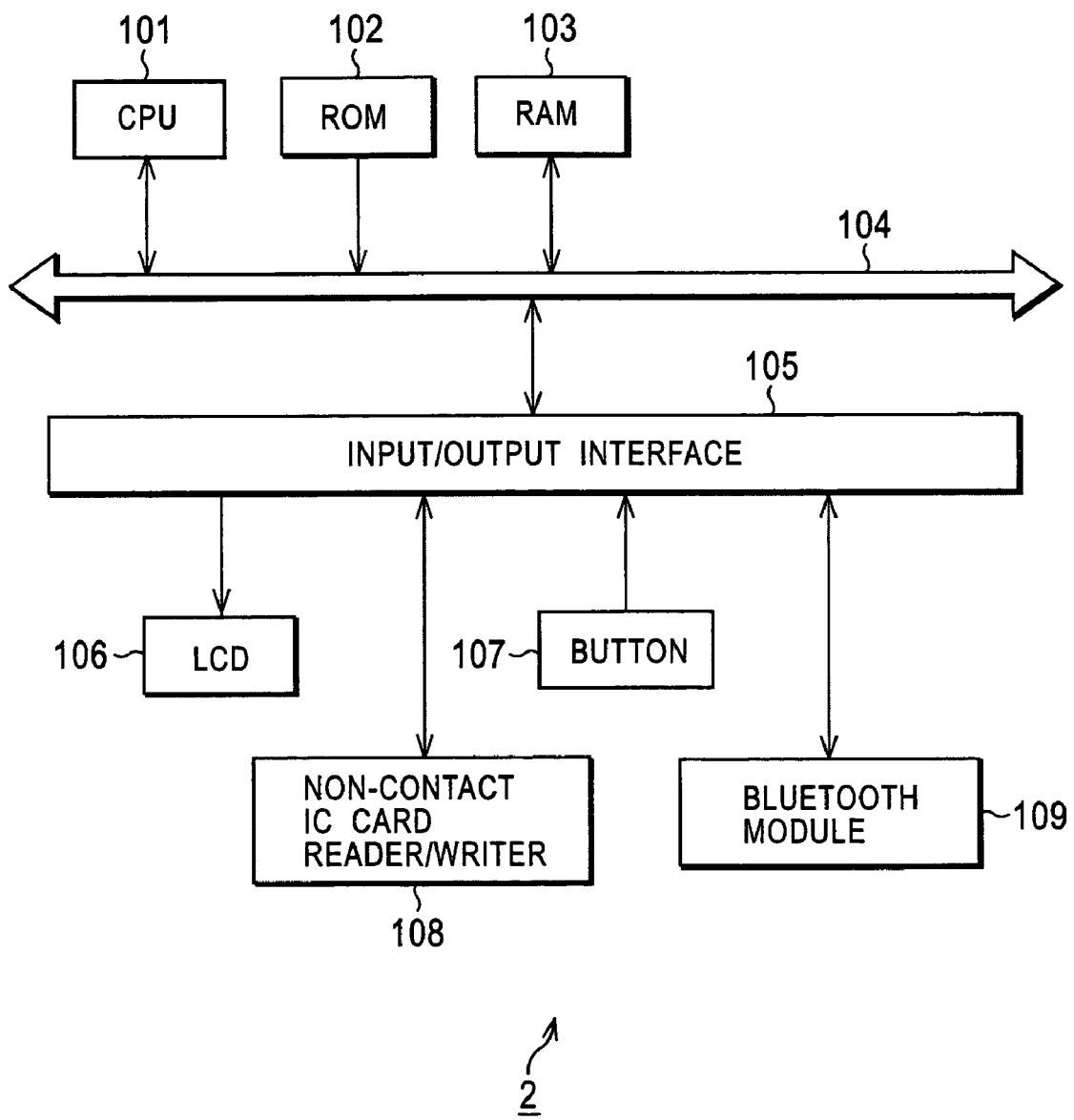
FIG. 5 is a block diagram illustrating the structure of a PDA of FIG. 1.

FIG. 5 is a block diagram illustrating the structure of the PDA 2 of FIG. 1.

Since the CPU 101 through the Bluetooth module 109 are respectively basically identical in structure to the CPU 11 through the Bluetooth module 20 in the personal computer 1 shown in FIG. 2, the detailed discussion thereof is omitted here.

The non-contact IC card reader/writer 108 (hereinafter referred to as the reader/writer 108 as necessary) emits the electromagnetic wave with a predetermined period in response to an instruction from the user to detect one of the non-contact IC card 3 and the reader/writer 19 of the personal computer 1. When the PDA 2 detects the non-contact IC card 3 in proximity thereto, the PDA 2 communicates with the non-contact IC card 3 using the electromagnetic wave. The communication group organizing information acquired by the reader/writer 108 is output to the Bluetooth module 109.

Figure 6:
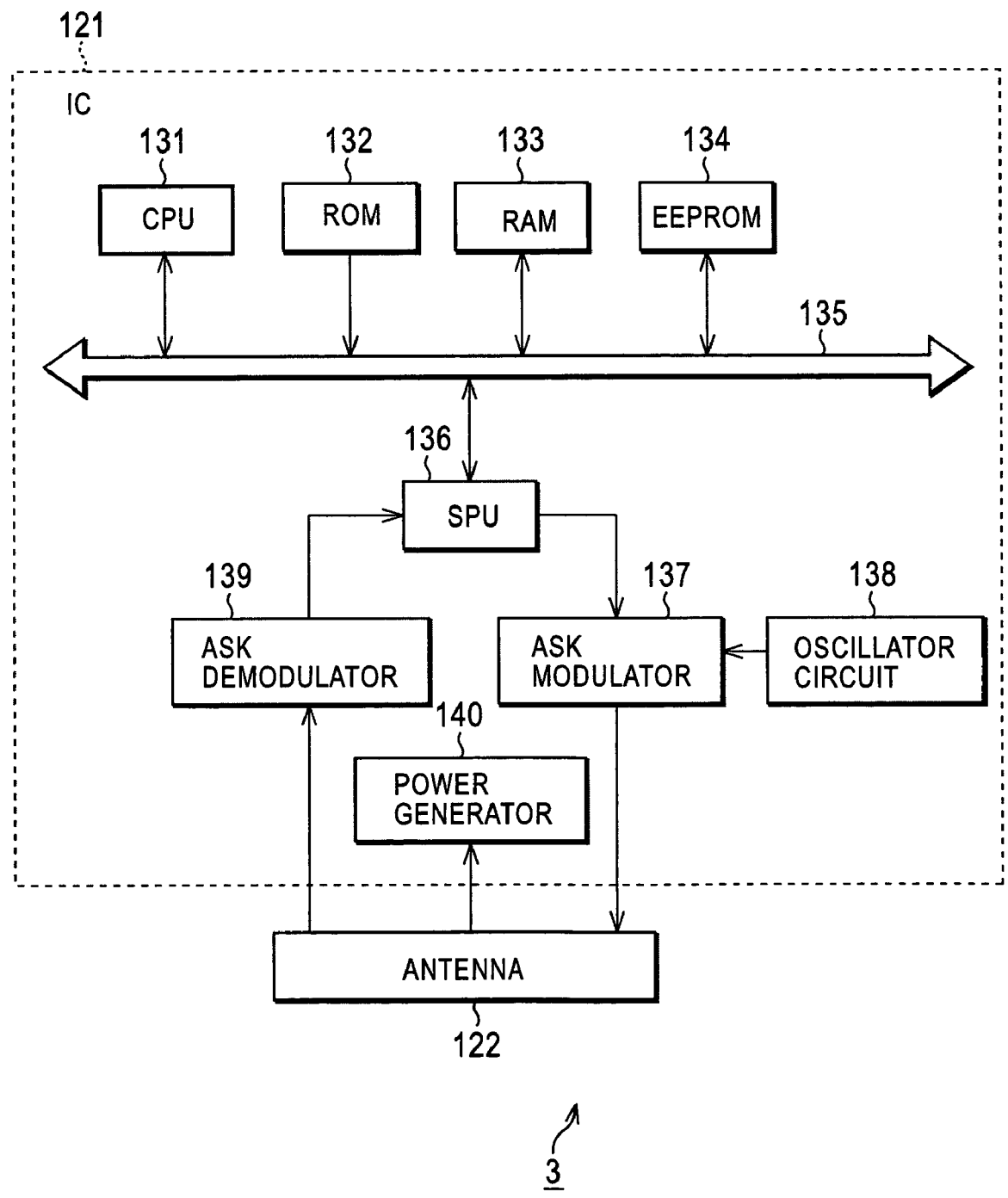
FIG. 6 is a block diagram illustrating the structure of a non-contact IC card of FIG. 1.

FIG. 6 is a block diagram illustrating the structure of the non-contact IC card 3 of FIG. 1.

The non-contact IC card 3 includes an illustrated antenna (a loop antenna) 122, and an IC 121, namely, a one-chip IC into which the remaining elements are packaged. Using electromagnetic induction, the non-contact IC card 3 exchanges a variety of data with the reader/writer 19 of the personal computer 1 in a half-duplex communication, for example.

The non-contact IC card 3 is a term used for convenience of explanation, and is intended to represent a module having the functions as already discussed and functions to be discussed later. The non-contact IC card 3 is not limited to the one having a card-like shape. The non-contact IC card 3 may be a sticker having an adhesive back surface, or may be embedded in a front surface or a back surface of a sheet of paper. For example, available as having substantially the same function as the non-contact IC card 3 is Felica™.

A CPU 131 expands a control program stored in an ROM 132 onto an RAM 133, and generally controls the operation of the non-contact IC card 3. When the antenna 122 receives the electromagnetic wave emitted from the reader/writer 19 in the personal computer 1, the CPU 131 notifies in response the reader/writer 19 of the communication group organizing information set in an EEPROM (Electrically Erasable and Programmable Read Only Memory) 134.

The communication group organizing information stored in the EEPROM 134 is modified by the reader/writer at will. A modification to the communication group organizing information may be accepted from the outside conditional on a predetermined authentication.

In case the data demodulated by an ASK demodulator 139 is BPSK modulated data, an SPU 136 demodulates the data (decodes a Manchester code) in accordance with a clock signal supplied from an unshown PLL, and as necessary outputs the demodulated data to the CPU 131 and the like through a bus 135.

The SPU 136 BPSK modulates data (codes the data into a Manchester code) coming in through the bus 135, and outputs the modulated data to an ASK modulator 137.

For example, when data such as the communication group organizing information is transmitted to the reader/writer 19, the ASK modulator 137 turns on and off a predetermined switching element in accordance with the data supplied from the SPU 136. Only when the switching element is in an on-state, a load of the antenna 122 is changed by connecting a predetermined load to the antenna 122.

With the load of the antenna 122 changed, the ASK modulator 137 ASK modulates a modulated wave from the reader/writer 19 received through the antenna 122, and transmits the modulated component to the reader/writer 19 via the antenna 122 (with a terminal voltage across the antenna 45 of the reader/writer 19 changed) (load switching method).

The ASK demodulator 139 envelope detects a modulated signal (an ASK modulated signal) received through the antenna 122 for demodulation, and outputs the demodulated data to the SPU 136. In the antenna 122, resonance takes place resulting from the electromagnetic wave at a predetermined frequency emitted from the reader/writer 19.

A power generator 140 rectifies an AC magnetic field excited at the antenna 122, regulates the rectified voltage, and feeds the regulated voltage as DC power to various elements. For example, power of the electromagnetic wave emitted from the reader/writer 19 is adjusted to cause a magnetic field strong enough to feed power needed by the non-contact IC card 3.

The operation of the communication system of FIG. 1 will now be discussed.

Figure 7:
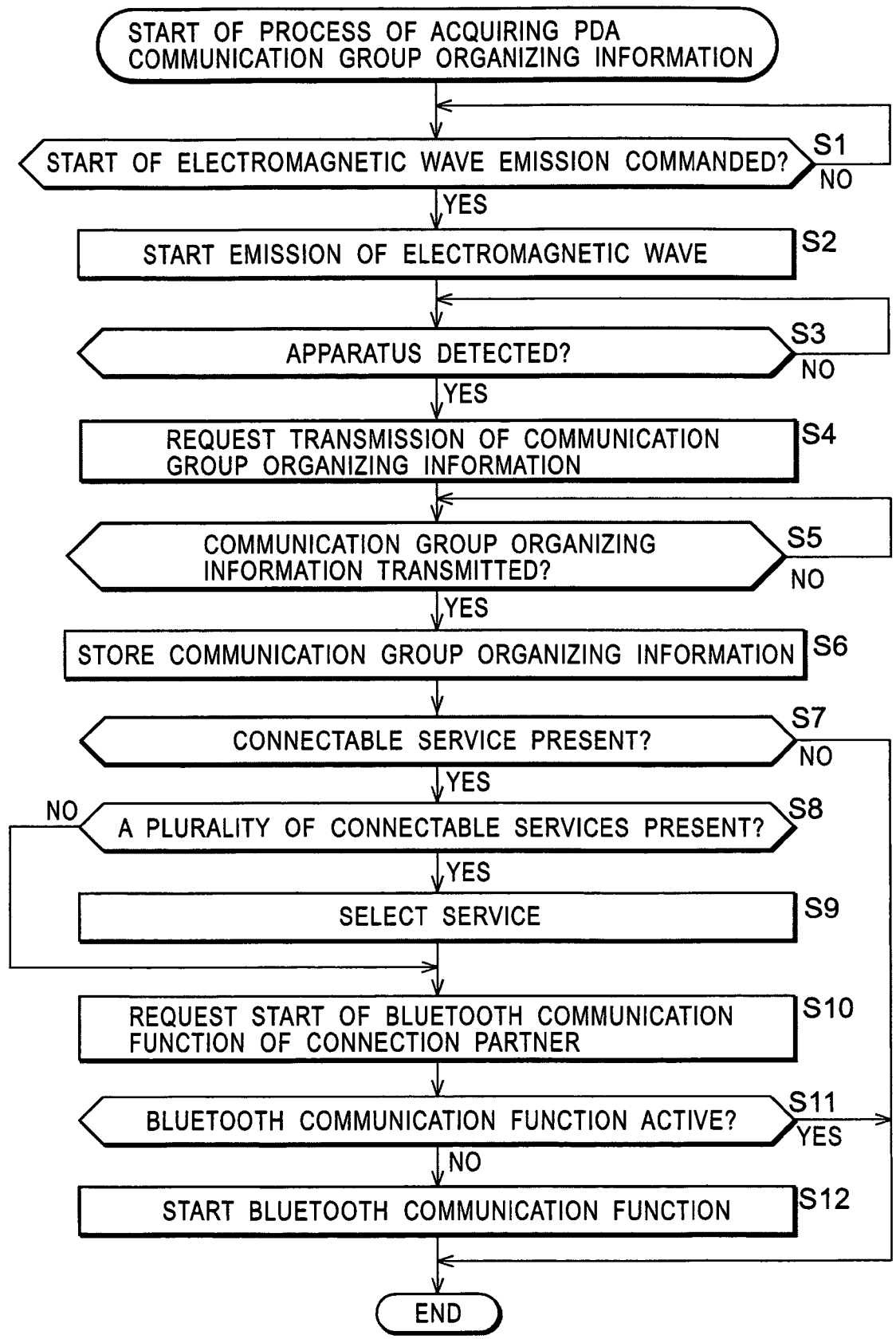
FIG. 7 is a flow diagram illustrating the process of the PDA of FIG. 1.

Referring to a flow diagram shown in FIG. 7, the process of the PDA 2 is discussed. In the process, the PDA 2 acquires the communication group organizing information of the personal computer 1 to start a Bluetooth communication.

In step S1, the CPU 101 of the PDA 2 determines whether the user presses the button 107 to issue a command to start the emission of the electromagnetic wave, and waits on standby until the command is issued. When the CPU 101 determines that the command to emit the electromagnetic wave is issued, the CPU 101 proceeds to step S2. The CPU 101 controls the reader/writer 108 to start emitting the electromagnetic wave. The electromagnetic wave may be emitted continuously or with a predetermined period.

In step S3, the CPU 101 determines, based on the output from the reader/writer 108, whether an apparatus having the reader/writer or the non-contact IC card 3 is detected. The CPU 101 waits on standby until such an apparatus is detected.

For example, the PDA 2 is placed in proximity to the personal computer 1, and the reader/writer 19 in the personal computer 1 receives the electromagnetic wave. Information notifying the PDA 2 of the reception of the electromagnetic wave is sent in reply. Based on the reply, the CPU 101 determines whether the apparatus is detected. If it is determined in step S3 that there is no reply, the process in FIG. 7 may quit after emitting the electromagnetic continuously for a predetermined duration of time or by a predetermined number of times.

If the CPU 101 determines in step S3 that the apparatus is detected, the algorithm proceeds to step S4.

In step S4, the CPU 101 requests the reader/writer 19 in the personal computer 1 to transmit the communication group organizing information. As already described, the communication group organizing information is used to identify the personal computer 1 and to select service when a Bluetooth communication is established.

In response to the output from the reader/writer 108, the CPU 101 determines in step S5 whether the communication group organizing information has been transmitted, and waits on standby until the transmission of the communication group organizing information is transmitted. If the CPU 101 determines in step S5 that the communication group organizing information has been transmitted, the algorithm proceeds to step S6. The CPU 101 stores the communication group organizing information in the RAM 103, for example.

FIG. 8 illustrates an example of the communication group organizing information transmitted by the personal computer 1.

The communication group identification ID indicated in the communication group organizing information shown in FIG. 8 may be a Bluetooth address. The PDA 2 uses the Bluetooth address to identify the personal computer 1 or to manage the frequency hopping pattern, etc. In this example, the Bluetooth address (the communication group identification ID) of the personal computer 1 is "08:00:46:21:39:4 D."

A device class is information indicating the type (device class) of apparatus of the personal computer 1, and is a "personal computer" in FIG. 8. The device classes may be predefined for typically available apparatuses such as a "mobile telephone," "PDA," in addition to the "personal computer."

A device name (a Bluetooth device name) is information which is set to allow the user to identify each apparatus, and is set to any name by the user. In this example, the device name of the personal computer 1 is set to be "VAIE."

The communication group organizing information shown in FIG. 8 contains a pass key prepared beforehand. When apparatuses perform a Bluetooth communication to each other for the first time, it is usually necessary to input the same pass key on the two apparatuses for authentication. In this example, the pass key is contained in the communication group organizing information and is reported to each other. The pass key contained in the communication group organizing information is reported to the apparatus of the communication partner, and the authentication process is performed based on the reported pass key. Even when the user communicates with the apparatus for the first time, the user is freed from the step of inputting the pass key. In this example, the pass key "0123456" is prepared beforehand for the personal computer 1.

A link key is generated with an apparatus with which a Bluetooth communication has already been performed. The link key is stored with the Bluetooth address of that apparatus in association therewith in the personal computer 1. In this example, the link key is KA.

A service database (a service record) is information representing a service that can be currently provided by the personal computer 1. The service record typically contains a plurality of service attributes. Each service attribute contains a combination of a service ID and an attribute value. The attribute ID is set for each attribute name. The content represented by the attribute value and the type of data are associated with the attribute ID. The attribute ID and the attribute name may be commonly used by all profiles defined in the Bluetooth, or may be used for individual profiles. An apparatus providing a service provides an attribute ID and an attribute name as necessary. In the example shown in FIG. 9, service attributes 1 through 3 are described as a service record.

The attribute ID, the attribute value thereof, and the content of information represented by the attribute value are discussed below.

For example, "Service Class ID List" (attribute name) designated by an attribute ID "0x0001" represents a service class to which the service record belongs to. The service class is defined beforehand to identify a particular service. For example, a serial communication, a LAN access by PPP (Point-to-Point Protocol), and a dialup communication are defined.

"Protocol Descriptor List" (attribute name) designated by an attribute ID "0x0004" describes a protocol stack structure used to access a service represented by the corresponding service record.

"Language Base Attribute ID List" (attribute name) designated by an attribute ID "0x0006" is information to support attributes corresponding to a plurality of languages.

"Documentation URL" (attribute name) designated by an attribute ID "0x000A" represents a URL of a document of a service expressed by the corresponding service record.

"Service Name" (attribute name) designated by an attribute ID "0x0000+ attribute ID base" represents a character string showing the name of a service expressed by the corresponding service record. The attribute ID base is information contained in the above-mentioned "Language Base Attribute ID List", and is compatible with a plurality of languages.

"Service Description" (attribute name) designated by an attribute ID "0x0001+ attribute ID base" is a character string containing a brief description of the service.

Among these pieces of information, the "Service Class ID List" designated by the attribute ID "0x0001", the "Language Base Attribute ID List" designated by the attribute ID "0x0006", and the "Service Name" designated by the attribute ID "0x0000+ attribute ID base" are contained as communication method information in the communication group organizing information, and are reported from the personal computer 1.

Depending on the service connected through the Bluetooth communication, dynamically changing information such as a channel number must be selected. Such dynamically changing information may be acquired through an SDP (Service Discovery Protocol) defined in the Bluetooth after establishing a communication link.

The number of available connections is information representing the number of apparatuses to which the personal computer 1 is concurrently able to connect (communicate). The PDA 2 having acquired the communication group organizing information shown in FIG. 8 checks the value here to determine whether the PDA 2 is currently connectable to the personal computer 1. In this example, six more apparatuses are connectable to the personal computer 1 in addition to the one currently communicating with the personal computer 1. The value is decremented by one each time one apparatus is connected to the personal computer 1.

An effective connection time is information representing a time slot within which the personal computer 1 remains connectable. In this example, the personal computer 1 remains connectable with a duration from 0 hour 0 minute to 12 hours 0 minute Japanese Standard Time (JST).

A connectable device is information indicating a device class connectable to the personal computer 1. In this example, the "personal computer" is a first device class, the "PDA" is a second device class, and the "mobile telephone" is a third device class.

URL (Uniform Resource Locator) is information designating a WWW (World Wide Web) page that describes detailed information of the personal computer 1. The user of the PDA 2 obtains the communication group organizing information shown in FIG. 8, and checks the WWW page designated by the URL. The user thus views detailed information about services provided by the personal computer 1.

The WWW page designated by the URL in the communication group organizing information may serve as a page on which a variety of operations is performed to the personal computer 1. For example, viewing this page, the user of the PDA 2 may check the current status and the usage of the personal computer 1.

The PDA 2 may request the personal computer 1 to transmit all pieces of the transmission of the communication group organizing information at a time or transmit separately individual pieces of the communication group organizing information.

Returning to the discussion with reference to FIG. 7, the CPU 101 stores, in the RAM 103, the communication group organizing information provided by the personal computer 1. The CPU 101 verifies the communication group organizing information to determine in step S7 whether there is a service connectable through the Bluetooth module 109. More specifically, the CPU 101 checks the service record of the communication group organizing information illustrated in FIG. 8 against a service provided by the PDA 2 for a match. The CPU 101 thus determines whether there is a connectable service.

If the CPU 101 determines in step S7 that there is no connectable service with the personal computer 1, the algorithm ends. When the communication group organizing information containing a diversity of pieces of above-referenced information is reported, the algorithm ends if the number of available connections is zero or if current time is not within the effective connection time. In the PDA 2, thus, connectable apparatuses are limited in accordance with the communication group organizing information. This arrangement controls the establishment of a communication with an unintended apparatus, and a higher quality communication environment is realized.

If the CPU 101 determines in step S7 that there is a connectable service, the algorithm proceeds to step S8.

It is now assumed that the PDA 2 desires to communicate at a serial communication service having a service name of "Feel", and that the service record reported from the personal computer 1 describes "Service Class ID: 0x1101 (serial communication service)", and "Service Name: Feel", the CPU 101 then determines that there is a connectable service.

The CPU 101 in step S8 determines whether there are a plurality of services connectable to the personal computer 1. If the CPU 101 determines in step S8 that there are a plurality of services connectable to the personal computer 1, the algorithm proceeds to step S9 to select a service to connect. The service record discussed above is reported, and the CPU 101 selects the serial communication service of "Service Name: Feel" as a service to connect.

If the services provided by the Bluetooth module 109 permit priority setting, the CPU 101 may select a service with the highest priority set thereon from among a plurality of services provided by the personal computer 1 in accordance with the reported service record. For example, the personal computer 1 provides a serial communication service and a file transfer service with the highest priority placed on the serial communication service from among a plurality of services available from the Bluetooth module 109. The CPU 101 then selects the serial communication service as a service to use.

The CPU 101 references the history of services used by the Bluetooth module 109, and finds that the CPU 101 communicated with the personal computer 1 through the Bluetooth communication in the past. The most frequently used service with the personal computer 1 or the latest service used may be selected from the services available from the personal computer 1. Alternatively, the services available from the personal computer 1 may be presented to the user for selection.

If it is determined in step S8 that no plurality of connectable services are present (a single connectable service is present), the CPU 101 selects that service as a service to use. The algorithm proceeds to step S10.

In step S10, the CPU 101 controls the reader/writer 108, thereby requesting the personal computer 1 to start the function of the Bluetooth communication. Upon receiving the request through the reader/writer 19, the personal computer 1 activates the Bluetooth module 20 and a program controlling the Bluetooth module 20.

In step S11, the CPU 101 determines whether the Bluetooth communication function of the PDA 2, namely, the Bluetooth module 109 and a program controlling the Bluetooth module 109 are active. If the CPU 101 determines that the Bluetooth module 109 and the control program are active, the algorithm ends. If the CPU 101 determines that the Bluetooth module 109 and the control program are not active, the algorithm proceeds to step S12. In step S12, the CPU 101 supplies power to and activates the Bluetooth module 109. The CPU 101 expands a control program stored in the ROM 102 onto the RAM 103. The acquisition process of the communication group organizing information is thus completed. As will be discussed later, the Bluetooth communication is established based on the communication group organizing information.

Since the Bluetooth communication function is activated at the timing of the transmission and the reception of the communication group organizing information, power consumption is reduced.

Figure 9:
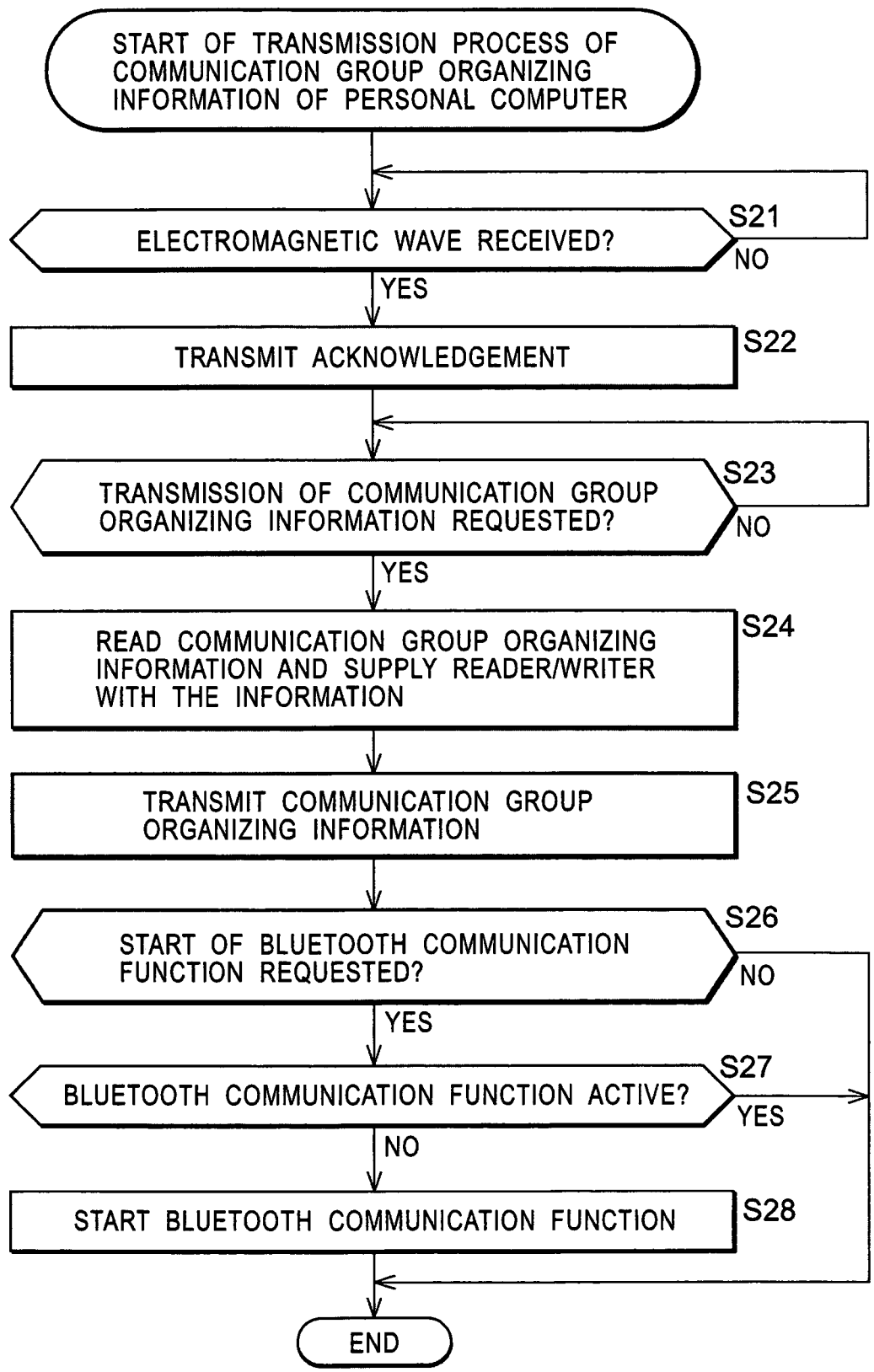
FIG. 9 is a flow diagram illustrating a process of the personal computer of FIG. 1.

The process of the personal computer 1 which provides the communication group organizing information in response to the process of the PDA 2 shown in FIG. 7 will be discussed with reference to a flow diagram illustrated in FIG. 9.

In response to the output from the reader/writer 19, the CPU 11 in the personal computer 1 determines in step S21 whether the personal computer 1 has received the electromagnetic wave emitted from the PDA 2, and waits on standby until the electromagnetic wave is received. If the CPU 11 determines that the electromagnetic wave has been received, the algorithm proceeds to step S22. The CPU 11 transmits, to the PDA 2, an reception acknowledgement acknowledging the reception of the electromagnetic wave by controlling the reader/writer 19.

In response to the output from the reader/writer 19, the CPU 11 determines in step S23 whether or not the transmission of the communication group organizing information is requested. The CPU 11 waits on standby until it is determined that the transmission of the communication group organizing information is requested. If the CPU 11 determines in step S23 that the transmission of the communication group organizing information has been requested, the algorithm proceeds to step S24. The CPU 11 reads the communication group organizing information stored in the storage 18 and illustrated in FIG. 8 and supplies the reader/writer 19 with the read communication group organizing information. The communication group organizing information may be stored in the RAM 63 in the reader/writer 19. The dynamically changing information such as the service database and the number of available connections may be updated at this timing. The pass key may be set at random and may be reported to the PDA 2.

In step S25, the CPU 11 controls the reader/writer 19, thereby transmitting the communication group organizing information to the PDA 2.

In accordance with the output from the reader/writer 19, the CPU 11 determines in step S26 whether the start of the Bluetooth communication function has been requested. If the CPU 11 determines that the start of the Bluetooth communication function has not been requested, the algorithm ends. As described above, the PDA 2, which has received the communication group organizing information, requests the start of the Bluetooth communication function.

If the CPU 11 determines in step S26 that the start of the Bluetooth communication function has been requested, the algorithm proceeds to step S27. The CPU 11 determines whether the Bluetooth communication function has been started, in other words, whether the Bluetooth module 20 and a program controlling the Bluetooth module 20 are active. If the CPU 101 determines that the Bluetooth communication function has been started, the algorithm ends. If the CPU 101 determines that the Bluetooth communication function has not been started, the algorithm proceeds to step S28. Power is then supplied to the Bluetooth module 20 and the program for controlling the Bluetooth module is expanded onto the RAM 13.

Figure 10:
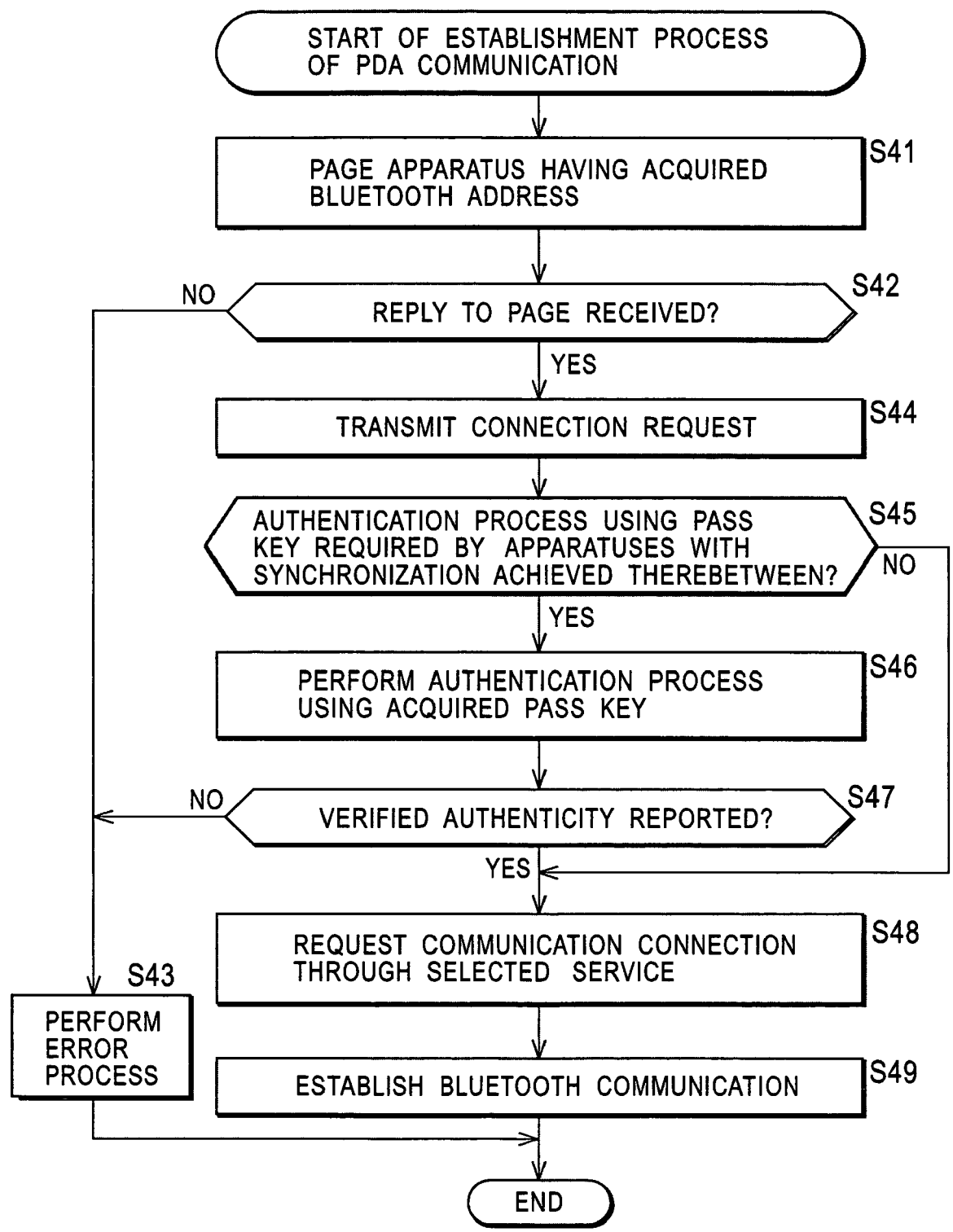
FIG. 10 is a flow diagram illustrating another process of the PDA of FIG. 1.

The process of the PDA 2 is discussed below with reference to a flow diagram illustrated in FIG. 10. In the process, the PDA 2 acquires the communication group organizing information, and then establishes the Bluetooth communication based on the acquired communication group organizing information. The process illustrated in FIG. 10 is performed in succession to the process illustrated in FIG. 7.

In step S41, the CPU (CPU 81B) in the Bluetooth module 109 requests an apparatus having an acquired Bluetooth address to execute a "paging" in response to a command from the CPU 101. More specifically, the communication group organizing information acquired from the personal computer 1 in the process illustrated in FIG. 7 has already been supplied to the Bluetooth module 109 when the Bluetooth module 109 is activated. This "paging" is a process intended to request to start the Bluetooth communication with a particular Bluetooth device designated, and a process intended to transmit and receive a variety of pieces of information to establish synchronization.

In other words, the personal computer 1 and the PDA 2 mutually exchange attribute information (FHS packets) of their own, and a synchronization in a frequency axis and a synchronization in a time axis are established based on the exchanged attribute information. For example, the attribute information of the PDA 2 contains the Bluetooth address and the Bluetooth clock of the Bluetooth module 109.

The paging transmitted in step S41 may contain the attribute information of the PDA 2, and the personal computer 1, which has received the paging, may establish the synchronization based on the Bluetooth address of the PDA 2.

In step S42, the CPU 81B determines whether a reply to the "paging" transmitted from the Bluetooth module 20 in the personal computer 1 has been received. If the CPU 81B determines that the reply has not been received yet, the algorithm proceeds to step S43. After performing an error process, the CPU 81B ends the process. If the CPU 81B determines that the reply to the "paging" transmitted from the Bluetooth module 20 in the personal computer 1 has been received, the algorithm proceeds to step S44. The CPU 81B places a connection request to the personal computer 1.

The CPU 81B determines in step S45 whether a pass key authentication process is required with an apparatus with the synchronization established in the "paging", namely, the personal computer 1. If the CPU 81B determines in step S45 that the pass key authentication process is required, the algorithm proceeds to step S46.

In step S46, the CPU 81B performs the authentication process using the pass key contained in the communication group organizing information. The pass key is reported from the personal computer 1. The authentication process using the same pass key is performed in the personal computer 1 as well.

When the authentication is successfully completed in the personal computer 1, a notification of verified authenticity is issued. The CPU 81B determines in step S47 whether the notification of verified authenticity has been reported. If the CPU 81B determines that no notification of verified authenticity has been reported, the algorithm proceeds to step S43. After completing an error process, the CPU 81B ends the algorithm. If the CPU 81B determines that the notification of verified authenticity has been reported, the algorithm proceeds to step S48.

If the CPU 81B determines in step S45 that the pass key authentication process is not required, the algorithm proceeds to step S48, skipping steps S46 and S47. Depending on the setting of the apparatuses, the pass key authentication is not required.

In step S48, the CPU 81B requests the personal computer 1 to connect thereto through a selected service. When the serial communication service is selected as a service to connect in step S9 shown in FIG. 8, the CPU 81B acquires a server channel number (for example, Server Channel Number: 1) in an RFCOMM layer of the personal computer 1 using the SDP, and requests a connection through the acquired channel number. If the selected service is a PAN (Personal Area Network) service, which does not contain a dynamically changing attribute, such as a server channel number, the CPU 81B may request a connection based on the communication group organizing information without using the SDP.

The Bluetooth communication is established in step S49.

Figure 11:
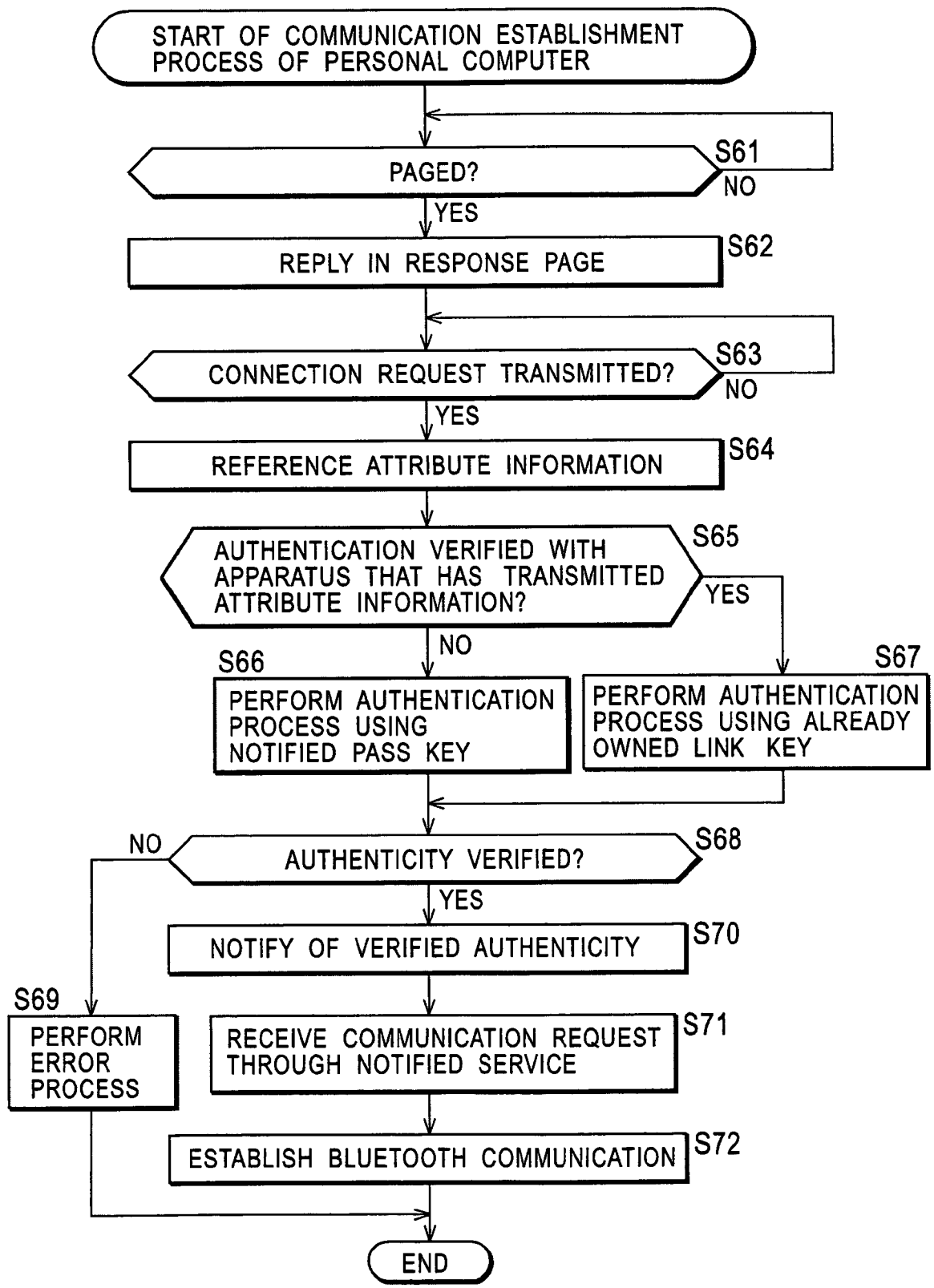
FIG. 11 is a flow diagram illustrating another process of the personal computer of FIG. 1.

Referring to a flow diagram shown in FIG. 11, the process of the personal computer 1 will now be discussed. In the process, the personal computer 1 establishes a Bluetooth communication after providing the communication group organizing information. The process illustrated in FIG. 11 is performed in succession to the process illustrated in FIG. 9.

In step S61, the CPU 81A in the Bluetooth module 20 determines whether the PDA 2 has issued a "paging". The CPU 81A waits on standby until it determines that the PDA 2 has issued the paging. If the PDA 2 determines in step S61 that the PDA 2 has issued the paging, the algorithm proceeds to step S62. The CPU 81A replies to the paging by transmitting the attribute information thereof to the PDA 2, thereby establishing the synchronization with the PDA 2.

More specifically, the CPU 81A establishes the synchronization in the frequency axis by calculating the frequency hopping pattern based on the Bluetooth address of the PDA 2.

At the same time, the CPU 81A establishes the synchronization in the time axis by offsetting the Bluetooth clock, managed by the CPU 81A itself, based on the Bluetooth clock of the PDA 2.

The CPU 81A determines in step S63 whether the PDA 2 sends a connection request, and waits on standby until the PDA 2 sends the connection request. If the CPU 81A determines in step S63 that the PDA 2 has sent the connection request, the algorithm proceeds to step S64. The CPU 81A references the attribute information transmitted together with the paging, and checks the Bluetooth address contained in the attribute information.

In step S65, the CPU 81A determines the presence or absence of a link key based on the checked Bluetooth address, and determines whether the pass key authentication has already been verified with the apparatus, which has transmitted the attribute information, namely, the PDA 2. If it is determined that the pass key authentication has been verified, a link key generated on the pass key is stored with the Bluetooth address of the authenticated partner apparatus associated therewith in the authentication process.

If the CPU 81A determines in step S65 that no authentication process has been performed with the PDA 2 (a communication with the PDA 2 is performed for the first time), the algorithm proceeds to step S66. The CPU 81A performs the authentication process using the same pass key as the one reported as the communication group organizing information to the PDA 2.

In step S68, the CPU 81A determines whether the authentication is successfully completed. If the authentication is not successful, the CPU 81A performs an error process, and ends the process of the personal computer 1.

If the CPU 81A determines in step S68 that the authentication is successfully completed, the algorithm proceeds to step S70. The CPU 81A notifies the PDA 2 of the verified authenticity.

If the CPU 81A determines in step S65 that the authentication using the pass key has been performed with the PDA 2, and that the link key is shared, the algorithm proceeds to step S67. The CPU 81A reads the link key from a flash memory 84A (in the Bluetooth module 20), performs the authentication process using the link key, and then performs subsequent determination processes.

If the CPU 81A receives a request for the Bluetooth communication through the selected service from the PDA 2 in step S71, the algorithm proceeds to step S72. The CPU 81A activates that service, and establishes the communication.

Subsequent to the above process, the PDA 2 has acquired beforehand the Bluetooth address of the personal computer 1 as the communication group organizing information. The PDA 2 directly issues the "paging" to the personal computer 1 and requests the communication to the personal computer 1 without placing a so-called "inquiry" in the process illustrated in FIG. 7. If the PDA 2 has not acquired the Bluetooth address, the PDA 2 must detect apparatuses present in the surrounding area, and must place an "inquiry" to receive the Bluetooth address, etc., from these apparatuses.

Even if there are a plurality of Bluetooth devices in the surrounding area, the PDA 2 can issue the "paging" without being notified of information relating to the Bluetooth devices other than the personal computer 1, and reduces time required to establish synchronization.

A pass key, which is required to perform a first communication with one apparatus, is reported as the communication group organizing information to the PDA 2. Each of the personal computer 1 and the PDA 2 performs the authentication process using the same pass key. Even when the user of the PDA 2 communicates with the personal computer 1 for the first time, an operation to input the pass key to each of the two apparatuses is skipped.

The communication group organizing information containing information relating to available services is reported to the PDA 2 and is then selected according to priority. The user is freed from an operation to select service.

The user of the PDA 2 easily and quickly starts the Bluetooth communication by simply placing the PDA 2 in proximity to the personal computer 1.

In the above discussion, the reader/writer 108 in the PDA 2 emits the electromagnetic wave, and the reader/writer 19 in the personal computer 1, having receiving the electromagnetic wave, provides the communication group organizing information. Conversely, the reader/writer 19 in the personal computer 1 may emit the electromagnetic wave, and the reader/writer 108 in the PDA 2, having received the electromagnetic wave, may provide the personal computer 1 with the communication group organizing information. In this case, the personal computer 1, having received the communication group organizing information of the PDA 2, issues the "paging" and the like in accordance with the Bluetooth address of the PDA 2 contained in the communication group organizing information, and establishes the Bluetooth communication with the PDA 2.

Another process of the PDA 2 will now be discussed with reference to a flow diagram illustrated in FIG. 12. In the process, the PDA 2 establishes a Bluetooth communication subsequent to the acquisition of the communication group organizing information.

Figure 12:
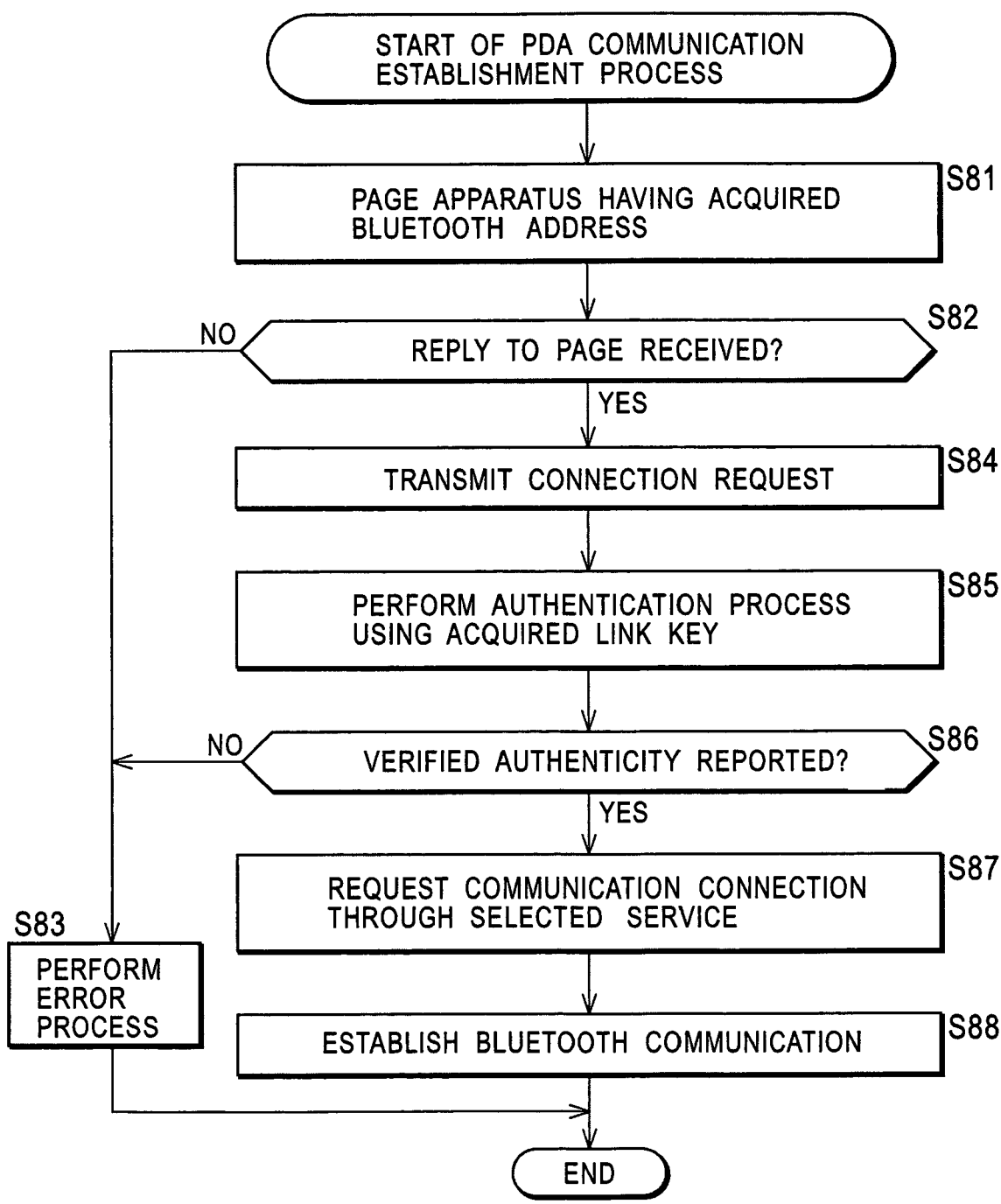
FIG. 12 is a flow diagram illustrating yet another process of the PDA of FIG. 1.

The process illustrated in FIG. 12 is substantially identical to the process illustrated in FIG. 10. The difference between the two processes is that the PDA 2 uses a link key rather than the pass key reported as the communication group organizing information.

The CPU 81B of the Bluetooth module 109 issues the "paging" and establishes the synchronization with the personal computer 1. In step S85, the CPU 81B performs an authentication process using the link key reported as the communication group organizing information.

When the personal computer 1 has successfully completed the authentication process, and has reported the verified authenticity to the PDA 2, the CPU 81B notifies the personal computer 1 of the service to be used, and establishes the Bluetooth communication.

Figure 13:
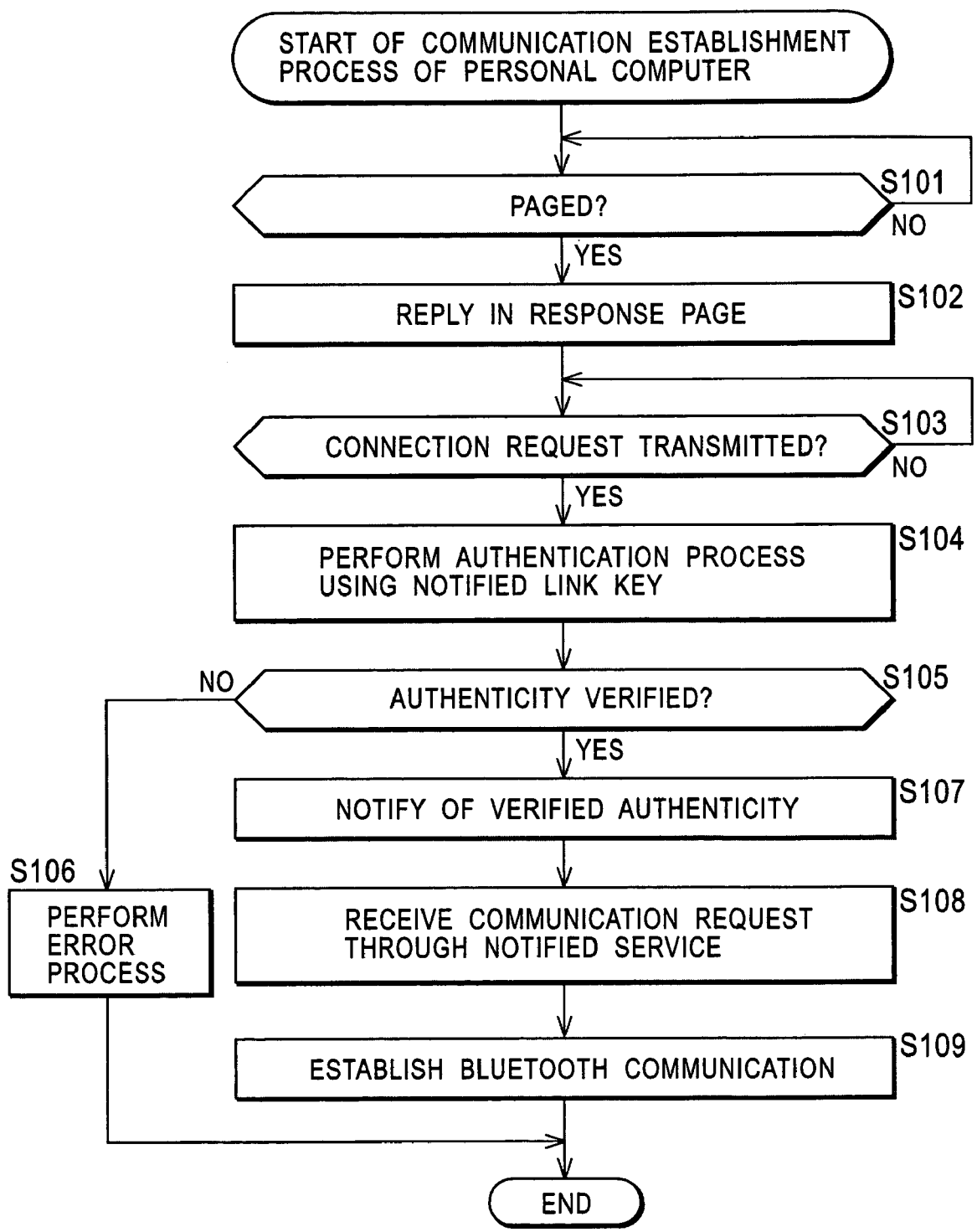
FIG. 13 is a flow diagram illustrating yet another process of the personal computer of FIG. 1.

FIG. 13 is a flow diagram illustrating yet another process of the personal computer 1 of FIG. 1. In the process, the personal computer 1 establishes the Bluetooth communication subsequent to the supply of the communication group organizing information.

Figure 14:
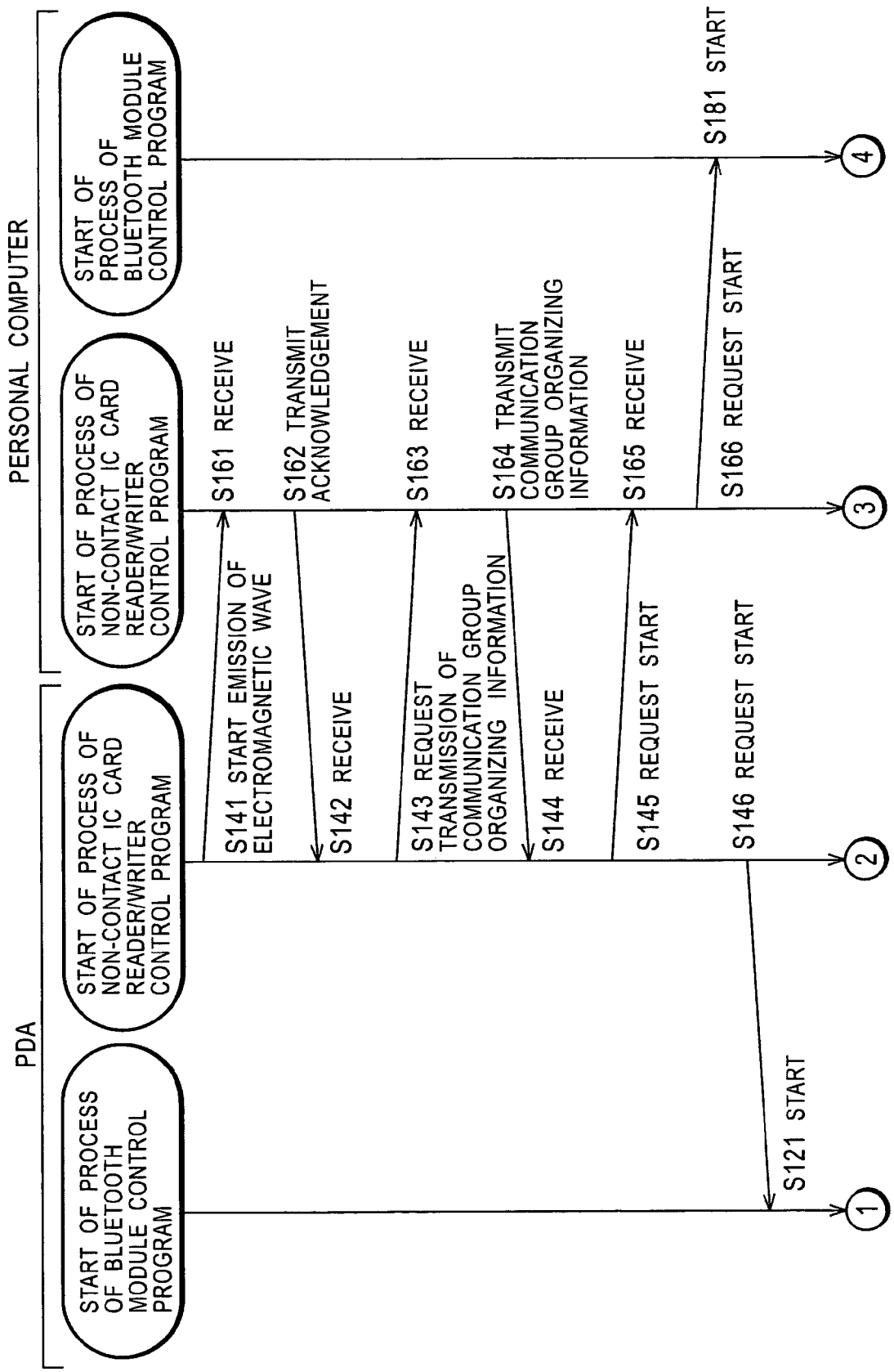
FIG. 14 is a flow diagram illustrating a process of the communication system of FIG. 1.

The process illustrated in FIG. 13 is basically identical to the process illustrated in FIG. 14. As in the process of the PDA 2 discussed with reference to FIG. 12, the difference between the two processes is that the PDA 2 uses the link key in the authentication process rather than the pass key reported as the communication group organizing information.

In other words, the CPU 81A in the Bluetooth module 20 issues the "paging" with the PDA 2 and establishes the synchronization in step S102. In step S104, the CPU 81A performs the authentication process using the same link key as the one reported as the communication group organizing information.

When the authentication process is successfully completed, the CPU 81A notifies the PDA 2 of the verified authenticity in step S107. When the CPU 81A receives the notification of a service to be used in step S108, the CPU 81A establishes the Bluetooth communication.

The authentication process is performed using the link key reported as the communication group organizing information. The user of one of the personal computer 1 and the PDA 2 starts easily and quickly the Bluetooth communication by simply placing the personal computer 1 and the PDA 2 in proximity to each other.

Figure 15:
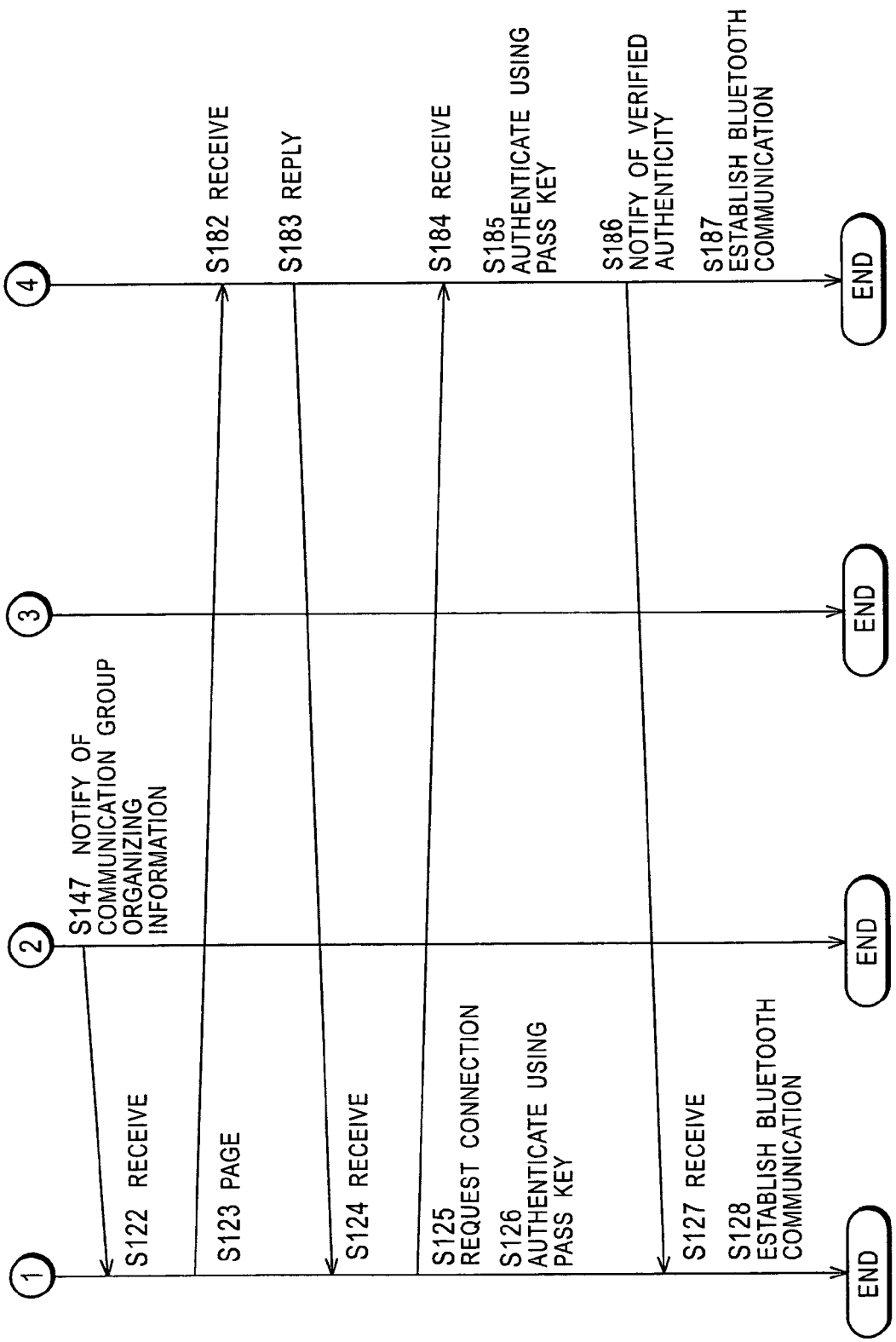
FIG. 15 is a continuation of the flow diagram of FIG. 14, illustrating the process of the communication system of FIG. 1.

A series of processes to establish the communication between the personal computer 1 and the PDA 2 will now be discussed with reference to flow diagrams illustrated in FIGS. 14 and 15. The processes illustrated in FIGS. 14 and 15 are basically identical to those discussed with reference to the processes illustrated in FIGS. 7, 9 through 11.

In step S141, a control program controlling the reader/writer 108 in the PDA 2 (hereinafter also referred to as a reader/writer control program 108A) starts the emission of electromagnetic wave to detect the reader/writer 19 of the personal computer 1.

A control program controlling the reader/writer 19 (hereinafter also referred to as a reader/writer control program 19A) in the personal computer 1 that has received the electromagnetic program in step S161 transmits an acknowledgement to notify the PDA 2 of the reception of the electromagnetic wave in step S162.

The reader/writer control program 108A of the PDA 2 receives the acknowledgement in step S142, and then proceeds to step S143. The reader/writer control program 108A transmits the communication group organizing information to the reader/writer 19.

In step S163, the reader/writer control program 19A in the personal computer 1 receives a request to transmit the communication group organizing information. In step S164, the reader/writer control program 19A transmits the communication group organizing information shown in FIG. 8.

The reader/writer control program 108A of the PDA 2 receives the communication group organizing information in step S144, and requests the personal computer 1 to start the Bluetooth communication function in step S145.

In the personal computer 1, the reader/writer control program 19A receives the start request in step S165, and a control program controlling the Bluetooth module 20 (hereinafter referred to as a Bluetooth module control program 20A as necessary) is started in step S166.

In the PDA 2, a request to start a control program controlling the Bluetooth module 109 (hereinafter referred to as a Bluetooth module control program 109A) is transferred in step S146. In response, the Bluetooth module control program 109A is started in step S121.

The reader/writer control program 108A, which has received the communication group organizing information of the personal computer 1, notifies the Bluetooth module control program 109A of the communication group organizing information in step S147.

The Bluetooth module control program 109A receives the communication group organizing information transferred from the reader/writer control program 108A in step S122, and requests the Bluetooth module control program 20A of the personal computer 1 to issue a "paging" in step S123.

The Bluetooth module control program 20A of the personal computer 1 receives an "inquiry" from the PDA 2 in step S182, and replies to the "inquiry" in step S183.

The Bluetooth module control program 109A of the PDA 2 receives the reply in step S124, and the synchronization is established between the personal computer 1 and the PDA 2. More specifically, attribute information is exchanged in step S123, step S124, step S182, and step S183, and the synchronization is established in the frequency axis and the time axis.

The Bluetooth module control program 109A of the PDA 2 transmits a connection request to the Bluetooth module control program 20A of the personal computer 1 in step S125. The connection request contains information relating to the service selected based on the communication group organizing information.

The Bluetooth module control program 20A of the personal computer 1 receives the connection request containing the information relating to the service in step S184, and performs the authentication process using the same pass key as the one reported as the communication group organizing information to the PDA 2 in step S185.

Similarly, the Bluetooth module control program 109A of the PDA 2 performs the authentication process in step S126.

When the pass key authentication is verified, the Bluetooth module control program 20A of the personal computer 1 notifies the PDA 2 in step S186 of the result that the authentication is verified. The Bluetooth communication is thus established.

The Bluetooth module control program 109A of the PDA 2 receives in step S127 the notification that the authentication is verified, and the Bluetooth communication is established with the personal computer 1 in step S128.

In the above discussion, the Bluetooth module control program 109A of the PDA 2 functions as a master in the Bluetooth communication, and the Bluetooth module control program 20A of the personal computer 1 functions as a slave. The master and slave roles may be changed as appropriate after the synchronization is established.

Figure 17:
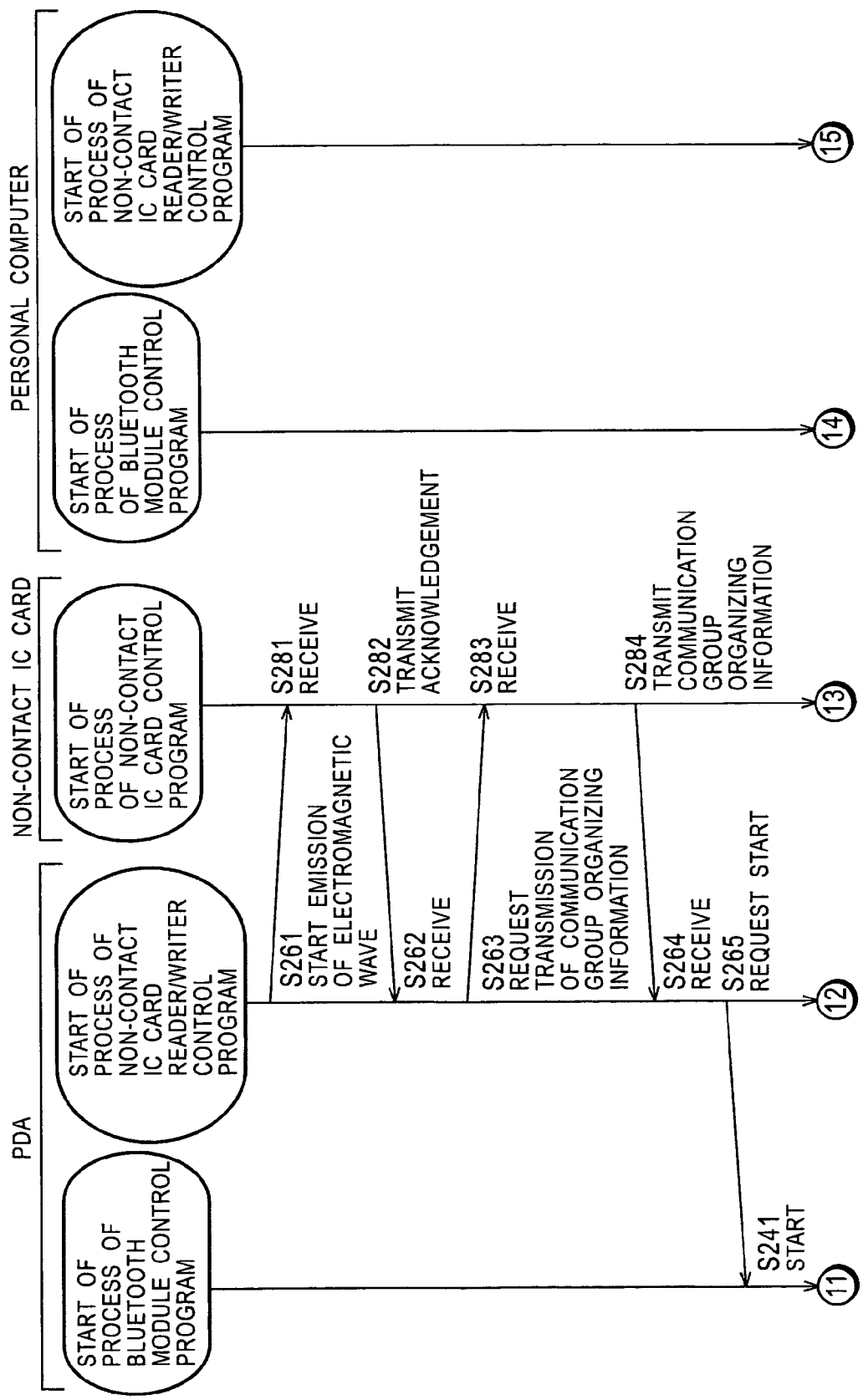
FIG. 17 is a flow diagram illustrating another process of the communication system of FIG. 1.
Figure 18:
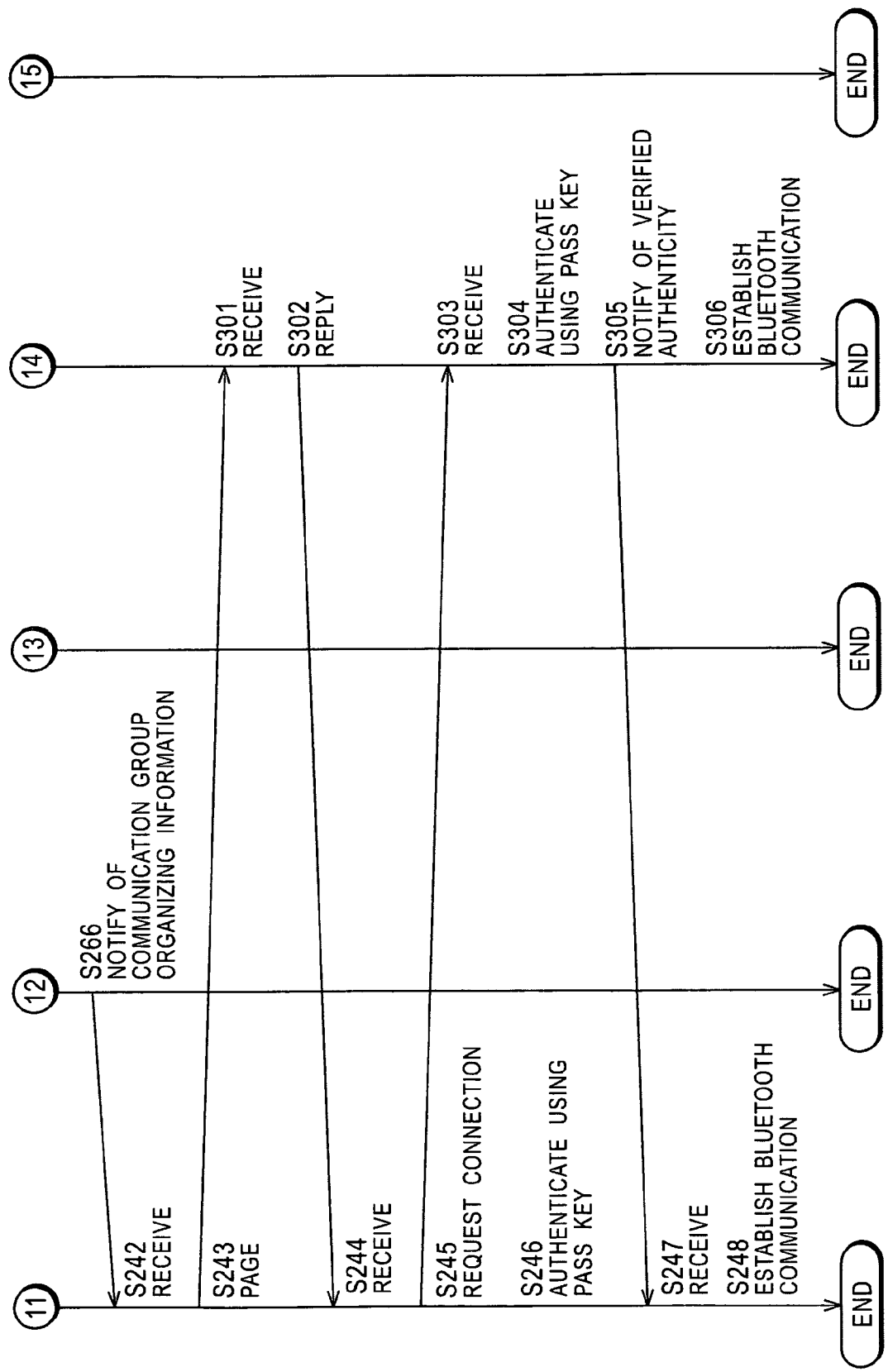
FIG. 18 is a continuation of the flow diagram of FIG. 17, illustrating the other process of the communication system of FIG. 1.

The process of establishing the Bluetooth communication between apparatuses which are designated in the communication group organizing information reported by the non-contact IC card 3 is discussed with reference to flow diagrams illustrated in FIGS. 16 through 18. In this example, the non-contact IC card 3 is placed close to the PDA 2, and the PDA 2 establishes the Bluetooth communication with the personal computer 1 based on the communication group organizing information reported by the non-contact IC card 3.

Figure 16:
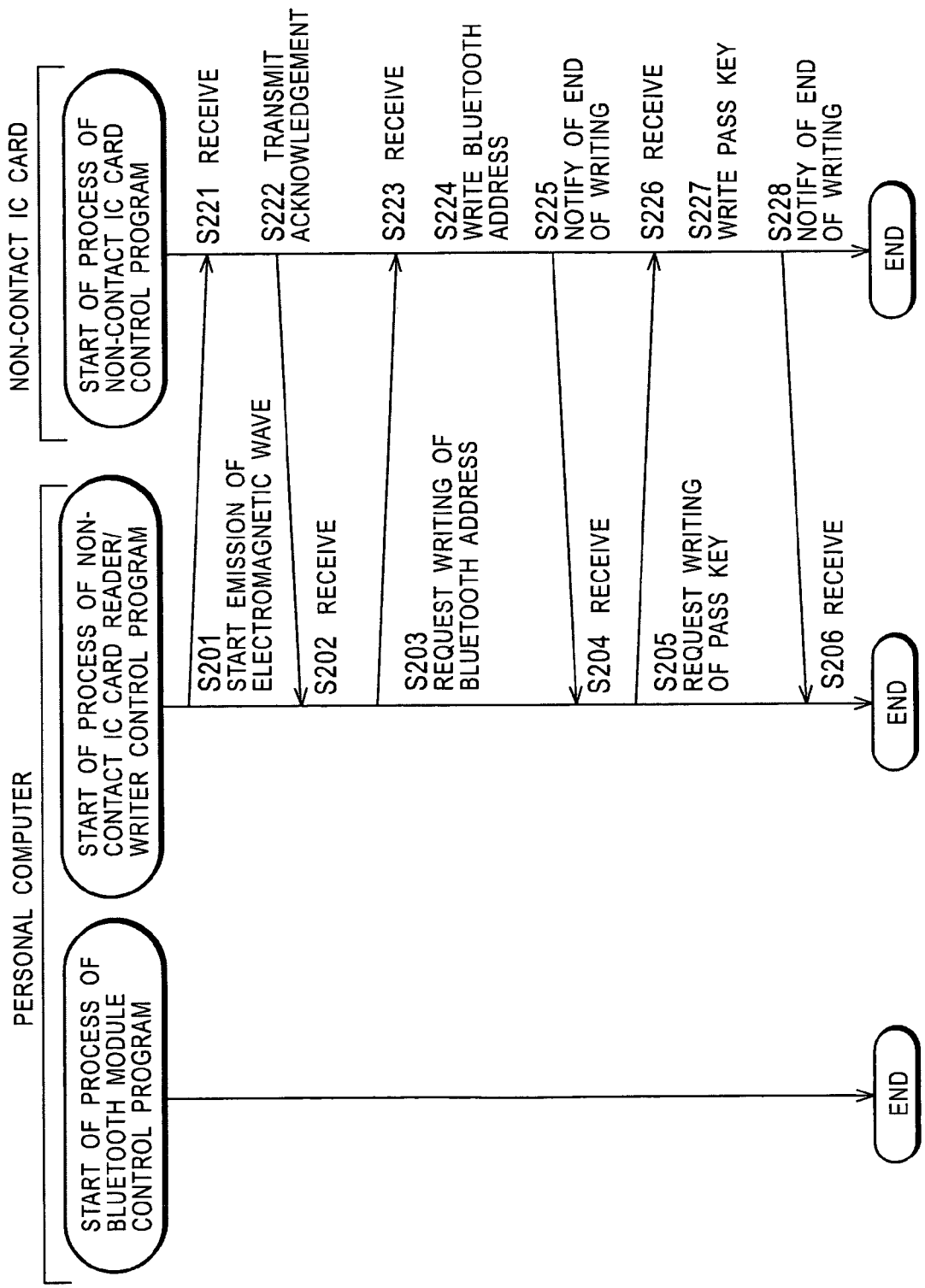
FIG. 16 is a flow diagram illustrating a process performed between the personal computer and the non-contact IC card of FIG. 1.

FIG. 16 is a flow diagram illustrating the process of the personal computer 1. In the process, the personal computer 1 writes the communication group organizing information onto the non-contact IC card 3.

More specifically, the user must operate the personal computer 1 or the like to store the communication group organizing information of the personal computer 1 onto the non-contact IC card 3 before starting the communication between the PDA 2 and the personal computer 1 based on the information read from the non-contact IC card 3.

In step S201, the reader/writer control program 19A of the personal computer 1 emits the electromagnetic wave to detect the non-contact IC card 3.

When the user places the non-contact IC card 3 close to the personal computer 1, a control program controlling the non-contact IC card 3 (hereinafter referred to as a non-contact IC card control program 3A as necessary) receives the electromagnetic wave in step S221, and transmits to the personal computer 1 an acknowledgement notifying the personal computer 1 of the reception of the electromagnetic wave.

The non-contact IC card 3 operates from an electromotive force generated in response to the electromagnetic wave received from the reader/writer 19 in the personal computer 1, and then transmits the acknowledgement.

The reader/writer control program 19A of the personal computer 1 receives the acknowledgement transmitted from the non-contact IC card 3 in step S202, and requests the non-contact IC card 3 to write the Bluetooth address in step S203. The Bluetooth address, the writing of which is requested, is the Bluetooth address of the personal computer 1, and is input by the user through the keyboard 7, for example.

The non-contact IC card control program 3A receives the request to write the Bluetooth address in step S223, and writes the Bluetooth address on the EEPROM 134 for storage in step S224. When the writing of the reported Bluetooth address is completed, the non-contact IC card control program 3A proceeds to step S225. The non-contact IC card control program 3A notifies the personal computer 1 of the end of the writing of the Bluetooth address.

The reader/writer control program 19A of the personal computer 1 receives the end of the writing of the Bluetooth address in step S204. The reader/writer control program 19A requests the non-contact IC card 3 to write the pass key in step S205. The pass key, the writing of which is requested here, is input by the user through the keyboard 7, and is identical to the one already set in the personal computer 1.

Upon receiving a request from the reader/writer control program 19A of the personal computer 1 in step S226, the non-contact IC card control program 3A of the non-contact IC card 3 proceeds to step S227. As the Bluetooth address, the reported pass key is written onto the EEPROM 134 for storage.

When the writing of the pass key ends, the non-contact IC card control program 3A proceeds to step S228. The non-contact IC card control program 3A notifies the personal computer 1 of the end of the writing of the pass key, and ends the process.

The reader/writer control program 19A of the personal computer 1 receives from the non-contact IC card control program 3A the notification of the end of the writing of the pass key in step S206, and then ends the process.

By repeating the writing, the EEPROM 134 in the non-contact IC card 3 stores the communication group organizing information relating to the personal computer 1, similar to the one illustrated in FIG. 8. The Bluetooth communication is established between the PDA 2 and the personal computer 1 by simply placing the non-contact IC card 3 storing the communication group organizing information of the personal computer 1 close to the PDA 2.

In the above discussion, the personal computer 1 is operated to write the communication group organizing information of the personal computer 1 onto the non-contact IC card 3. Alternatively, the communication group organizing information of the personal computer 1 may be written onto the non-contact IC card 3 by simply placing the non-contact IC card 3 close to the reader/writer 19. The communication group organizing information may be written onto the non-contact IC card 3 by using the reader/writer 108 in the PDA 2.

A series of processes to establish the Bluetooth address between the PDA 2 and the personal computer 1 will now be discussed with reference to flow diagrams illustrated in FIGS. 17 and 18. Here, the non-contact IC card 3 storing the communication group organizing information of the personal computer 1 is placed close to the PDA 2.

The process of the reader/writer control program 108A of the PDA 2 including step S261 through step S265 and the process of the non-contact IC card control program 3A of the non-contact IC card 3 including step S281 through step S284 are basically identical to the process of the reader/writer control program 108A including step S141 through step S146 and the process of the reader/writer control program 19A including step S161 through step S165, respectively.

Upon detecting the non-contact IC card 3 by the emitted electromagnetic wave, the reader/writer control program 108A of the PDA 2 requests the non-contact IC card 3 to transmit the stored communication group organizing information in step S263. In response to the reception of the communication group organizing information from the non-contact IC card 3, the reader/writer control program 108A starts the Bluetooth module control program 109A in step S265. In step S266, the reader/writer control program 108A notifies the Bluetooth module control program 109A of the communication group organizing information.

Upon receiving the electromagnetic wave emitted from the personal computer 1, the non-contact IC card control program 3A of the non-contact IC card 3 transmits the communication group organizing information of the personal computer 1 written in the process illustrated in FIG. 16 to the PDA 2 in step S284, and ends the process.

The Bluetooth module control program 109A of the PDA 2 receives the communication group organizing information of the personal computer 1 in step S242. In step S243, the Bluetooth module control program 109A issues a "paging" to the personal computer 1 in accordance with the Bluetooth address contained in the communication group organizing information.

The same process as the one executed between the personal computer 1 and the PDA 2 as discussed with reference to FIG. 15 is performed.

More specifically, the Bluetooth module control program 20A of the personal computer 1 receives the "paging" in step S301. In step S302, the Bluetooth module control program 20A replies to the "paging", and then establishes the synchronization with the PDA 2.

In step S245, the Bluetooth module control program 109A of the PDA 2 transmits, to the personal computer 1, the connection request relating to the service selected based on the service record contained in the communication group organizing information reported from the non-contact IC card 3.

The Bluetooth module control program 20A of the personal computer 1 receives the connection request transmitted from the PDA 2 in step S303. In step S304, the Bluetooth module control program 20A performs an authentication process using the same pass key as the one stored in the non-contact IC card 3. As already discussed, the user sets the pass key stored in the storage 18 in the personal computer 1 to be identical to the one described in the communication group organizing information stored in the non-contact IC card 3.

When the authentication is verified, the Bluetooth module control program 20A proceeds to step S305 to notify the PDA 2 of the verified authenticity. In step S306, the Bluetooth module control program 20A establishes the Bluetooth communication.

The Bluetooth module control program 109A of the PDA 2 receives the notification in step S247, and then establishes the Bluetooth communication in step S248.

As described above, the user establishes the communication between the PDA 2 and the personal computer 1 by simply placing the non-contact IC card 3 in proximity to the PDA 2.

Even when the personal computer 1 is located at a remote place where the user has difficulty in placing the PDA 2 close thereto, the user easily starts the communication using the non-contact IC card 3.

In the above discussion, the communication is established between one apparatus to another apparatus. A network containing a plurality of apparatuses is easily and quickly organized using the communication group organizing information.

Figure 19:
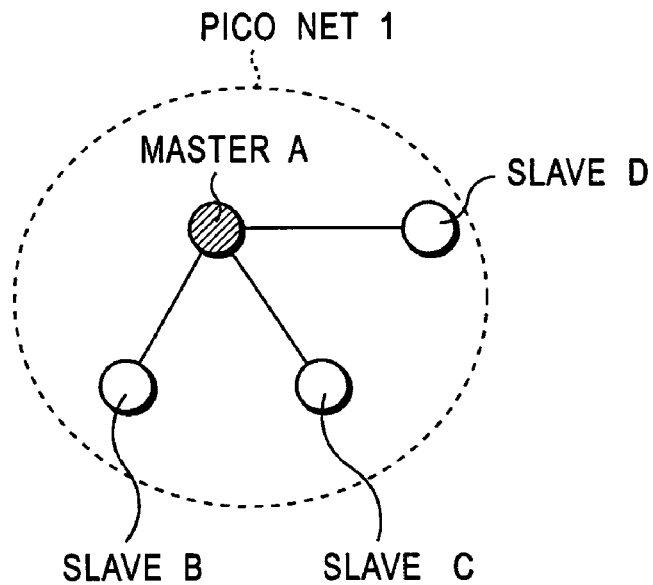
FIG. 19 illustrates a piconet of the Bluetooth communication.

FIG. 19 illustrates a piconet performing the Bluetooth communication.

The piconet includes one master for controlling communication, and a maximum of 7 slaves is connected to the master apparatus. Each slave performs communications under the control of the master.

Referring to FIG. 19, a slave B, a slave C and a slave D are connected to the master A. The four apparatuses form the piconet 1.

Figure 20:
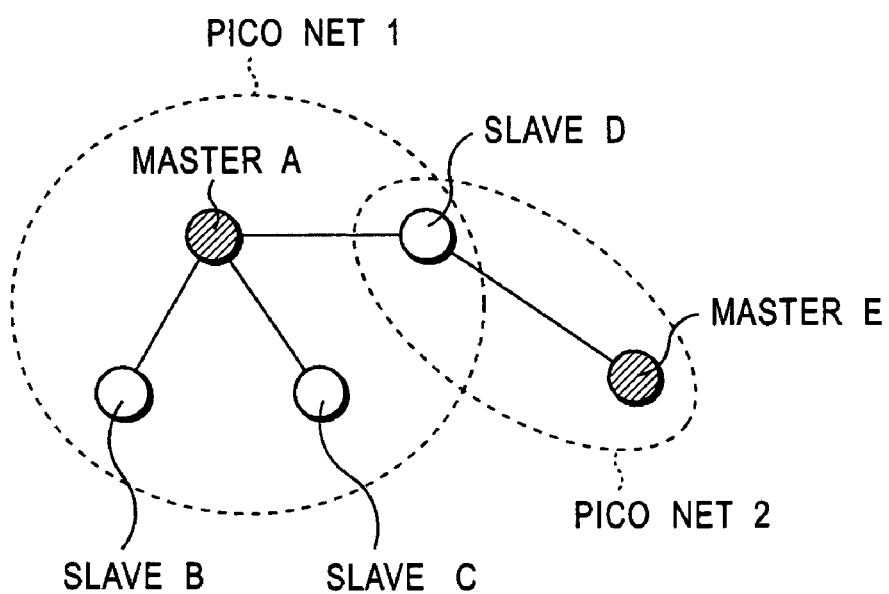
FIG. 20 illustrates a scatternet of the Bluetooth communication.

FIG. 20 illustrates a scatternet, in which a plurality of piconets are interconnected to each other.

In the Bluetooth communication, a plurality of piconets are interconnected to form a network. The network containing a plurality of interconnected piconets is referred to as a scatternet.

As shown in FIG. 20, the piconet 1 shown in FIG. 19 is connected to a piconet 2 containing a maser E and a slave D. The slave D shown in FIG. 20 is commonly shared by the piconet 1 and the piconet 2. In a time-division process, the slave D functions as a slave in the piconet 1 during one period while functioning as a slave in the piconet 2 during the other period.

An even larger scatternet is formed by connecting a number of piconets.

A communication system of a piconet formed of a plurality of apparatuses, or a scatternet formed of a plurality of piconets, may be organized using the above-referenced communication group organizing information. Such a communication system will be discussed below.

Figure 21:
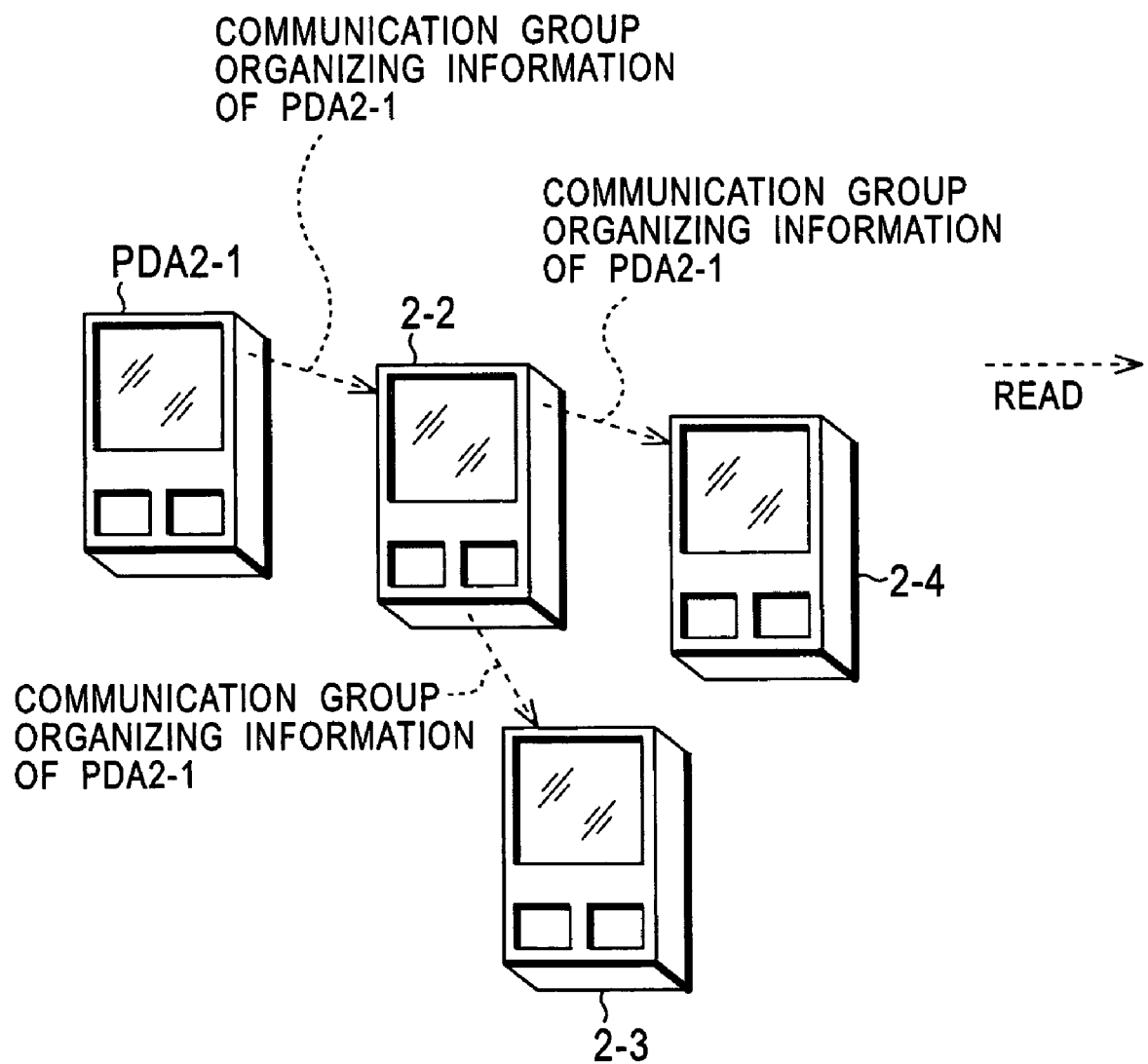
FIG. 21 illustrates another configuration of the communication system implementing the present invention.

FIG. 21 illustrates another configuration of the communication system of a communication group (a network) containing a plurality of apparatuses.

As the PDA 2 shown in FIG. 1, each of a PDA2-1 through a PDA2-4 has a reader/writer and a Bluetooth module. The PDA2-1 through PDA2-4 have reader/writer 108-1 through reader/writer 108-4, and a Bluetooth module 109-1 through a Bluetooth module 109-4, respectively. The same is true of the remaining elements of the PDA2-1 through the PDA2-4 in the reference numerals thereof.

As already discussed, the PDA2-1 stores the communication group organizing information containing the Bluetooth address, and the PDA2-2 is placed close to the PDA2-1. Upon receiving the electromagnetic wave from the reader/writer 108-2, the PDA2-1 supplies the PDA2-2 with the communication group organizing information from the reader/writer 108-1.

The PDA2-2 stores the acquired communication group organizing information in the RAM 63 of the reader/writer 108-2, and establishes the Bluetooth address with the PDA2-1 using the communication group organizing information.

Upon receiving the electromagnetic wave emitted from the reader/writer 108-3 with the PDA2-3 placed in proximity, the PDA2-2 supplies the PDA2-3 with the communication group organizing information stored in the reader/writer 108-2 (the communication group organizing information of the PDA2-1).

The PDA2-3 stores the acquired communication group organizing information in the reader/writer 108-3 and establishes the Bluetooth communication with the PDA2-1 using the communication group organizing information.

The PDA2-2 performs the same process with the PDA2-4. When the PDA2-4 is placed in proximity to the PDA2-2, the reader/writer 108-2 supplies the PDA2-4 with the communication group organizing information. The PDA2-4 also stores the acquired communication group organizing information in the reader/writer 108-4 and establishes the Bluetooth communication with the PDA2-1 using the communication group organizing information.

These processes are successively performed, thereby organizing the communication group with respect to the PDA2-1 serving as a center (master).

Figure 22:
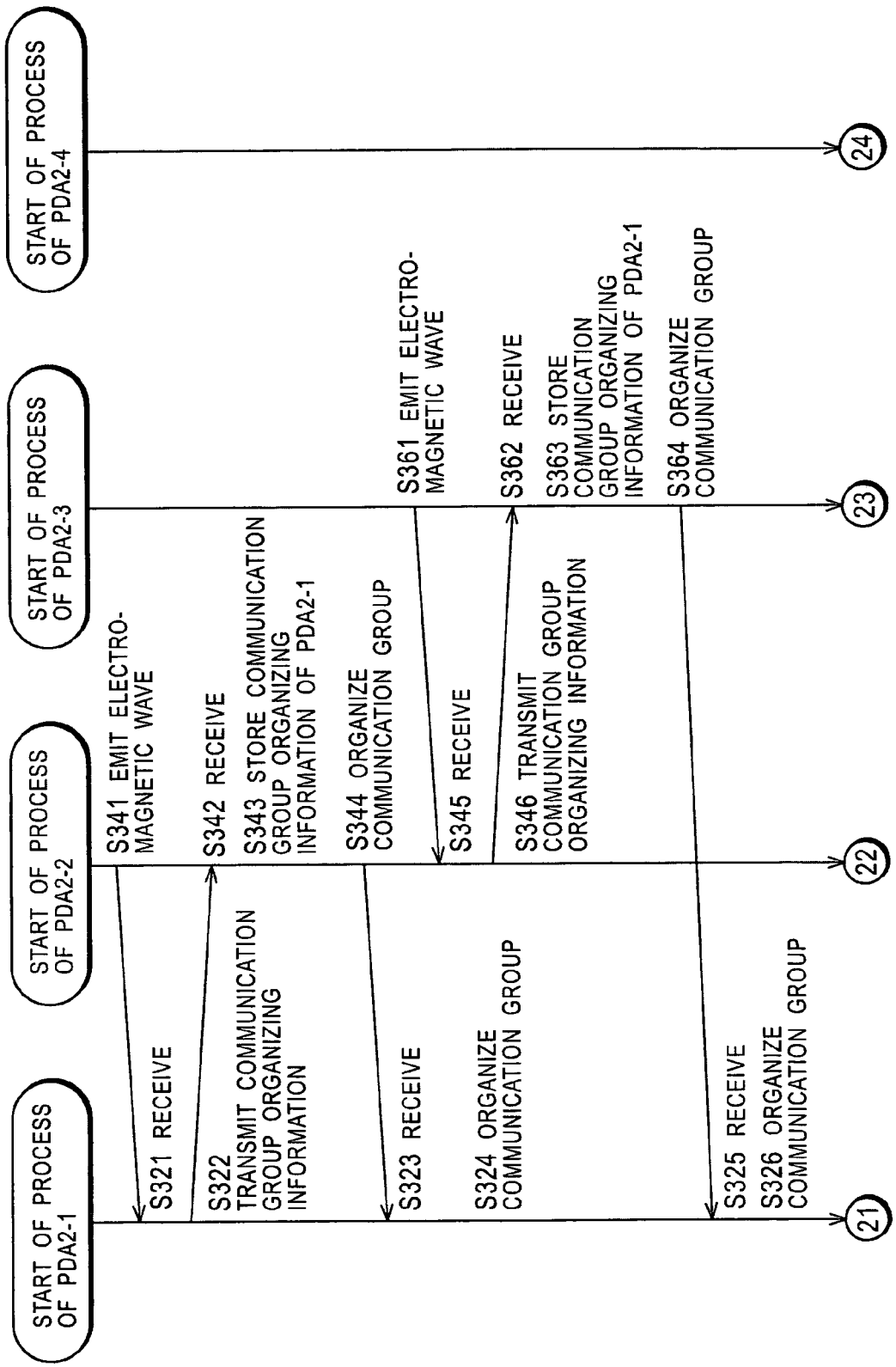
FIG. 22 is a flow diagram illustrating a process of the communication system of FIG. 21.
Figure 23:
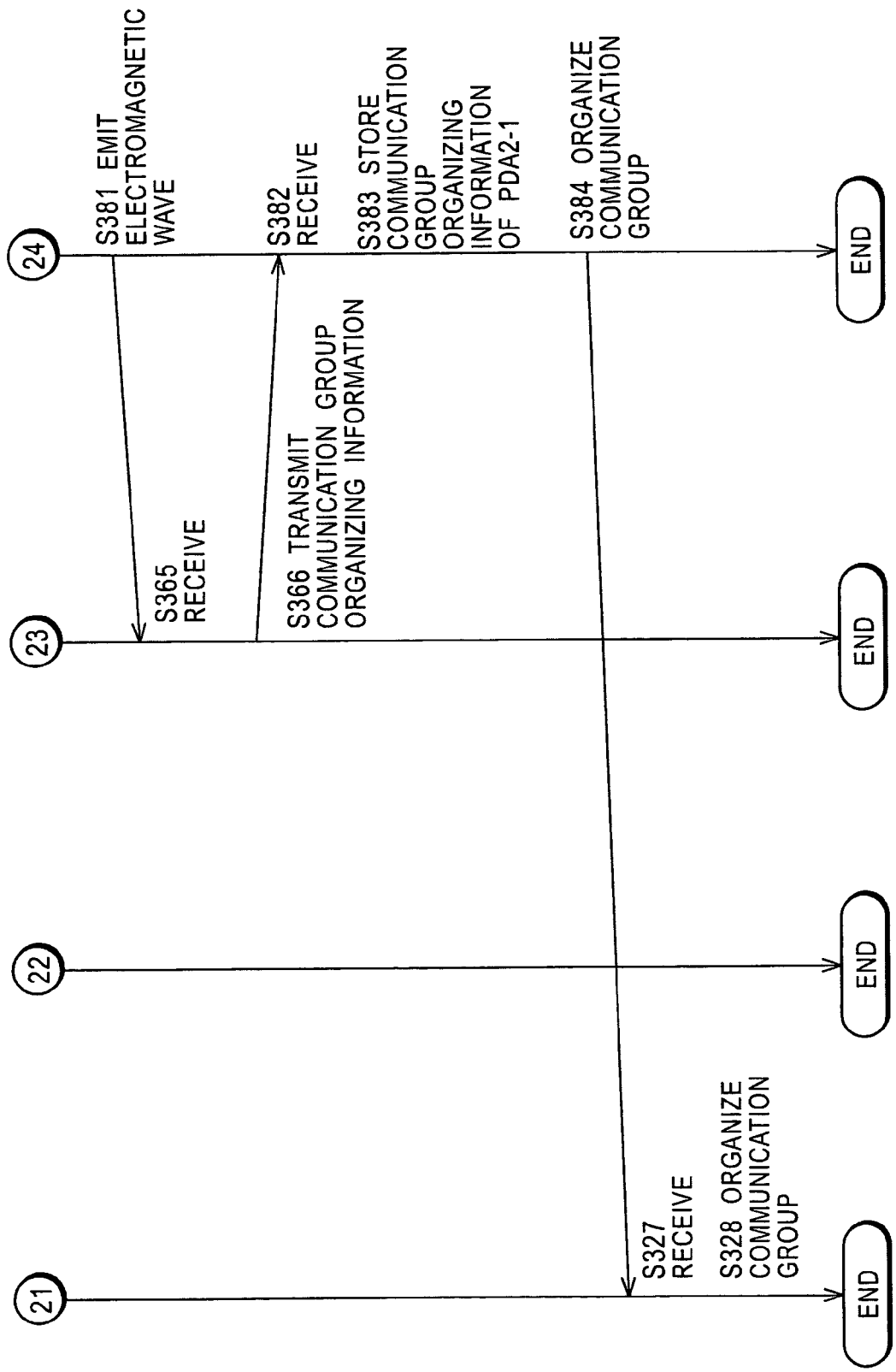
FIG. 23 is a continuation of the flow diagram of FIG. 22, illustrating the process of the communication system of FIG. 21.

A series of processes of the communication system shown in FIG. 21 will now be discussed with reference to flow diagrams illustrated in FIGS. 22 and 23. In the communication system shown in FIG. 21, the slave 2-4 establishes the communication with the PDA 2-1 based on the communication group organizing information acquired from the slave 2-2. For convenience of explanation, the slave 2-4 establishes the communication with the slave PDA2-1 by acquiring the communication group organizing information from the slave 2-2.

In step S341, the PDA2-2 emits the electromagnetic wave from the reader/writer 108-2 with a predetermined period.

When the PDA2-2 is placed close to the PDA2-1, the PDA2-1 receives the electromagnetic wave from the PDA2-2 in step S321. In step S322, the PDA2-1 transmits the communication group organizing information stored in the reader/writer 108-1 from the reader/writer 108-1.

The communication group organizing information transmitted from the PDA2-1 is received by the reader/writer 108-2 in the PDA2-2 in step S342. In step S343, the received communication group organizing information is stored in the reader/writer 108-2. In step S344, the PDA2-2 activates the Bluetooth module 109-2 (the Bluetooth module of the PDA2-2), and organizes a communication group of the Bluetooth communication with the PDA2-1 using the communication group organizing information acquired from the PDA2-1.

More specifically, the Bluetooth address contained in the communication group organizing information reported from the PDA2-1 is used to execute the "paging" with PDA2-1 in the process in step S344 performed by the PDA2-2 and the process in step S323 and step S324 performed by the PDA2-1 as already described with reference to FIGS. 14 and 15.

Similarly, the pass key or the service record, contained in the communication group organizing information, is used to establish the Bluetooth communication between the PDA2-1 and the PDA2-2. These "paging" process and the authentication process using the pass key are identical to those already discussed, and are omitted from FIG. 22 and other related figures.

In step S361, the PDA2-3 emits the electromagnetic wave. The PDA2-2 receives the electromagnetic wave in step S345, and transmits the communication group organizing information (the communication group organizing information of the PDA2-1) stored in the reader/writer 108-2 to the PDA2-3 in step S346.

The transmitted communication group organizing information is received by the reader/writer 108-3 in the PDA2-3 in step S362, and is then stored in the reader/writer 108-3 in the PDA2-3 in step S363.

In step S264, the PDA2-3 establishes the communication with the PDA2-1 using the communication group organizing information (the communication group organizing information of the PDA2-1) reported from the PDA2-2.

More specifically, the "paging" process and the authentication process by the pass key are performed based on the communication group organizing information in the process in step S325 and step S326 performed by the PDA2-1 and the process in step S364 performed by the PDA2-3. A Bluetooth communication is thus established between the PDA2-1 and the PDA2-3.

A communication group with the PDA2-1 serving as a center is formed among the PDA2-1 through the PDA2-3.

The PDA2-4 also emits the electromagnetic wave in step S381. The PDA2-3 receives the electromagnetic wave in step S365, and transmits the communication group organizing information (the communication group organizing information of the PDA2-1) stored in the reader/writer 108-3 to the PDA2-4 in step S366.

The communication group organizing information is received by the reader/writer 108-4 in the PDA2-4 in step S382, and is then stored in the reader/writer 108-4 in the PDA2-4 in step S383.

In step S384, the PDA2-4 establishes the Bluetooth communication with the PDA2-1 using the communication group organizing information (the communication group organizing information of the PDA2-1) reported from the PDA2-3.

More specifically, the "paging" process and the authentication process by the pass key are performed based on the communication group organizing information in the process in step S327 and step S328 performed by the PDA2-1 and the process in step S384 performed by the PDA2-4. A Bluetooth communication is thus established between the PDA2-1 and the PDA2-4.

A communication group with the PDA2-1 (serving as a master) is formed among the PDA2-1 through the PDA2-4. For example, data, which the PDA2-2 intends to transmit to the PDA2-3, is first received by the PDA2-1, and is then transmitted to the PDA2-3 under the control of the PDA2-1. A variety of data is thus exchanged between the slaves connected to the PDA2-1.

An apparatus, which has received the communication group organizing information of the master, stores the communication group organizing information in the storage thereof, and then supplies an apparatus close thereto with the communication group organizing information. A network composed of a plurality of apparatuses is easily and quickly organized.

To newly participate in the network composed of the PDA2-1 through the PDA2-4, the user simply places an apparatus of the user's own close to any of the apparatus in the network, and the user's own apparatus is easily and quickly admitted to participate in the network.

In the above arrangement, the communication group organizing information of the PDA2-1 is reported to the PDA2-2 without being rewritten. Alternatively, the communication group organizing information may be rewritten by an apparatus which newly acquires the communication group organizing information. For example, if the number of available connections in the communication group organizing information stored in the PDA2-1 in the initial state thereof is "6", the PDA2-2, which has received the communication group organizing information, updates the number of available connections to "5" before storing the communication group organizing information in the reader/writer 108-2. Furthermore, the PDA2-3, which has acquired the communication group organizing information from the PDA2-2, decrements the number of available connections to "4" by 1 before storing the communication group organizing information in the reader/writer 108-3. Since the communication group organizing information is updated before being supplied to the next apparatus, the apparatus which receives the communication group organizing information recognizes the current status of the communication group organizing information.

Figure 24:
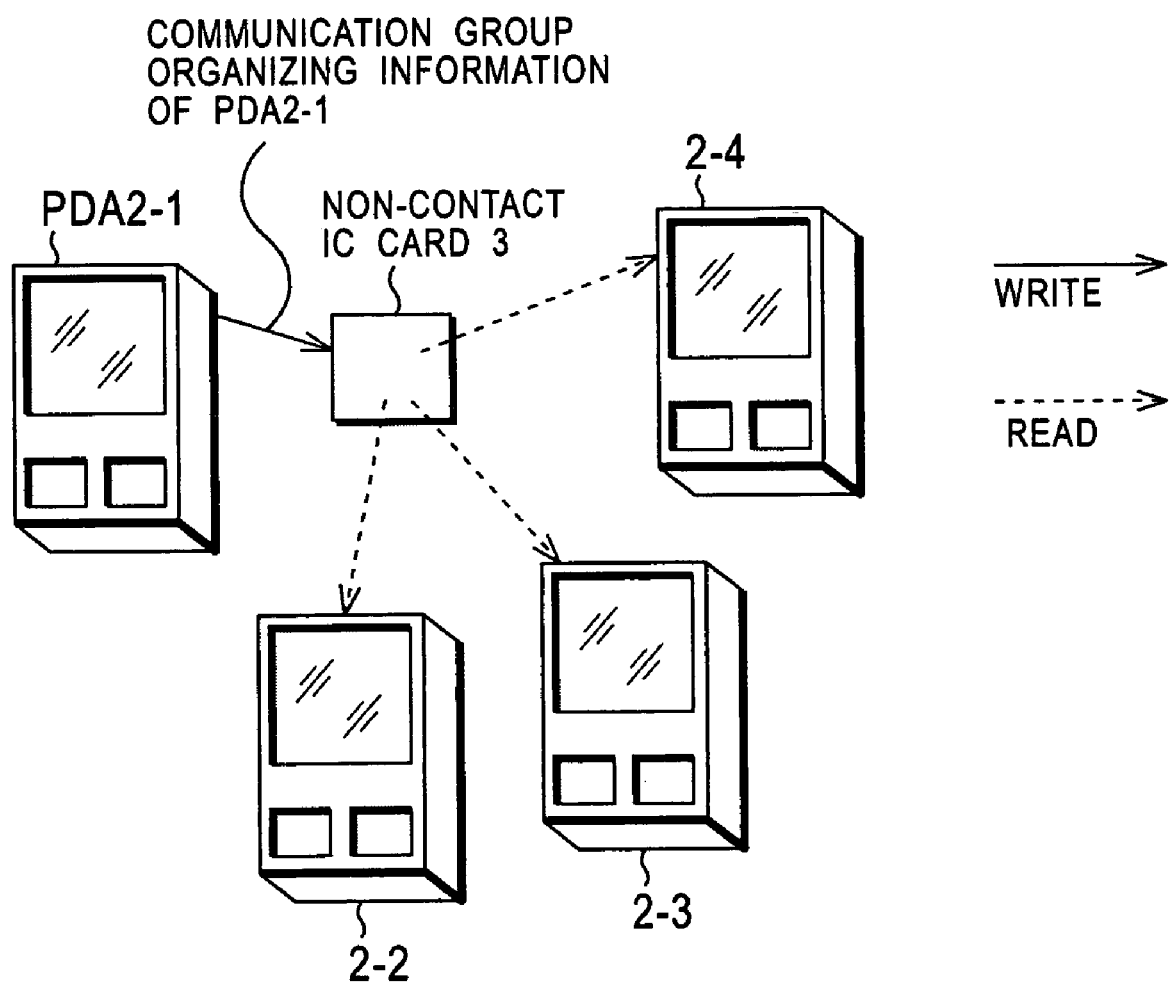
FIG. 24 illustrates another configuration of the communication system implementing the present invention.

FIG. 24 illustrates another configuration of the communication system including a communication group (a network) composed of a plurality of apparatuses.

The network is formed of a PDA2-1 through a PDA2-4 as shown in FIG. 24. The user of the PDA2-1 places the non-contact IC card 3 close to the PDA2-1 to cause the non-contact IC card 3 to store the communication group organizing information of the PDA2-1. When the user of the PDA2-2 desires to establish the Bluetooth communication with the PDA2-1, the user places the non-contact IC card 3 to the PDA2-2.

In this way, the communication group organizing information of the PDA2-1 stored in the non-contact IC card 3 is supplied to the PDA2-2. Based on the communication group organizing information, the PDA2-2 establishes the Bluetooth communication with the PDA2-1. The processes illustrated in FIGS. 17 and 18 are performed among the PDA2-1, the PDA2-2, and the non-contact IC card 3.

When the user of the PDA2-3 desires to participate in the communication group composed of the PDA2-1 and the PDA2-2, the user places the non-contact IC card 3 close to the PDA2-3 to read the communication group organizing information.

The Bluetooth communication is established between the PDA2-3 and the PDA2-1 based on the communication group organizing information of the PDA2-1. A communication group with the PDA2-1 serving as a center is formed of the PDA2-1 through the PDA2-3.

Likewise, the user of the PDA2-4 places the non-contact IC card 3 close to the PDA2-4. The PDA2-4 reads the communication group organizing information of the PDA2-1. The Bluetooth communication is established with the PDA2-1. These processes organize a communication group of the PDA2-1 through the PDA2-4.

A series of processes of the communication system of FIG. 24 is discussed with reference to flow diagrams illustrated in FIGS. 25 and 26.

The PDA2-1 transmits the communication group organizing information thereof to the non-contact IC card 3 close thereto from the reader/writer 108-2 in step S391.

In step S411, the communication group organizing information transmitted from the PDA2-1 is received by the non-contact IC card 3, and is then stored in the EEPROM 134, for example, in step S412. The process described with reference to FIG. 16 is thus performed. The communication group organizing information of the PDA2-1 is written onto the non-contact IC card 3.

The non-contact IC card 3 is placed close to the PDA2-2. The non-contact IC card 3 receives the electromagnetic wave emitted from the reader/writer 108-2 in step S413. The non-contact IC card 3 reads the communication group organizing information written by the PDA2-1, and transmits the read communication group organizing information to the PDA2-2.

The communication group organizing information transmitted from the non-contact IC card 3 is received by the reader/writer 108-2 in the PDA2-2 in step S432. The PDA2-2 stores the received communication group organizing information in the reader/writer 108-2 in step S433. Furthermore, the PDA2-2 starts the Bluetooth module 109-2 in step S434, and establishes the Bluetooth address with the PDA2-1 using the communication group organizing information acquired from the PDA2-1. The communication group is thus organized.

More specifically, the "paging" process and the authentication process by the pass key are performed based on the communication group organizing information in the process in step S392 and step S393 performed by the PDA2-1 and the process in step S434 performed by the PDA2-2. The Bluetooth communication is thus established between the PDA2-1 and the PDA2-2.

When the PDA2-3 is placed close to the non-contact IC card 3, the process performed between the PDA2-2 and the non-contact IC card 3 is also performed between the PDA2-3 and the non-contact IC card 3 in step S451 and subsequent steps. The communication group organizing information is established between the PDA2-1 and the PDA2-3.

When the PDA2-4 is placed close to the non-contact IC card 3, the process performed between the PDA2-2 and the non-contact IC card 3 is also performed between the PDA2-4 and the non-contact IC card 3 in step S461 and subsequent steps. The Bluetooth communication is established between the PDA2-1 and the PDA2-4.

Through the above-referenced processes, the communication group with the PDA2-1 serving as a center is constructed of the PDA2-1 through the PDA2-4.

To participate in the communication group with the PDA2-1 serving as a center, the user simply places the non-contact IC card 3 close to the user's own apparatus.

For example, the user of the PDA2-2 places the non-contact IC card 3 close to the PDA2-2, and then hands the non-contact IC card 3 to a next user. In this way, the network composed of the PDA2-1 through the PDA2-4 shown in FIG. 24 is organized.

Figure 27:
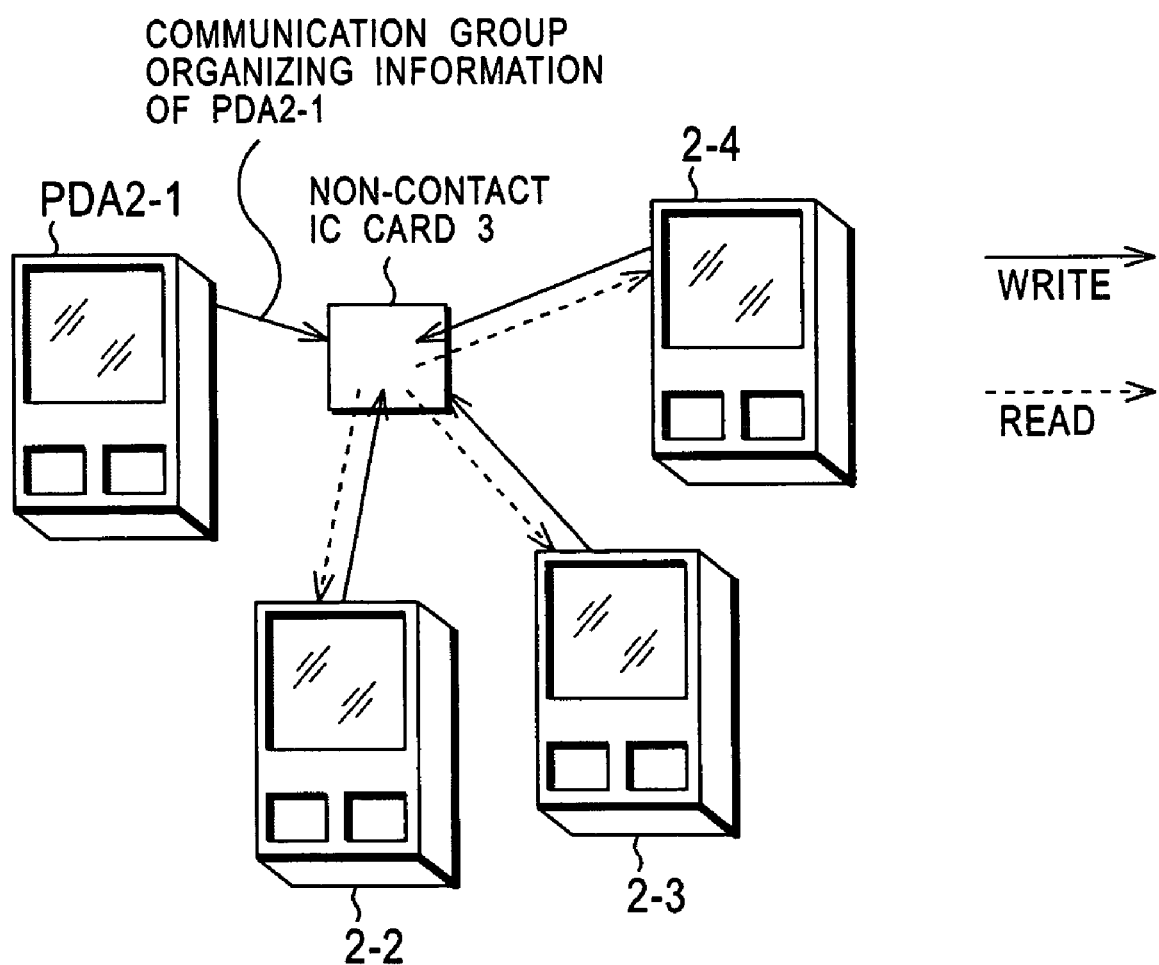
FIG. 27 illustrates a configuration of the communication system implementing the present invention.

The communication system shown in FIG. 27 is organized using the non-contact IC card 3 functioning as an intermediary as the communication system shown in FIG. 24. In the communication system in FIG. 27, an apparatus, which is placed close to the non-contact IC card 3 and reads the stored communication group organizing information from the non-contact IC card 3, and updates the communication group organizing information of the non-contact IC card 3 at each read operation.

For example, an apparatus that reads the communication group organizing information updates information about the number of available connections in the communication group organizing information by decrementing the number of available connections by one.

A series of processes of the communication system illustrated in FIG. 27 will now be discussed with reference to flow diagrams illustrated in FIGS. 28 and 29.

Figure 25:
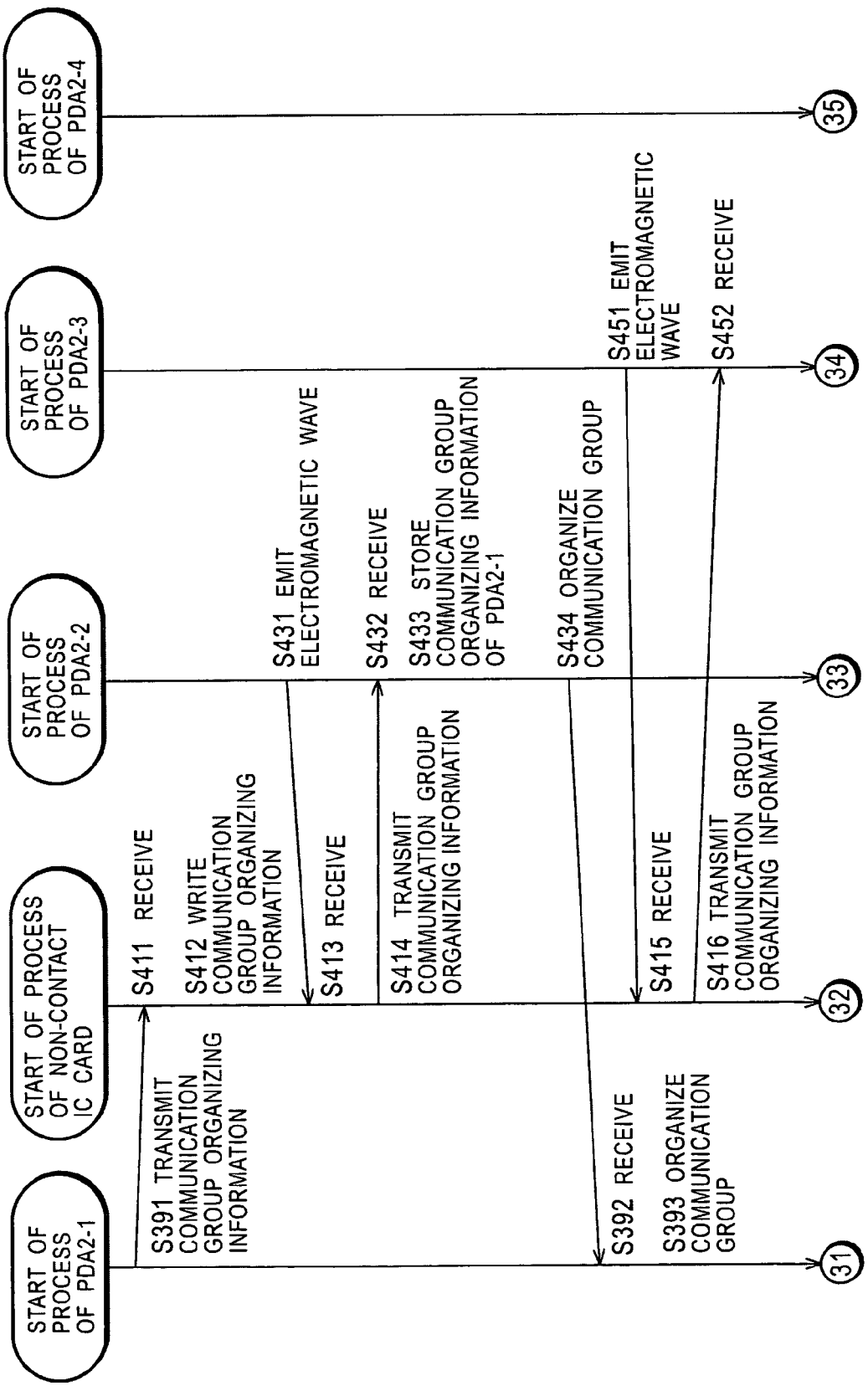
FIG. 25 is a flow diagram illustrating a process of the communication system of FIG. 24.
Figure 26:
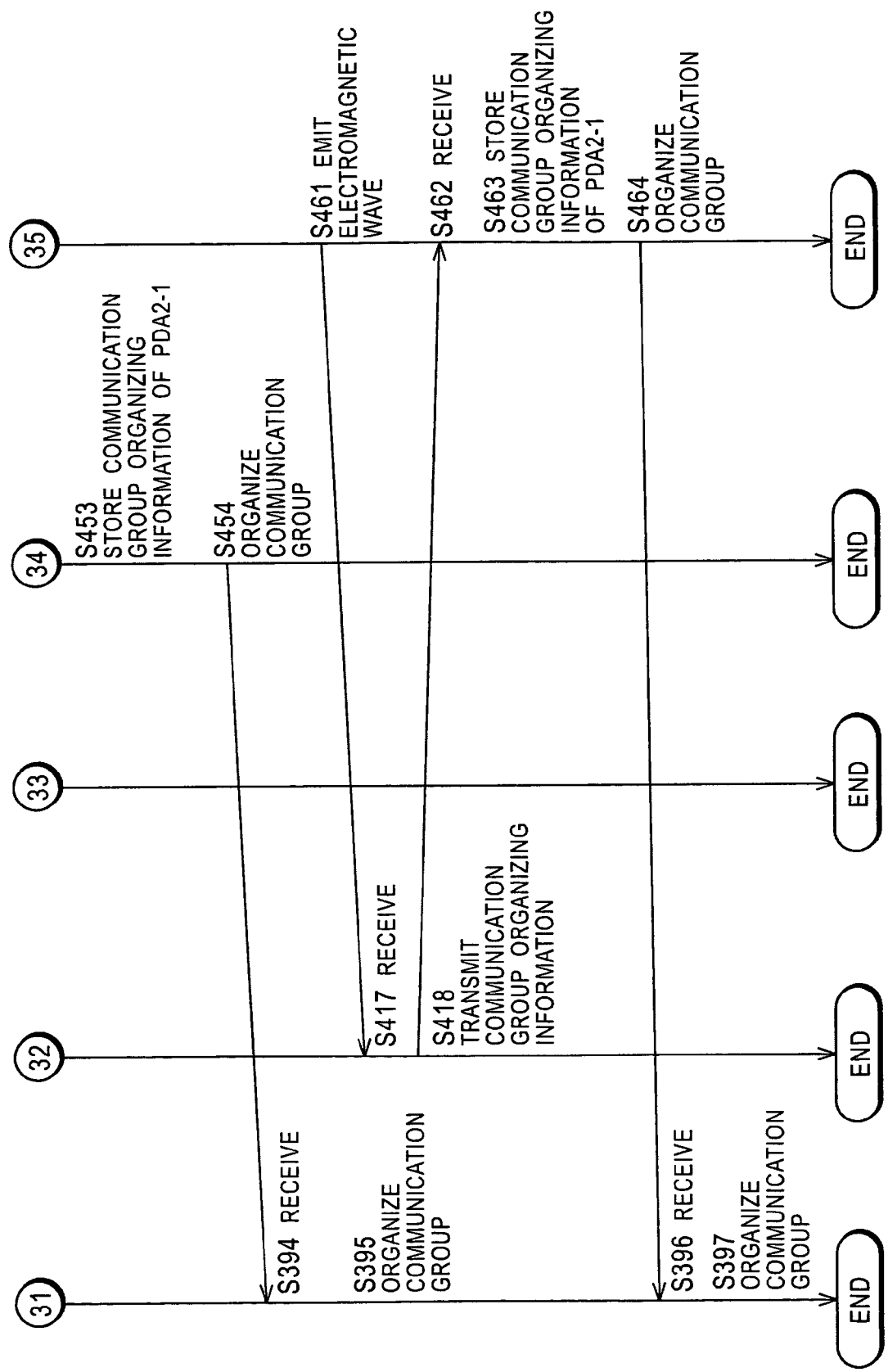
FIG. 26 is a continuation of the flow diagram of FIG. 25, illustrating the process of the communication system of FIG. 24.
Figure 28:
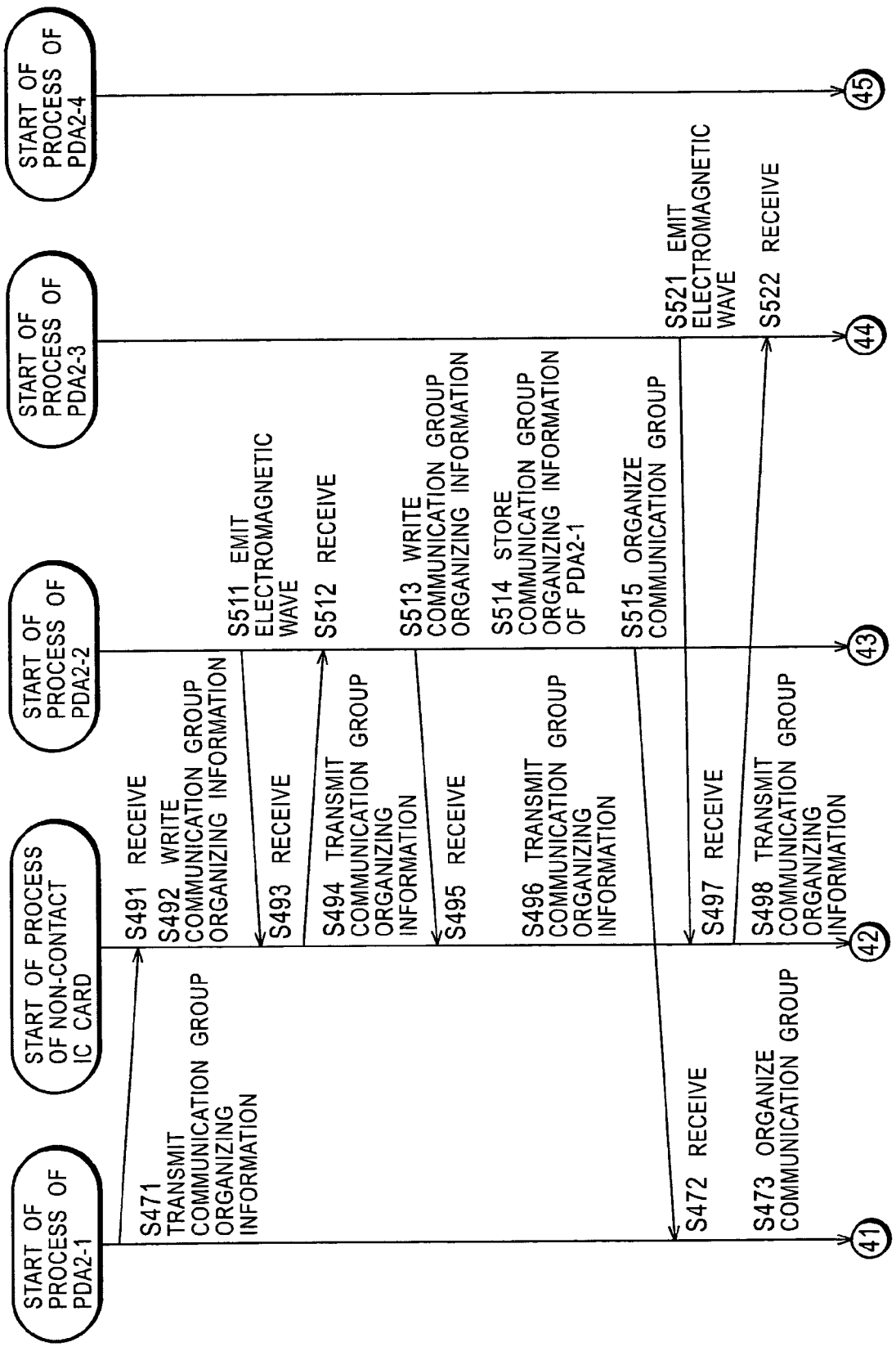
FIG. 28 is a flow diagram illustrating a process of the communication system of FIG. 27.
Figure 29:
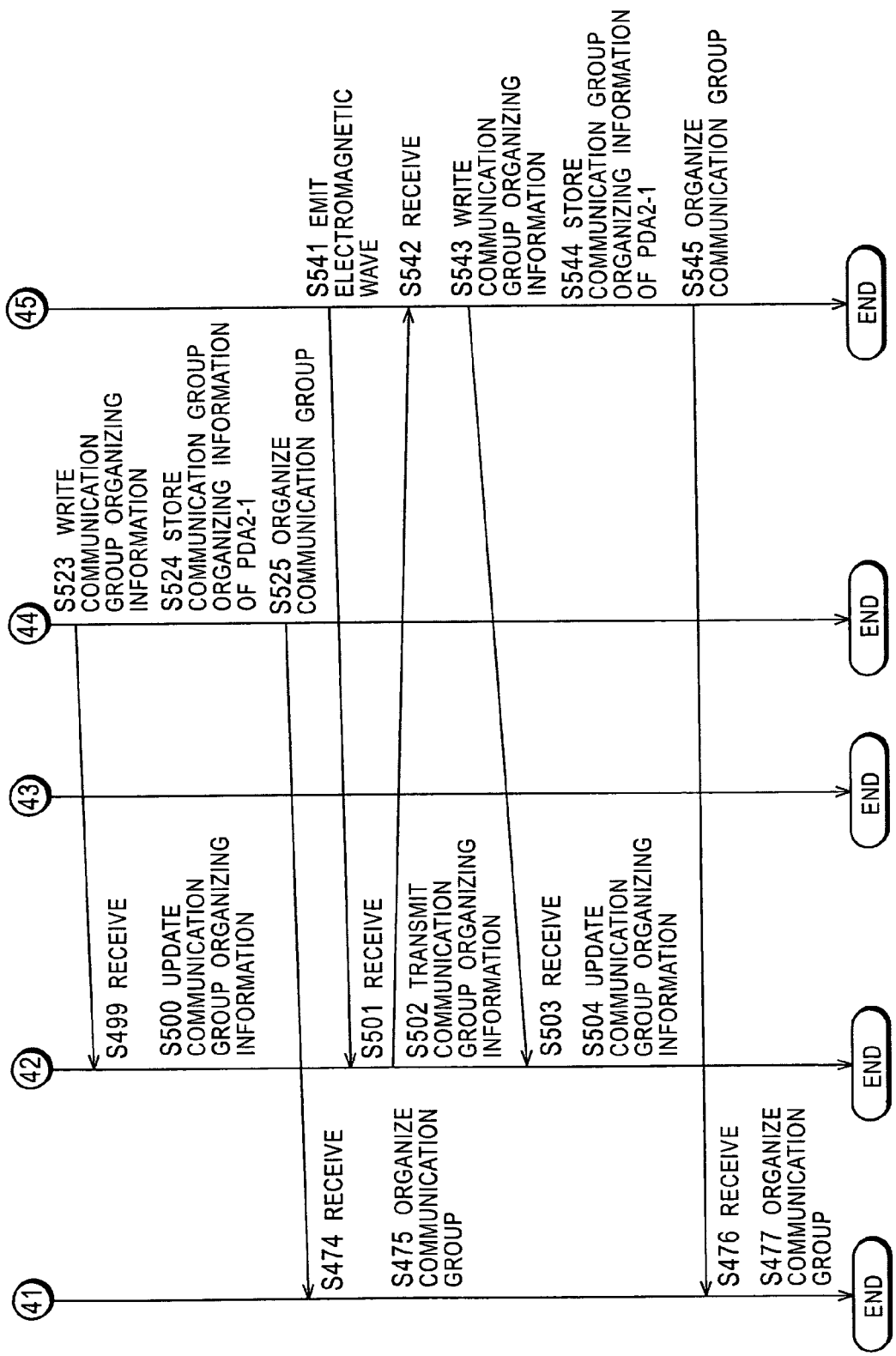
FIG. 29 is a continuation of the flow diagram of FIG. 28, illustrating the process of the communication system of FIG. 27.

The process illustrated in FIGS. 28 and 29 is identical to the process illustrated in FIGS. 25 and 26 except that the process illustrated in FIGS. 28 and 29 includes an additional process. In the additional process, the apparatus that has read the communication group organizing information rewrites the communication group organizing information stored in the non-contact IC card 3.

More specifically, the PDA2-2 receives, at the reader/writer 108-3 thereof, the communication group organizing information transmitted from the non-contact IC card 3 in step S512. In step S513, the PDA2-2 rewrites the communication group organizing information stored in the non-contact IC card 3. If the number of available communications in the communication group organizing information stored in the non-contact IC card 3 is "5", and if the PDA2-2 has received the communication group organizing information in step S512, the PDA2-2 updates the number of available connections to "4".

In step S495, the non-contact IC card 3 receives the updated communication group organizing information in step S495, and replaces the current communication group organizing information with the updated information in step S496.

Subsequent to the rewriting of the communication group organizing information, the PDA2-2 proceeds to step S514. Based on the acquired communication group organizing information, the PDA2-2 establishes the Bluetooth communication with the PDA2-1.

Similarly, the PDA2-3 receives the communication group organizing information from the non-contact IC card 3 in step S522, and updates the communication group organizing information in step S523. The PDA2-3 establishes the communication with the PDA2-1. The PDA2-4 receives the communication group organizing information from the non-contact IC card 3 in step S542, and updates the communication group organizing information in step S543, and then establishes the communication with the PDA2-1.

The communication group with the PDA2-1 serving as a center is thus organized through the above-referenced process. The admission of apparatuses to the communication group may be limited by the setting of the communication group organizing information stored in the non-contact IC card 3.

The admission of apparatuses to the communication group may also be limited by the device class and the number of available connections described in the communication group organizing information.

In the above discussion, the communication is established between the personal computer and the PDA or between the PDAs. The present invention may be applied to a diversity of apparatuses.

The above-referenced communication system may be organized among a mobile terminal such as the PDA, a television receiver, a car navigation system, a vending machine, an ATM (automatic teller machine), etc. In this case, a reader/writer is arranged in at least one apparatus, and a non-contact IC card providing the communication group organizing information is arranged in another apparatus. A Bluetooth communication is established in the communication system.

As long as at least one apparatus incorporates a reader/writer, the present invention is applied to establish a piconet synchronization between mobile telephones, between PDAs, between a PDA and a digital camera, or between a PDA and a digital video camera.

The readers/writers, the non-contact IC cards, and the Bluetooth modules may be installed not only for a connection between apparatuses, but also in mobile objects such as cars, electric trains, ships and planes, at any place within a building, or at any place in streets. Through Bluetooth modules, the readers/writers and the non-contact IC cards are connected to the Internet, a LAN (Local Area Network), or a WAN (Wide Area Network) to configure a so-called ubiquitous network society or ubiquitous computer society.

The present invention may be applied in radio LAN communications (IEEE (Institute of Electrical and Electronics Engineers) 802.11b) other than the Bluetooth communication.

Communications, other than the Bluetooth communication, include IrDA, HomeRF (SWAP), and Wirless1394, and the present invention may be applied to these communications.

The present invention may be applied to any communication method with a power output reduced and having a communication coverage shorter than the Bluetooth communication, instead of the communication method that the non-contact IC card 3 using the loop antenna is used to transfer power and data. For example, the above-referenced communication group organizing information may be supplied to an apparatus to be connected, using the IrDA or a bar code and a bar-code reader.

The apparatus to communicate with is identified using the Bluetooth address in the above discussion. Any type of information may be used instead as long as the information uniquely identifies the apparatus.

For example, when IPv6 (Internet Protocol version 6) of 128 bits is respectively assigned each apparatus, an apparatus serving as a master identifies an apparatus to communicate with based on the identification information reported from a non-contact IC card or a reader/writer.

In the above discussion, the identification of the partner communication terminal using the Bluetooth is performed based on the communication group organizing information exchanged between the reader/writer 19 in the personal computer 1 and the reader/writer 108 in the PDA 2 as described with reference to FIGS. 14 and 15. Even if the short-range radio communication modules working on electromagnetic induction are not set in the personal computer 1 and the PDA 2, the partner communication terminal may be identified by controlling the output power of a radio wave from communication modules.

A communication system that identifies the partner communication terminal by controlling the output power of the radio wave output from the communication module is now discussed.

Figure 30:
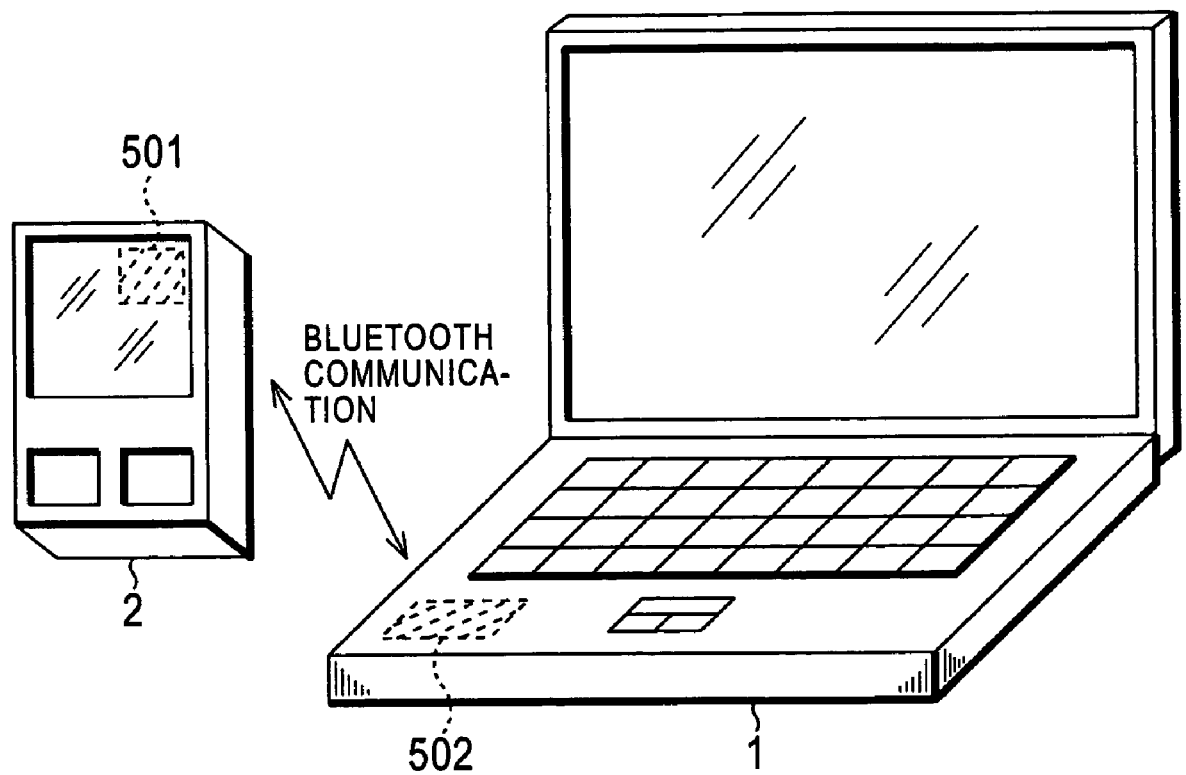
FIG. 30 illustrates a configuration of the communication system.

FIG. 30 illustrates a configuration of the communication system that controls the output power of the radio wave to identify the communication partner terminal.

For example, the PDA 2 identifies a partner communication terminal and establishes the Bluetooth communication with the terminal. The PDA 2 first limits the output power of a communication module 501 (a Bluetooth module) to a minimum required power so that the emitted radio wave reaches within a coverage area to within several centimeters of distance. With a weak power mode with the output power of the radio wave reduced, the communication module 501 repeatedly places an "inquiry", thereby searching for a terminal present within the coverage area of the radio wave (for example, within a radius of several centimeters).

The user places or installs the PDA 2 close to the personal computer 1. When the radio wave emitted from the communication module 501 is received by a communication module 502 (a module that performs a communication of the same standard as that of the communication module 501), the communication module 502 replies in response to the inquiry. The communication module 501 exchanges the inquiry and paging with the communication module 501, thereby establishing a communication link. The communication link established is effective only within a coverage area within which the radio wave of the communication module 501 in the weak power mode reaches.

Even when the communication module 501 is located rather far from the communication module 502, the communication module 501 is required to communicate with the communication module 502. The communication link is temporarily disconnected, and then, the communication module 501 establishes the communication link with the communication module 502 again based on the already acquired information (the information acquired through the inquiry and paging within a short range) after shifting from the weak power mode to a normal power mode.

The re-established communication link works within a coverage area of tens of meters as in the normal Bluetooth communication. The Bluetooth communication is thus possible even if the PDA 2 is significantly located apart from the personal computer 1.

When the PDA 2 has no reader/writer for exchanging the communication group organizing information, the user establishes the Bluetooth communication by controlling the output power of the communication module and placing the PDA 2 close to the personal computer 1.

Even when there are a plurality of apparatuses having the Bluetooth communication feature in a surrounding area of the PDA 2, the PDA 2 identifies the personal computer 1 as a partner communication terminal, and establishes the communication with the personal computer 1.

If the communication module 501 switches the power mode in a seamless fashion, the communication link established in the weak power mode may be shifted to the normal power mode without disconnecting the communication link.

Figure 31:
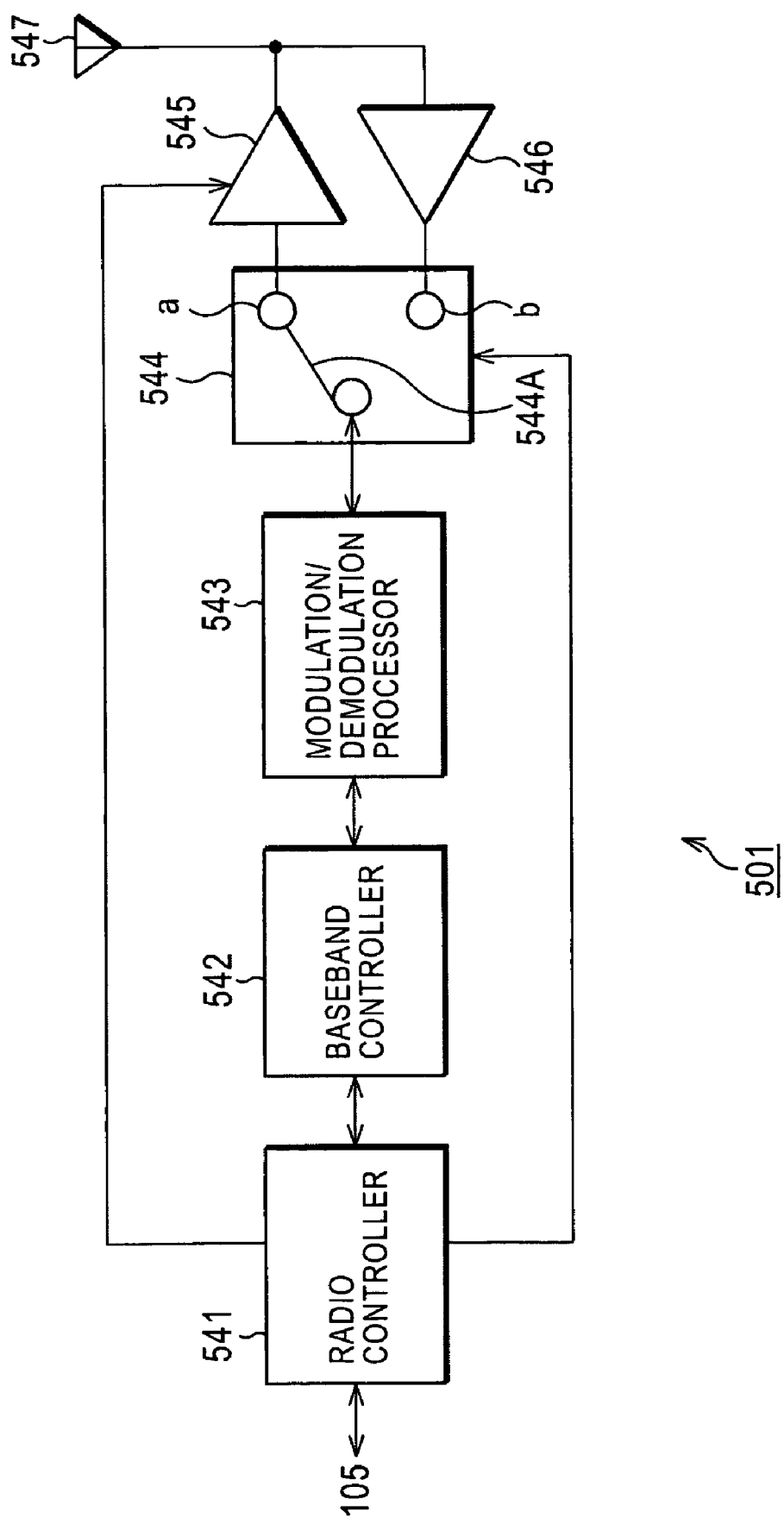
FIG. 31 is a block diagram of a communication module of FIG. 30.

FIG. 31 is a block diagram illustrating in detail the communication module 501 of FIG. 30.

The communication module 501 may be a Bluetooth module or a radio LAN module. If the communication module 501 is a Bluetooth module, the structure thereof is basically identical to that of the Bluetooth module 20 (the Bluetooth module of the personal computer 1) shown in FIG. 4.

A radio controller 541 controls a switch 544. When the communication module 501 transmits information to an external terminal, the radio controller 541 connects a movable contact 544A to a contact point a. When the communication module 501 receive information transmitted from the external terminal, the radio controller 541 connects the movable contact 544A to a contact point b.

The radio controller 541, which is controlled by the CPU 101 through the input/output interface 105 (FIG. 5), controls the gain of a power amplifier 545, thereby controlling the coverage area of the radio wave (output power) emitted from an antenna 547.

More specifically, when the CPU 101 instructs the radio controller 541 to set a weak power mode, the radio controller 541 controls the gain of the power amplifier 545 to a minimum required power so that the radio wave emitted from the power amplifier 545 has a minimum coverage area. When the CPU 101 instructs the radio controller 541 to switch from the weak power mode to the normal power mode after the partner communication terminal is identified, the radio controller 541 controls the gain of the power amplifier 545 so that the coverage area of the output radio wave becomes wider.

As the baseband controller 87 shown in FIG. 4, a baseband controller 542 controls transmission and reception baseband signals. A modulation/demodulation processor 543 performs a spread spectrum process on the output from the baseband controller 542 in accordance with a GFSK modulation process and a hopping frequency, and outputs a resulting signal to the antenna 547 through the power amplifier 545. The modulation/demodulation processor 543 also performs a despread spectrum process and a GFSK demodulation process on the output from an LNA (Low Noise Amplifier), and outputs a resulting signal to the baseband controller 542.

The communication module 502 in the personal computer 1 is identical in structure to the communication module 501 shown in FIG. 31, and the discussion thereof is omitted here.

In the communication system shown in FIG. 30, neither personal computer 1 nor PDA 2 includes the non-contact IC card reader/writer as already discussed.

The operation of the communication system shown in FIG. 30 is discussed with reference to a flow diagram illustrated in FIG. 32. In the process illustrated in FIG. 32, partner communication terminal is identified, and the communication is established.

When the user instructs the PDA 2 to start the Bluetooth communication, the communication module 501 in the PDA 2 starts under the control of the CPU 101. In step S601, the communication module 501 sets a weak power mode thereof. In step S602, the communication module 501 repeatedly executes an inquiry and searches for a terminal in proximity thereto.

In the inquiry executed in step S602, the weak power mode is set, and the coverage area of the radio wave is set to a minimum range. For example, an IQ packet (inquiry packet) is repeatedly broadcasted within a range of several centimeters of the antenna 547.

The communication module 502 in the personal computer 1 is put into a state to repeat an inquiry scan and a page scan, and waits on standby until an inquiry and paging comes from another terminal.

When the user places the PDA 2 close to the personal computer 1 with the communication module 502 in the personal computer 1 within a coverage area of the radio wave from the communication module 501 in the PDA 2, the IQ packet broadcasted from the communication module 501 is received by the communication module 502 in step S622.

The communication module 502 receives the IQ packet broadcasted from the communication module 501, and then proceeds to step S623 to respond to the IQ packet. The communication module 502 transmits an FHS packet to the communication module 501. The FHS packet includes, as attribute information of the personal computer 1 (a Bluetooth slave), the Bluetooth address and the Bluetooth clock of the personal computer 1.

When the FHS packet transmitted from the communication module 502 is received in step S603, the communication module 501 proceeds to step S604. The communication module 501 places a connection request to the communication module 502.

More specifically, an ID packet is transmitted from the communication module 501 to the communication module 502. When the communication module 502 returns the same ID packet to the communication module 501, the FHS packet containing the Bluetooth address and the Bluetooth clock of the communication module 501 is transmitted to the communication module 502 from the communication module 501.

When the communication module 502 receives the FHS packet transmitted from the communication module 501 in step S624, the synchronization in the frequency axis (the frequency hopping pattern) and the synchronization in the time axis (the time slot) are established between the communication module 501 and the communication module 502. The data link (communication link) is thus established between the communication module 501 and the communication module 502 (state 1).

When the data link using the Bluetooth communication is established between the communication module 502 and the communication module 501 for the first time, the communication module 501 transmits a PIN (Personal Identification Number) code to the communication module 502 to authenticate each other in step S605.

The PIN code transmitted from the communication module 501 is received by the communication module 502 in step S625, and a variety of link keys are set between the communication module 501 and the communication module 502 based on the PIN code and a random number.

The PIN code, before being transmitted, may be encrypted using a public key the communication module 502 provides the communication module 501 with. The communication module 502 manages a secret key corresponding to the public key provided to the communication module 501. In this way, the security of communications is improved, and the Bluetooth communication is securely performed between the personal computer 1 and the PDA 2.

The communication link thus established is effective within a coverage area of several centimeters where the radio wave from the communication module 501 in the weak power mode reaches. Even when the communication module 501 is located far from the communication module 502, the communication module 501 is required to communicate with the communication module 502. In step S606, the communication module 501 requests the communication module 502 to temporarily disconnect the data link. Information acquired in the processes until then, such as the Bluetooth address and the PIN code of the communication module 502, is stored in the communication module 501.

The communication module 502, which has received the request in step S626, stores the Bluetooth address and the PIN code of the communication module 501 acquired until then, as the communication module 501 does, and disconnect the data link (state 2).

To re-establish the data link with the communication module 502, the communication module 501 sets the power mode of the output power to the normal power mode under the control of the CPU 101 in step S607. In this way, the Bluetooth radio wave reaches within a coverage area of several tens of meters from the communication module 501.

The communication module 501 identifies the personal computer 1 as a partner communication terminal based on the information stored immediately prior to the disconnection of the data link in step S608, and then issues a connection request to the communication module 502.

The connection request is received by the communication module 502 in step S627. The two terminals are thus set in a state that the data link is established between the communication module 501 and the communication module 502, in other words, in a state that the Bluetooth communication is possible within a coverage area of several tens of meters where the radio wave of the communication module 501 set in the normal power mode reaches (state 3).

The communication system shown in FIG. 30 for identifying, as a partner communication terminal, a terminal in proximity is applied to the communication system shown in FIG. 1. The user starts the communication by placing the PDA 2 close to the personal computer 1, both having no non-contact IC card reader/writer, and permits the above-referenced communication group organizing information to be exchanged between the terminals.

Similarly, the user establishes the data link between the apparatuses and connects the PDA 2 to a network 5 through an access point 4 by placing the PDA 2 in proximity to the access point 4.

Figure 33:
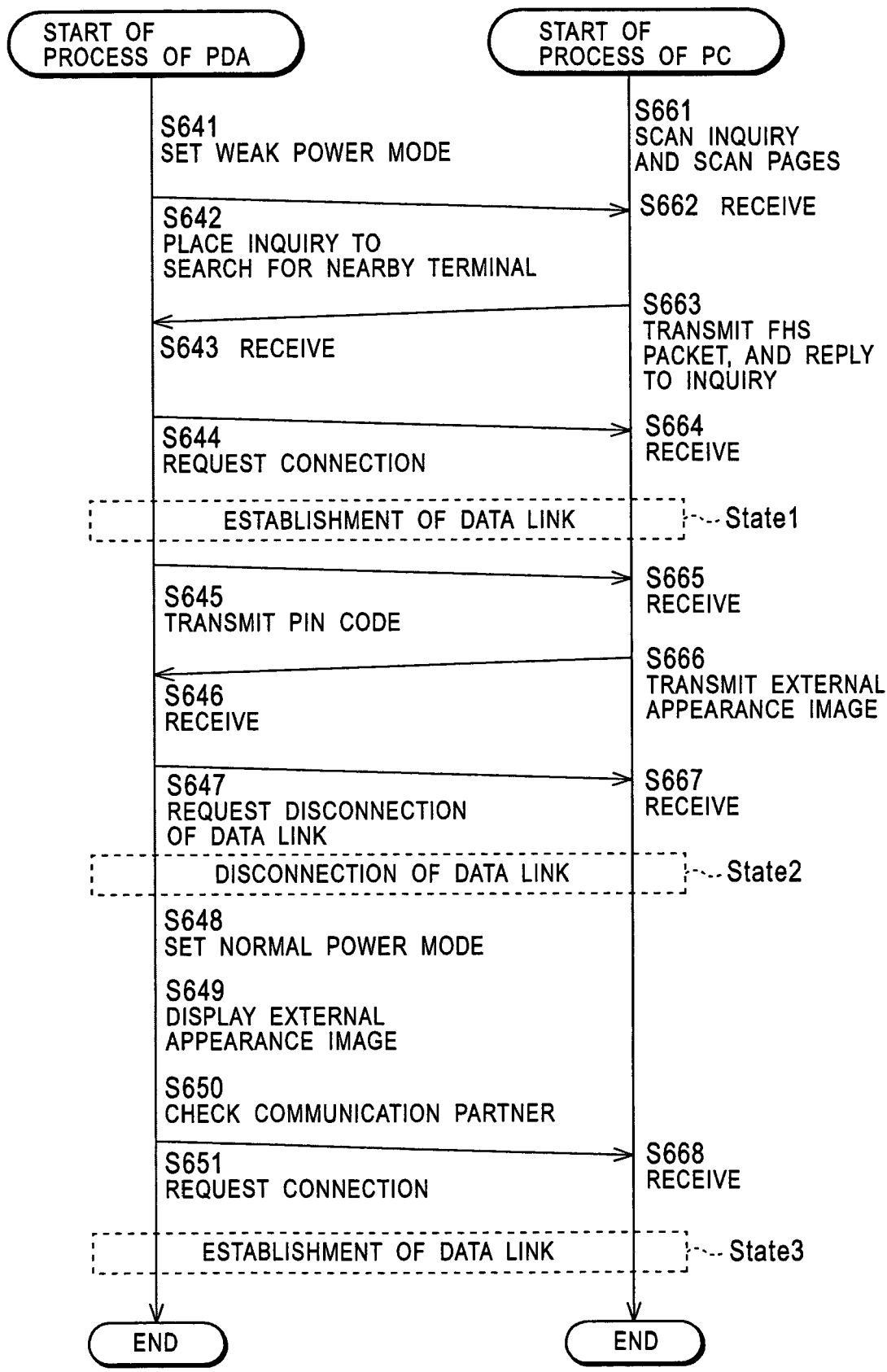
FIG. 33 is a flow diagram illustrating another operation of the communication system of FIG. 30.

FIG. 33 is a flow diagram illustrating another process of the communication system shown in FIG. 30. In this process, an external appearance image of a partner communication terminal (the personal computer 1, for example) is presented on the PDA 2 to allow the user to recognize the partner communication apparatus before the data link is established in the normal power mode.

Figure 32:
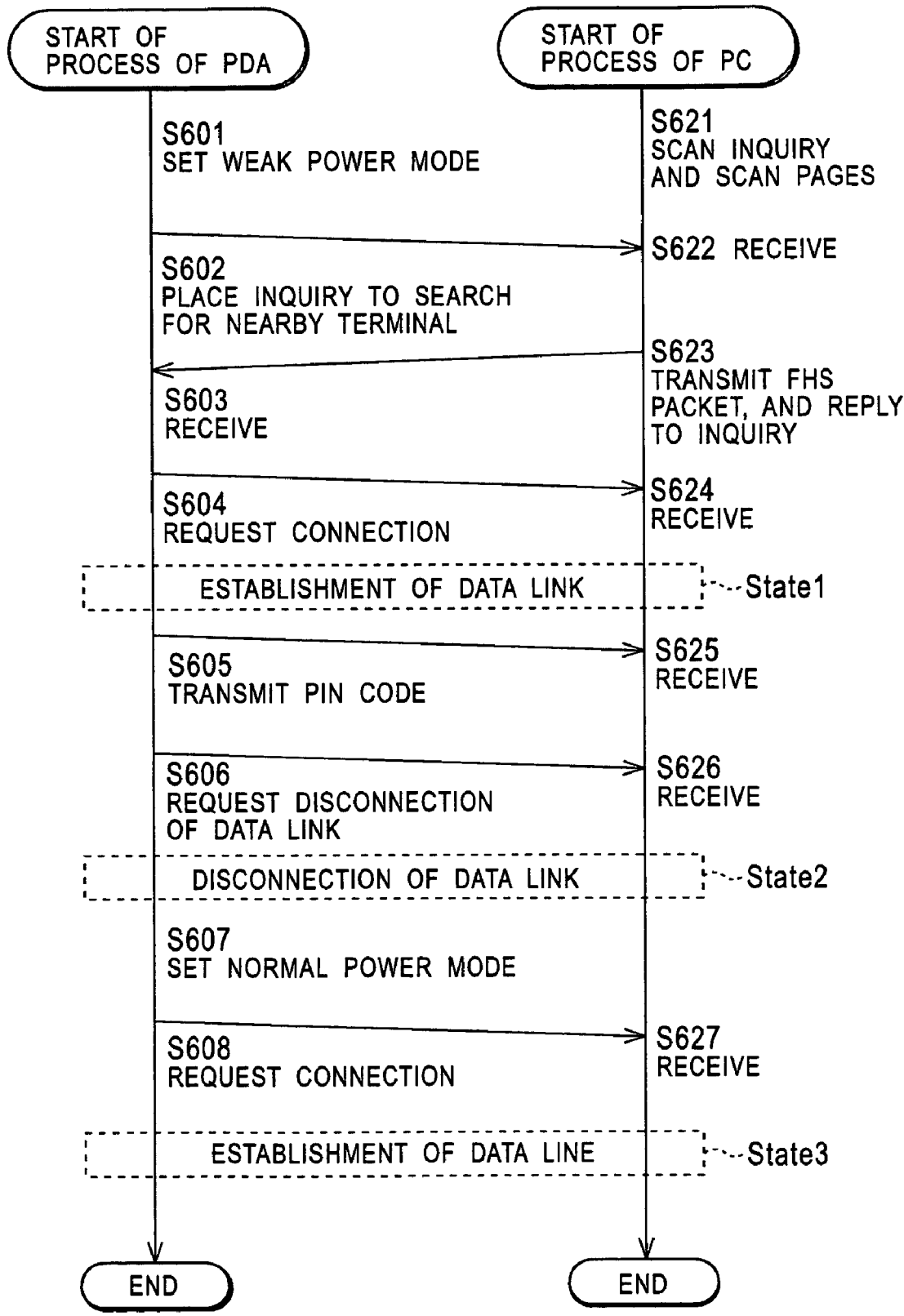
FIG. 32 is a flow diagram illustrating an operation of the communication system of FIG. 30.

The process in steps S641 through S645 performed by the PDA 2, and the process in steps S661 through S665 performed by the personal computer 1 are respectively identical to the process in steps S601 through S605 and the process in steps S612 through S625 illustrated in FIG. 32.

More specifically, the data link effective within a coverage area of several centimeters is established in the weak power mode, and the PIN code transmitted from the communication module 501 in the PDA 2 is received by the communication module 502 in the personal computer 1.

The communication module 502 receives the PIN code. In response, the communication module 502 transmits an external appearance image of the personal computer 1 prepared beforehand to the communication module 501 in step S666.

The communication module 501 receives the external appearance image transmitted from the communication module 502 in step S646. The external appearance image is then stored in an unshown flash memory of the PDA 2.

The communication module 501 requests the communication module 502 to disconnect the data link in the weak power mode in step S647. Subsequent to a brief disconnection of the data link, the communication module 501 proceeds to step S648 to set the normal power mode.

The CPU 101 in the PDA 2 causes an LCD 106 to display the external appearance image of the personal computer 1 based on stored image data in step S649. The user thus recognizes the partner communication terminal with which the data link is to be established in the normal power mode.

When the user instructs the PDA 2 to connect to the personal computer 1 with the external appearance image thereof displayed on the LCD 160 in step S650, the algorithm proceeds to step S650. The communication module 501 requests the communication module 502 to connect thereto in the normal power mode in step S651.

When the request is received by the communication module 502, the data link is established in the normal power mode (state 3).

As described above, the external appearance image of the terminal is displayed based on the data that is transmitted when the data link is established in the weak power mode. The communication of the PDA 2 is more reliably established with the partner communication terminal the user desire to communicate with.

As discussed above, the external appearance image is transmitted as information representing the partner communication apparatus in the weak power mode. In addition to the external appearance image, feature information of various types such as the name of the communication partner may be transmitted to be presented to the user.

Voice information relating to the communication partner may be transmitted and a voice guide may be output in response. Even if the apparatus receiving the voice information has no display unit, the information relating to the apparatus to connect may be presented beforehand to the user.

When the above series of processes is performed in software, a program of the software may be installed through a network or from a recording medium in a computer built in dedicated hardware or in a general-purpose personal computer that performs a variety of functions with a variety of programs installed therein.

As shown in FIG. 2, the recording medium may be not only a package medium distributed to supply the user with the program, separate from the main unit of the apparatus shown in FIG. 2, such as one of the magnetic disk 22 (including a floppy disk), the optical disk 23 (including CD-ROM (Compact Disk-Read Only Memory), and DVD (Digital Versatile Disk)), the magnetooptical disk 24 (including an MD (Mini-Disk)), and the semiconductor memory 25, each storing the program, but also one of the ROM 12 and the storage 18, each storing the program, supplied in the main unit of the apparatus to the user.

In the specification of the present invention, the steps describing the program stored in the recording medium may be performed sequentially as described in time axis. But the steps are not necessarily sequentially performed in time axis, and may be performed in parallel or separately.

The system in the specification of the present invention refers to the one including a plurality of apparatuses.

INDUSTRIAL APPLICABILITY

The present invention allows a communication to be easily and quickly performed as described above.

The invention claimed is:

1. An information processing apparatus comprising:
    first proximity radio communication means for transmitting predetermined information to and receiving predetermined information from a first information processing terminal belonging to a communication group when the first information processing terminal is closely positioned,
    acquisition means for acquiring, through the first proximity radio communication means from the first information processing terminal, communication group organizing information containing at least identification information of a second information processing terminal managing the communication group, communication method information relating to a communication method of the radio communication providable by the communication group, and a service record of information representing a service provided by the first information processing terminal, wherein the service record contains each of (1) a history of services, (2) a frequency of use of each of the services and (3) a plurality of service attributes that are ranked according to a priority, and each service attribute contains a service ID and an attribute value and wherein the service record and a number of available devices for connection are updated prior to communication with the second information processing terminal,
    second radio communication means for performing radio communication with the second information processing terminal,
    storage means for storing the communication group organizing information acquired by the acquisition means,
    selection means for selecting the communication method to be used in the radio communication of the second radio communication means in accordance with the communication method information,
    synchronization establishing means for establishing synchronization of the radio communication with the second information processing terminal in accordance with the identification information, and
    communication establishing means for establishing the radio communication, with the synchronization thereof established by the synchronization establishing means, using the communication method selected by the selection means.

2. An information processing apparatus according to claim 1, further comprising providing means for providing the communication group organizing information stored in the storage means to the second information processing terminal through the first proximity radio communication means when the second information processing terminal is in proximity.

3. An information processing method comprising:
    a first proximity radio communication step of transmitting predetermined information to and receiving predetermined information from a first information processing terminal belonging to a communication group when the first information processing terminal is closely positioned,
    an acquisition step of acquiring, through the process of the first proximity radio communication step from the first information processing terminal, communication group organizing information containing at least identification information of a second information processing terminal managing the communication group, communication method information relating to a communication method of the radio communication providable by the communication group, and a service record of information representing a service provided by the first information processing terminal, wherein the service record contains each of (1) a history of services, (2) a frequency of use of each of the services and (3) a plurality of service attributes that are ranked according to a priority, and each service attribute contains a service ID and an attribute value, a second radio communication step of performing radio communication with the second information processing terminal, an update step of updating the service record and a number of available devices for connection prior to communication with the second information processing terminal, a storage step of storing the communication group organizing information, a selection step of selecting the communication method to be used in the second radio communication step in accordance with the communication method information, a synchronization establishing step of establishing synchronization of the radio communication with the second information processing terminal in accordance with the identification information, and a communication establishing step of establishing the radio communication, with the synchronization thereof established, using the communication method selected in the selection step.

4. An information processing apparatus comprising:

acquisition means for acquiring, using an electromagnetic wave, communication group organizing information containing at least identification information of an information processing terminal managing a communication group; communication method information relating to a communication method of the radio communication providable by the communication group, stored in a radio communication device; and a service record of information representing a service provided by the radio communication device, wherein the service record contains each of (1) a history of services, (2) a frequency of use of each of the services and (3) a plurality of service attributes that are ranked according to a priority, and each service attribute contains a service ID and an attribute value, when the radio communication device, which is driven from an electromotive force that is generated in response to a reception of the electromagnetic wave, comes in proximity, update means for updating the communication group organizing information, including the service record and a number of available devices for connection, stored in the radio communication device using the electromagnetic wave, radio communication means for performing radio communication with the information processing terminal, selection means for selecting a communication method to be used in the radio communication of the radio communication means in accordance with the radio communication method information, synchronization establishing means for establishing synchronization of the radio communication with the information processing terminal in accordance with the identification information, and communication establishing means for establishing the radio communication, with the synchronization thereof established by the synchronization establishing means, using the selected communication method.

5. An information processing apparatus according to claim 4, wherein the acquisition means acquires the communication group organizing information further containing key information that is for use in an authentication to perform the radio communication.

6. An information processing apparatus according to claim 4, wherein the acquisition means acquires, from the radio communication device, the communication group organizing information further containing number information representing the number of apparatuses with which the information processing terminal concurrently communicates using the radio communication, and the synchronization establishing means performs the radio communication with the information processing terminal in accordance with the number information.

7. An information processing apparatus according to claim 6, wherein the update means updates the number information of the communication group organizing information stored in the radio communication device by extracting one from the number information.

8. An information processing apparatus according to claim 4, wherein the acquisition means acquires, from the radio communication device, the communication group organizing information further containing time slot information representing a time slot within which the information processing terminal communicates using the radio communication, and the synchronization establishing means establishes the synchronization when the synchronization establishing means determines in accordance with the time slot information that the radio communication with the information processing terminal is possible.

9. An information processing apparatus according to claim 4, wherein the acquisition means acquires, from the radio communication device, the communication group organizing information further containing type information representing a type of an apparatus with which the information processing terminal communicates using the radio communication, and the synchronization establishing means establishes the synchronization when the synchronization establishing means determines in accordance with the identification information that the radio communication with the information processing terminal is possible.

10. An information processing apparatus according to claim 4, further comprising start means for starting the function of the radio communication when the acquisition means acquires the communication group organizing information from the radio communication device.

11. An information processing method comprising:

an acquisition step of acquiring, using an electromagnetic wave, communication group organizing information containing at least identification information of an information processing terminal managing a communication group; communication method information relating to a communication method of the radio communication providable by the communication group, stored in a radio communication device; and a service record of information representing a service provided by the radio communication device, wherein the service record contains each of (1) a history of services, (2) a frequency of use of each of the services and (3) a plurality of service attributes that are ranked according to a priority, and each service attribute contains a service ID and an attribute value, when the radio communication device, which is driven from an electromotive force that is generated in response to a reception of the electromagnetic wave, comes in proximity, an update step of updating the communication group organizing information, including the service record and a number of available devices for connection, stored in the radio communication device using the electromagnetic wave, a radio communication step of performing radio communication with the information processing terminal, a selection step of selecting a communication method to be used in the radio communication step in accordance with the radio communication method information, a synchronization establishing step of establishing synchronization of the radio communication with the information processing terminal, managing the communication group, in accordance with the identification information, and a communication establishing step of establishing the radio communication, with the synchronization thereof established, using the selected communication method.

12. An information processing apparatus according to claim 1, wherein the acquisition means acquires the communication group organizing information using one of an electromagnetic-wave communication, an infrared communication and a Bluetooth communication which identifies a communication partner in a weak-power mode for device searching.

* * * * *